United States Patent
Tucker

(10) Patent No.: US 11,307,755 B2
(45) Date of Patent: Apr. 19, 2022

(54) DETERMINATION OF VALID TOUCHES BASED ON FORCE SHAPE

(71) Applicant: Parade Technologies, Ltd., Santa Clara, CA (US)

(72) Inventor: Jeffrey Tucker, Lynnwood, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 578 days.

(21) Appl. No.: 15/289,082

(22) Filed: Oct. 7, 2016

(65) Prior Publication Data

US 2018/0059851 A1 Mar. 1, 2018

Related U.S. Application Data

(60) Provisional application No. 62/383,376, filed on Sep. 2, 2016, provisional application No. 62/379,721, filed on Aug. 25, 2016.

(51) Int. Cl.
*G06F 3/0488* (2013.01)
*G06F 3/041* (2006.01)
(Continued)

(52) U.S. Cl.
CPC .......... *G06F 3/0488* (2013.01); *G06F 3/017* (2013.01); *G06F 3/0412* (2013.01);
(Continued)

(58) Field of Classification Search
CPC ........ G06F 3/0414; G06F 3/044; G06F 3/041; G06F 2203/04101; G06F 2203/04105;
(Continued)

(56) References Cited

U.S. PATENT DOCUMENTS 7,532,202 B2 *  5/2009  Roberts ................ G06F 3/0414
                                                178/18.01
8,773,146 B1  7/2014  Hills
(Continued)

FOREIGN PATENT DOCUMENTS

CN  101523274 A  9/2009
CN  105068695 A  11/2015
(Continued)

OTHER PUBLICATIONS

Tucker, Pre-Interview First Office Action, U.S. Appl. No. 15/289,096, dated Jan. 26, 2018, 4 pgs.
(Continued)

*Primary Examiner* — Jimmy H Nguyen
(74) *Attorney, Agent, or Firm* — Morgan, Lewis & Bockius LLP

(57) ABSTRACT

This application is directed to detecting touch events on a touch sensing surface coupled to a capacitive sense array and one or more force sensors. The capacitive sense array includes a plurality of sense electrodes configured to provide a plurality of capacitive sense signals. The force sensors are configured to provide one or more force signals. In accordance with the plurality of capacitive sense signals, one or more candidate touches are determined on the touch sensing surface, and used to determine an expected force shape. An actual force shape caused on the touch sensing surface by the candidate touches is determined from the one or more force signals. The actual and expected force shapes are compared to determine magnitudes of force associated with each of the one or more touch candidates, thereby determining whether each of the one or more candidate touches is a valid touch.

20 Claims, 45 Drawing Sheets

(51) Int. Cl.
*G06F 3/044* (2006.01)
*G06F 3/01* (2006.01)

(52) U.S. Cl.
CPC ........ *G06F 3/0446* (2019.05); *G06F 3/04186* (2019.05); *G06F 3/041662* (2019.05); *G06F 2203/04101* (2013.01); *G06F 2203/04104* (2013.01); *G06F 2203/04105* (2013.01); *G06F 2203/04106* (2013.01); *G06F 2203/04108* (2013.01)

(58) Field of Classification Search
CPC . G06F 2203/04106; G06F 2203/04112; G06F 3/0416; G06F 3/0488; G06F 3/041662; G06F 3/0446; G06F 3/04186; G06F 3/017; G06F 3/0412
USPC .............................. 345/173, 174; 178/18.06
See application file for complete search history.

(56) References Cited

U.S. PATENT DOCUMENTS

| | | | |
|---|---|---|---|
| 9,164,605 B1* | 10/2015 | Pirogov | G06F 3/041 |
| 2006/0197753 A1 | 9/2006 | Hotelling | |
| 2008/0136792 A1* | 6/2008 | Peng | G06F 3/0416 345/174 |
| 2011/0141053 A1* | 6/2011 | Bulea | G06F 3/0416 345/174 |
| 2012/0038583 A1* | 2/2012 | Westhues | G06F 3/0412 345/174 |
| 2013/0207938 A1 | 8/2013 | Ryshtun et al. | |
| 2014/0002114 A1* | 1/2014 | Schwartz | G06F 3/044 324/679 |
| 2014/0300559 A1 | 10/2014 | Tanimoto et al. | |
| 2015/0370356 A1 | 12/2015 | Hwang et al. | |
| 2016/0239136 A1* | 8/2016 | Kocak | G06F 3/0412 |
| 2017/0200881 A1* | 7/2017 | Gdala | H01L 41/193 |
| 2017/0235414 A1 | 8/2017 | Ding et al. | |
| 2017/0277350 A1* | 9/2017 | Wang | G06F 3/0418 |

FOREIGN PATENT DOCUMENTS

| | | |
|---|---|---|
| CN | 204808295 U | 11/2015 |
| CN | 204965385 U | 1/2016 |
| JP | 2014194591 A | 10/2014 |
| KR | 101565822 B1 | 11/2015 |

OTHER PUBLICATIONS

Sterling, Pre-Interview First Office Action, U.S. Appl. No. 15/289,085, dated Jan. 26, 2018, 4 pgs.
Parade Technologies, Ltd., International Search Report and Written Opinion, PCT/CN2016/071409, dated Aug. 29, 2016, 8 pgs.
Tucker, Pre-Inteview Office Action, U.S. Appl. No. 15/289,091, dated Jan. 8, 2018, 4 pgs.
Tucker, Pre-Inteview Office Action, US 15/289,098, dated Jan. 23, 2018, 4 pgs.
Drake, Pre-Interview first Office Action, U.S. Appl. No. 15/289,102, dated Mar. 8, 2018, 3 pgs.
Qu, Office Action, U.S. Appl. No. 15/289,098, dated Mar. 9, 2018, 6 pgs.
Tucker, Office Action, U.S. Appl. No. 15/289,091, dated Mar. 8, 2018, 7 pgs.
Tucker, Office Action, U.S. Appl. No. 15/289,096, dated Mar. 9, 2018, 7 pgs.
Drake, First Action Interview Office Action, U.S. Appl. No. 15/289,102, dated Apr. 20, 2018, 7 pgs.
Drake, Final Office Action, U.S. Appl. No. 15/289,102, dated Sep. 26, 2018, 6 pgs.
Qu, Notice of Allowance, U.S. Appl. No. 15/289,098, dated Jul. 25, 2018, 8 pgs.
Sterling, Final Office Action, U.S. Appl. No. 15/289,085, dated Aug. 9, 2018, 12 pgs.
Tucker, Final Office Action, U.S. Appl. No. 15/289,091, dated Aug. 14, 2018, 19 pgs.
Tucker, Final Office Action, U.S. Appl. No. 15/289,096, dated Aug. 3, 2018, 12 pgs.
Parade Technologies, Ltd., International Search Report and Written Opinion, PCT/CN2017/048693, dated Nov. 7, 2017, 6 pgs.
Parade Technologies, Ltd., International Preliminary Report on Patentability, PCT/CN2017/048693, dated Feb. 26, 2019, 5 pgs.
Drake, Office Action, U.S. Appl. No. 15/289,102, dated Dec. 13, 2018, 44 pgs.
Tucker, Office Action, U.S. Appl. No. 15/289,096, dated Nov. 29, 2018, 82 pgs.
Sterling, Office Action, U.S. Appl. No. 15/289,085, dated Dec. 13, 2018, 48 pgs.

* cited by examiner

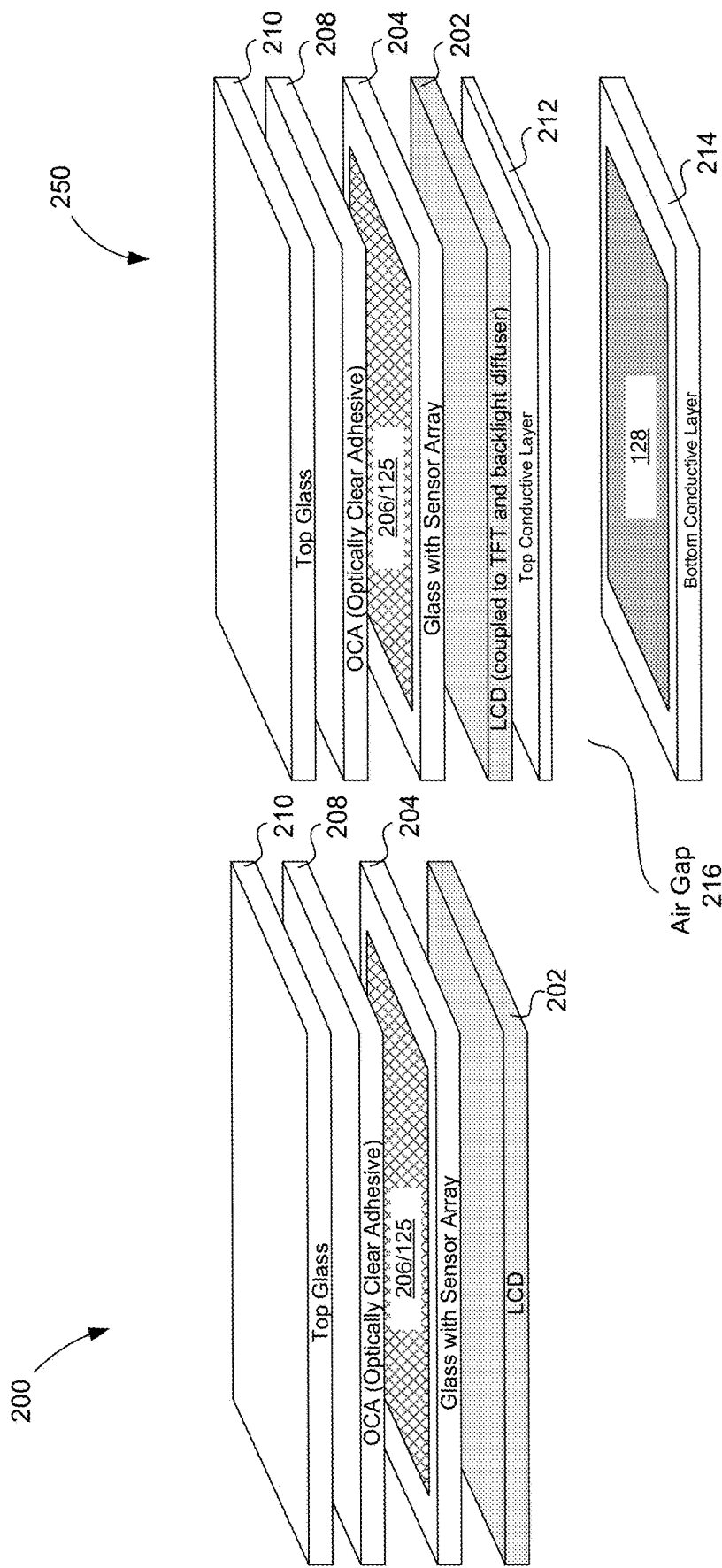

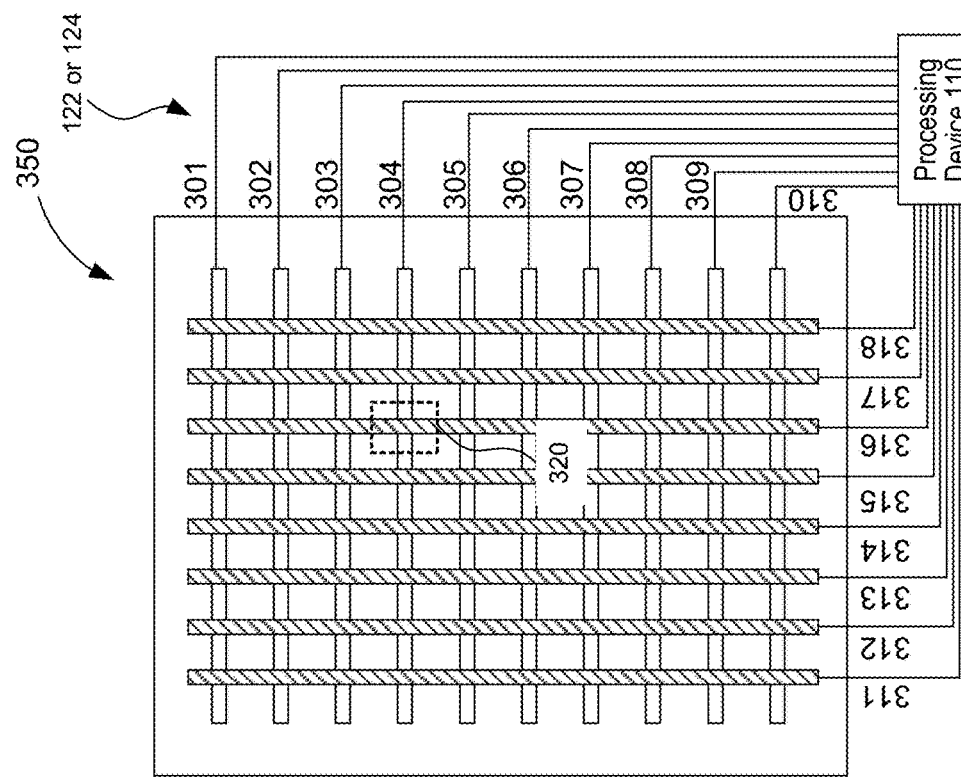
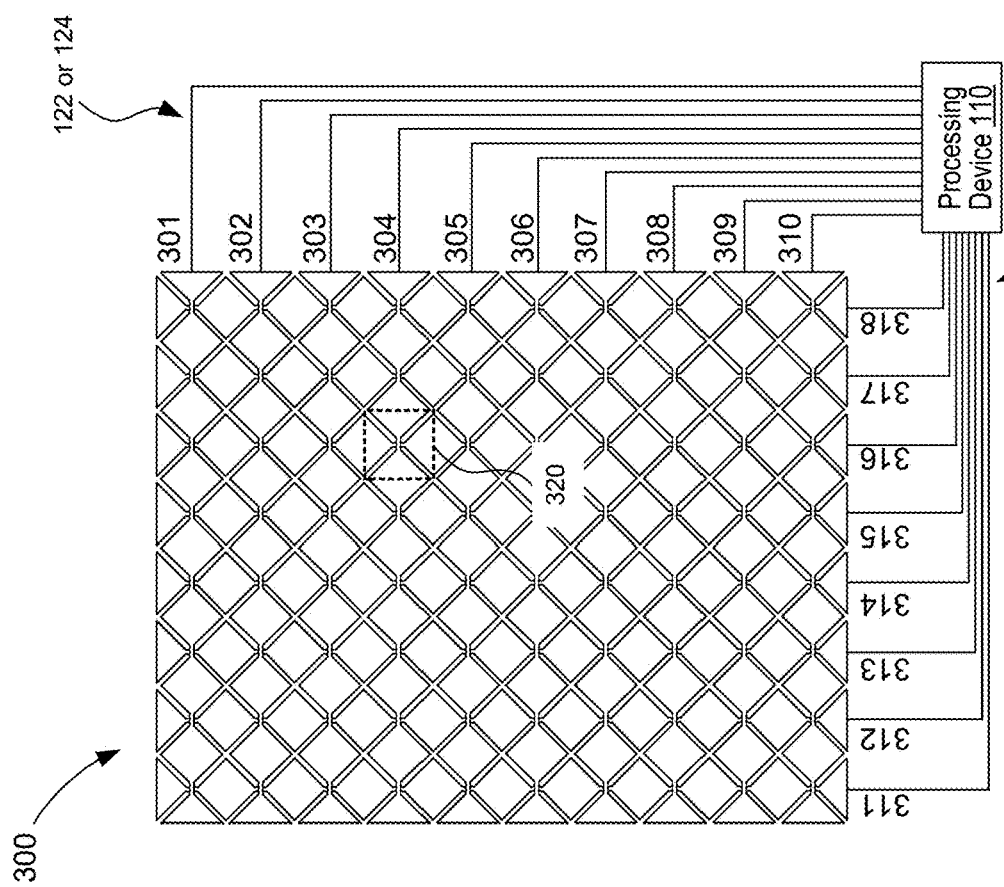
Figure 3B
Figure 3A

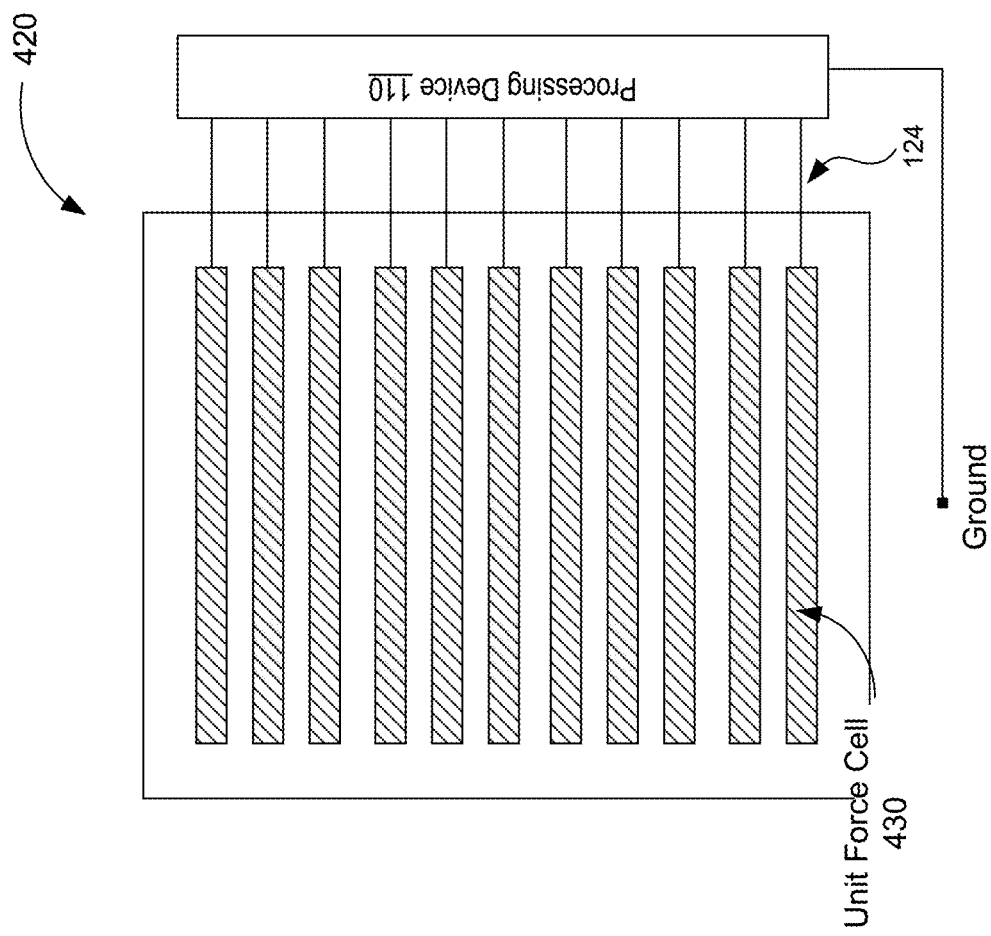
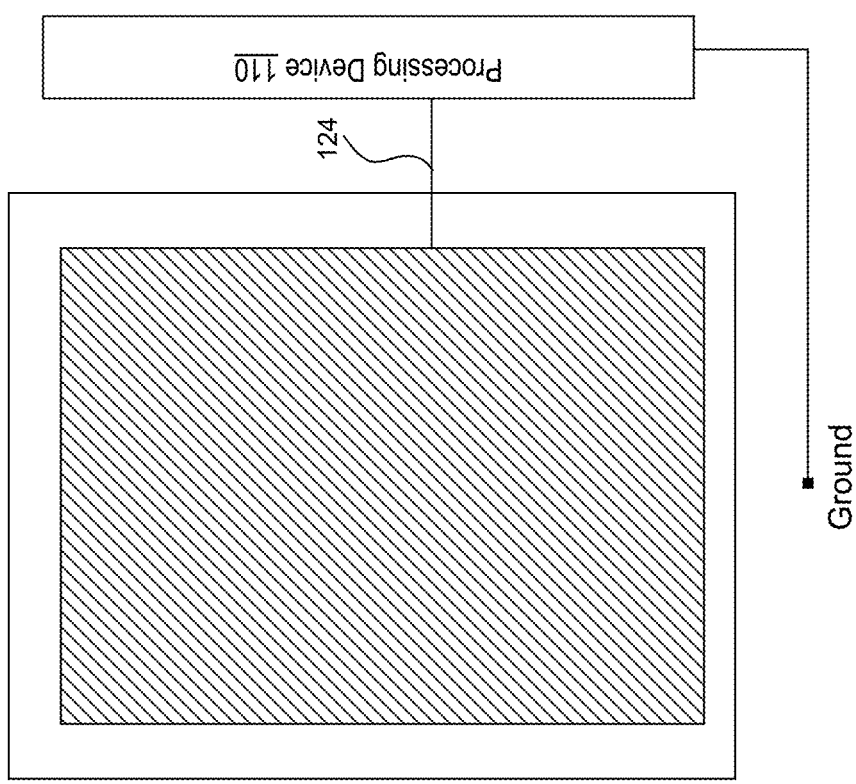
Figure 4A
Figure 4B

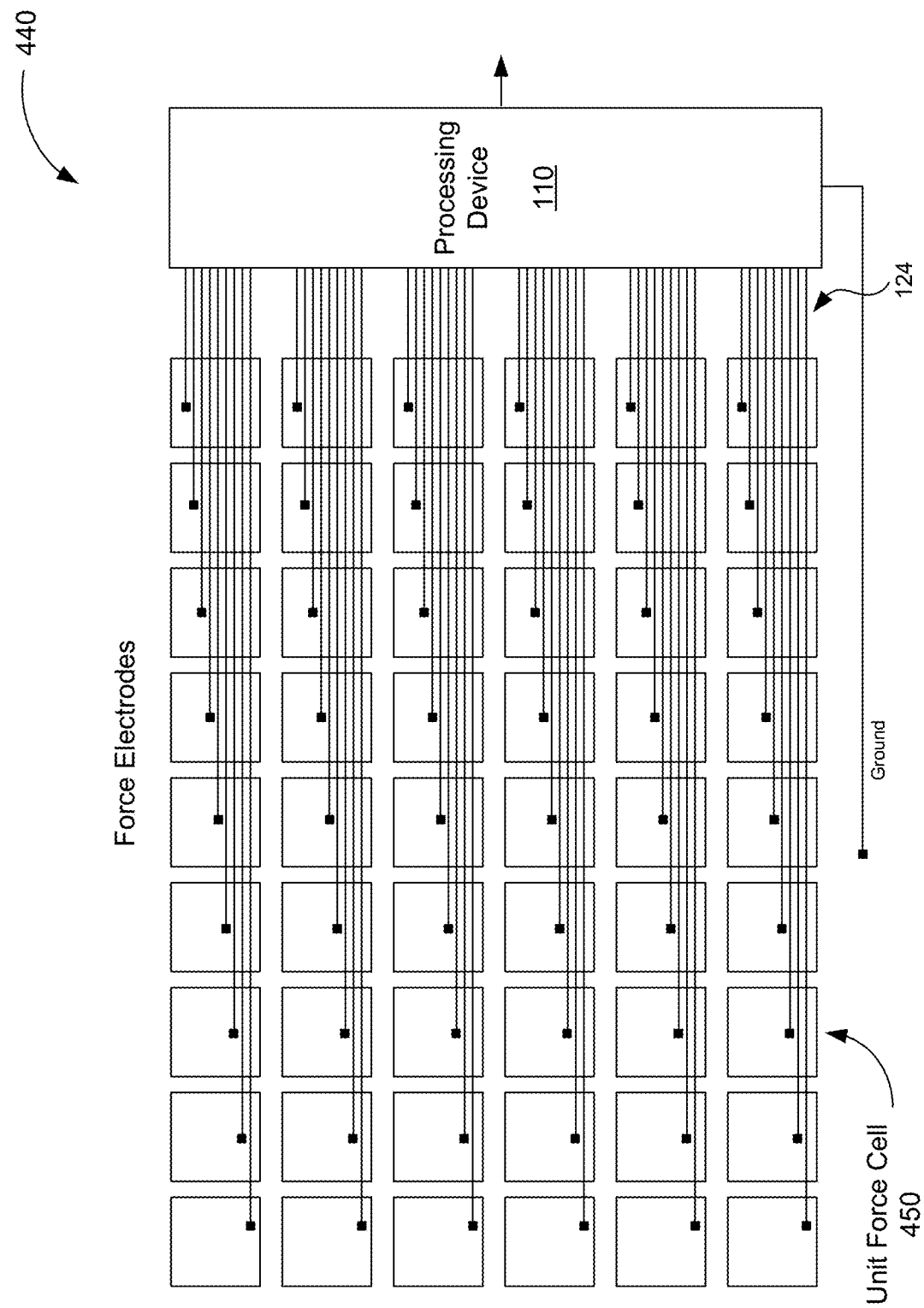

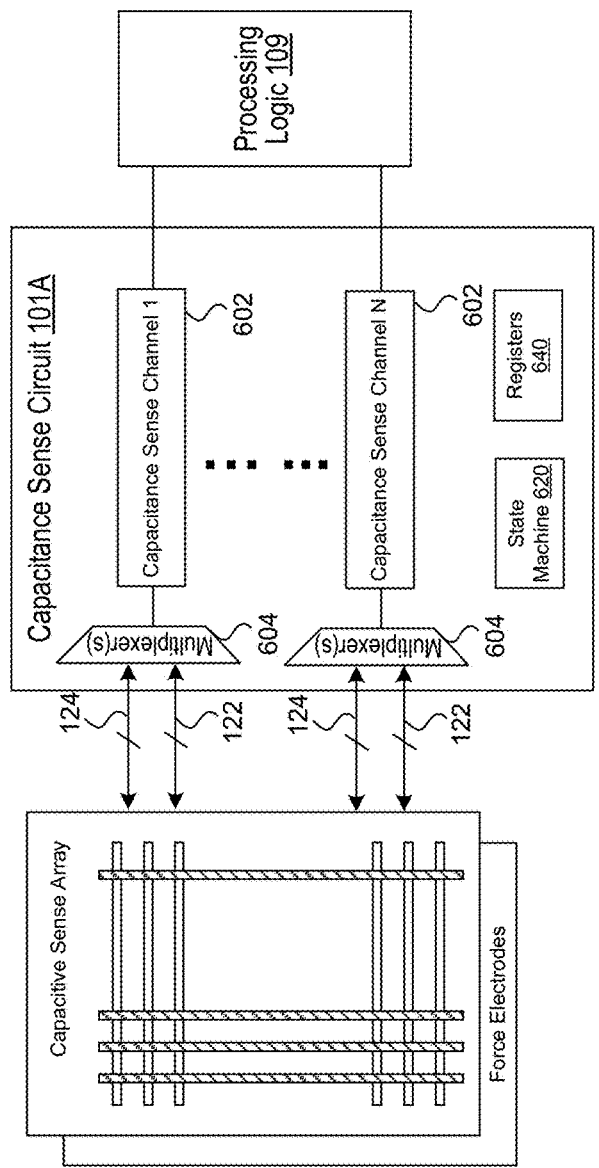
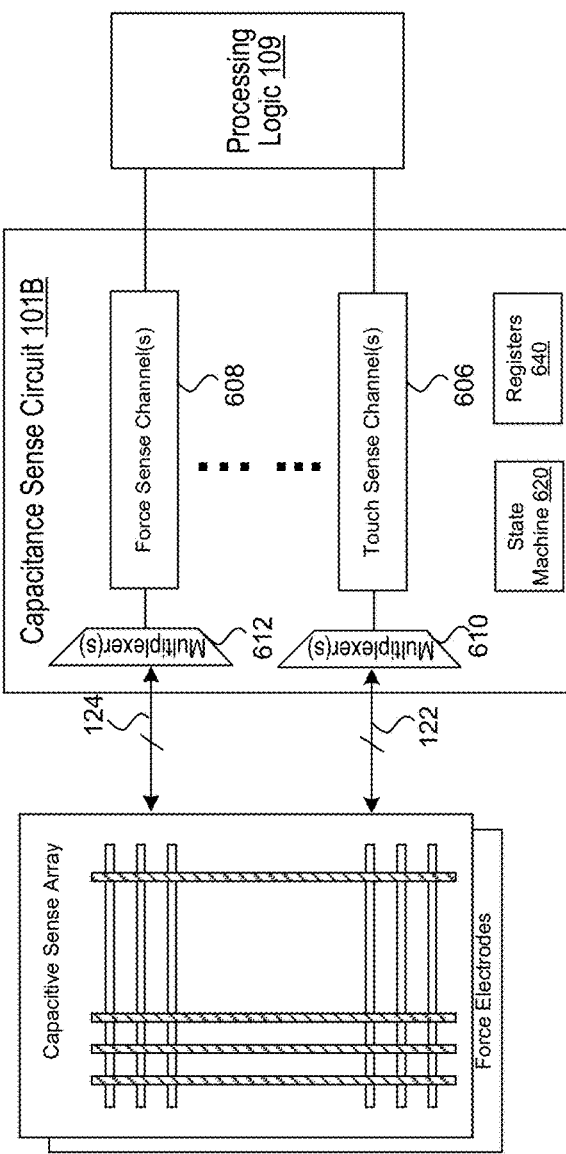

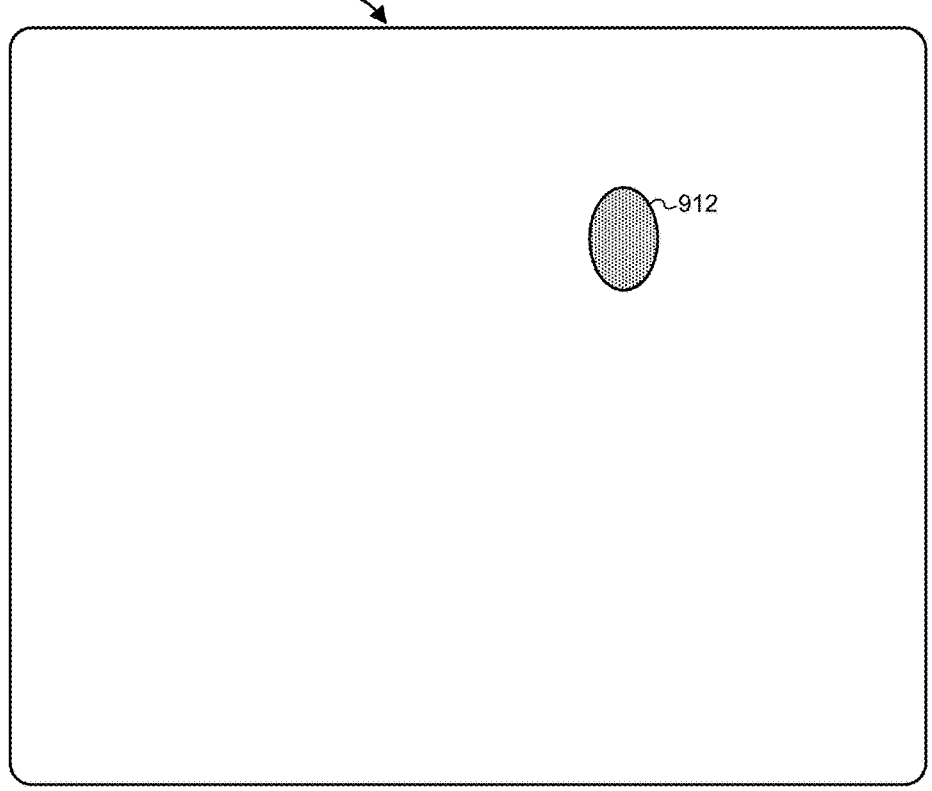
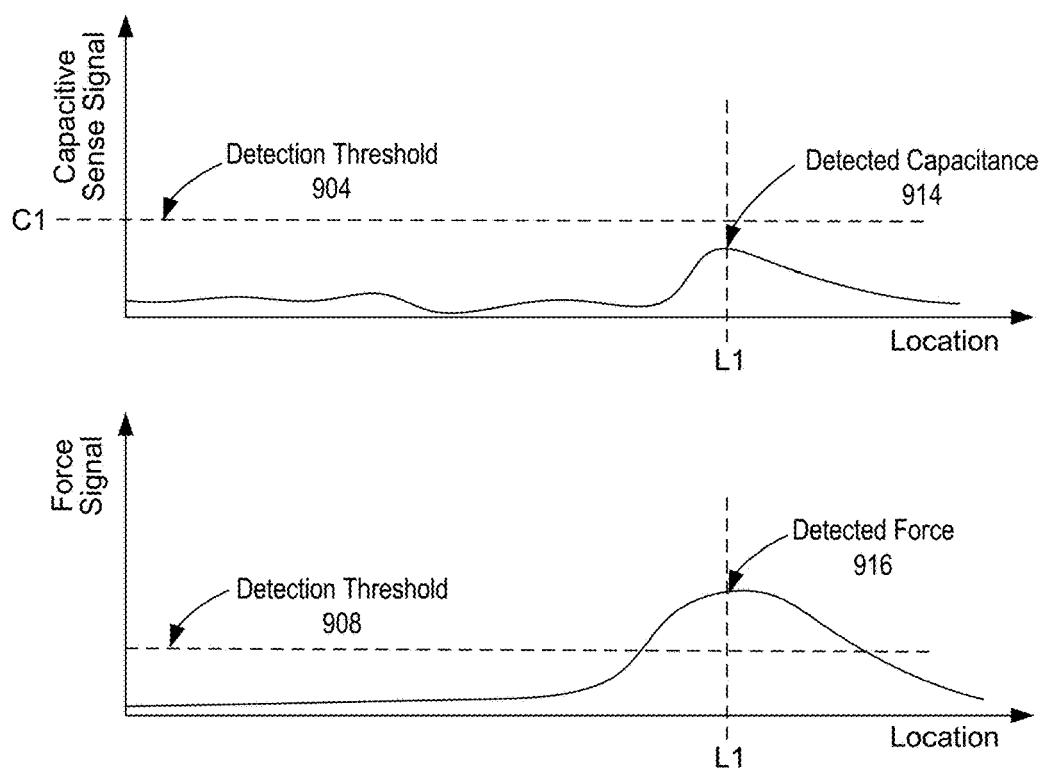
Figure 9B

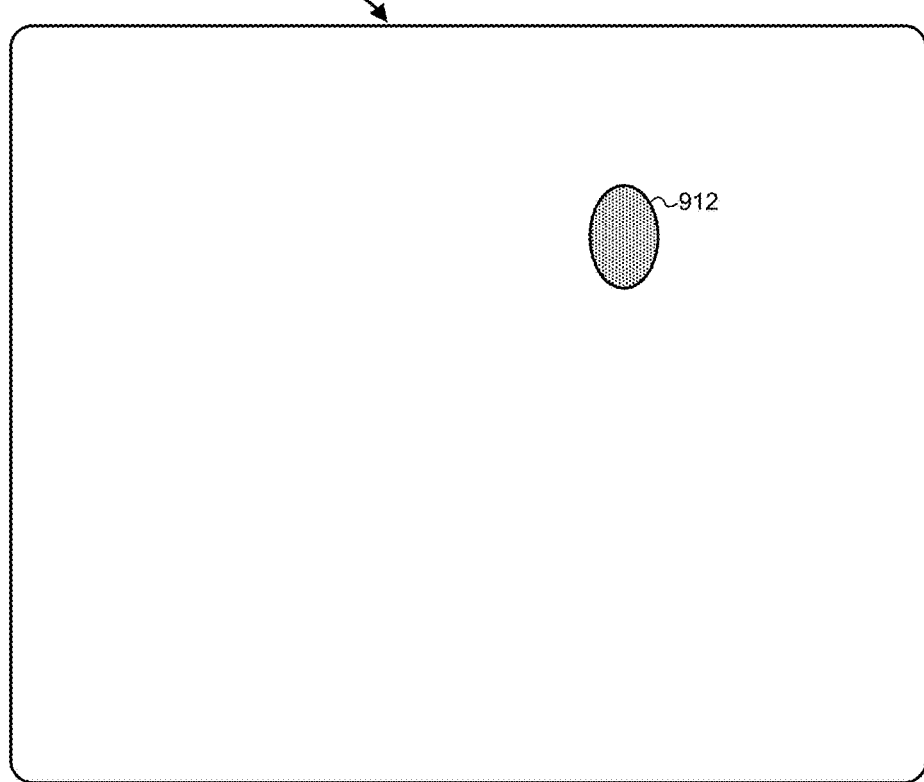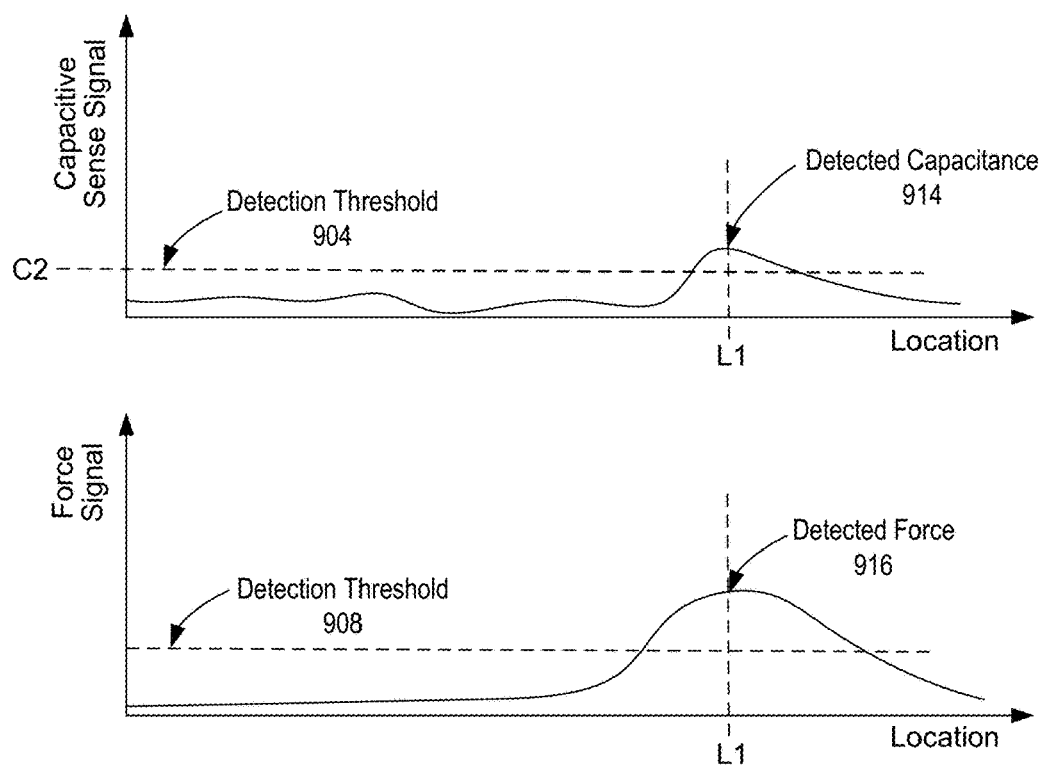
Figure 9C

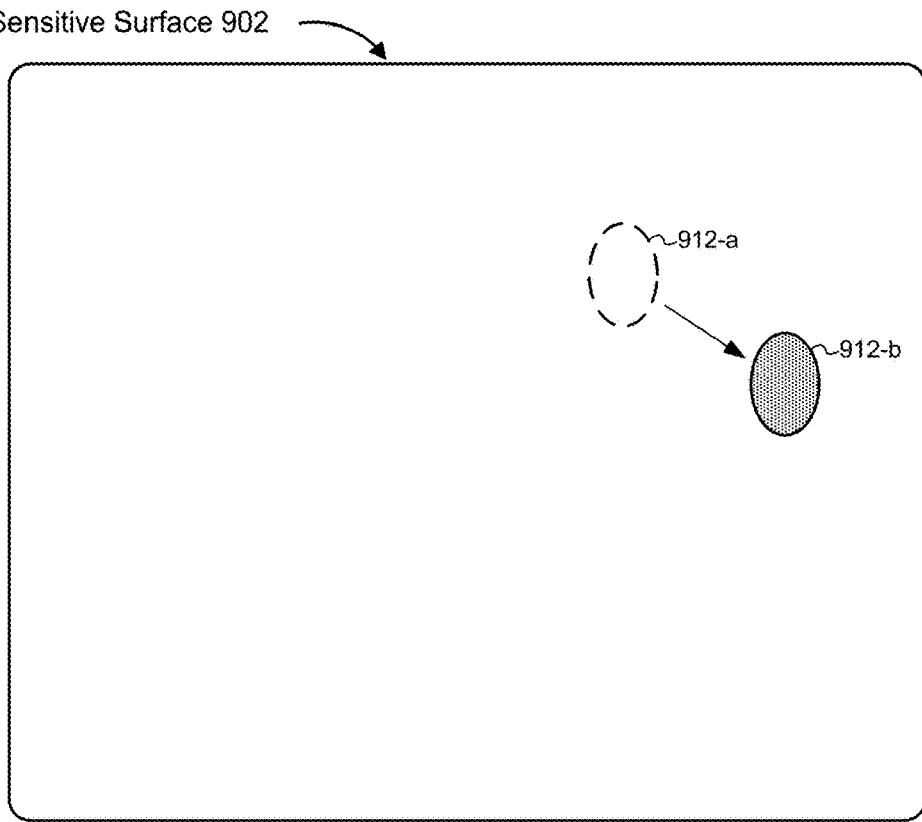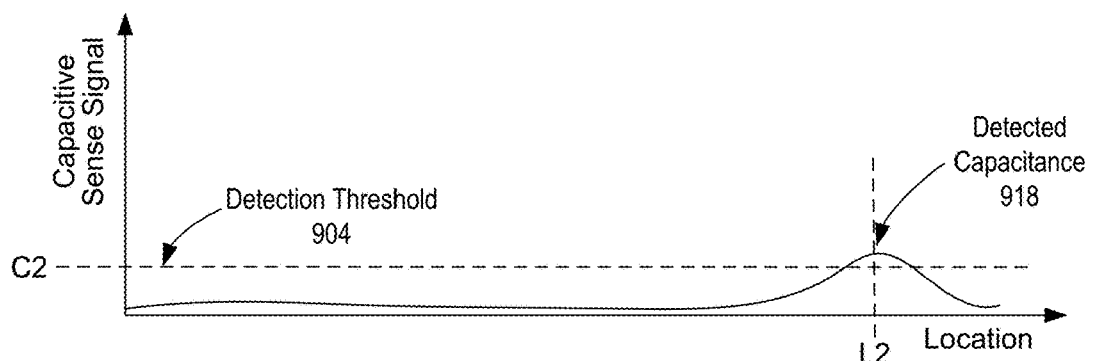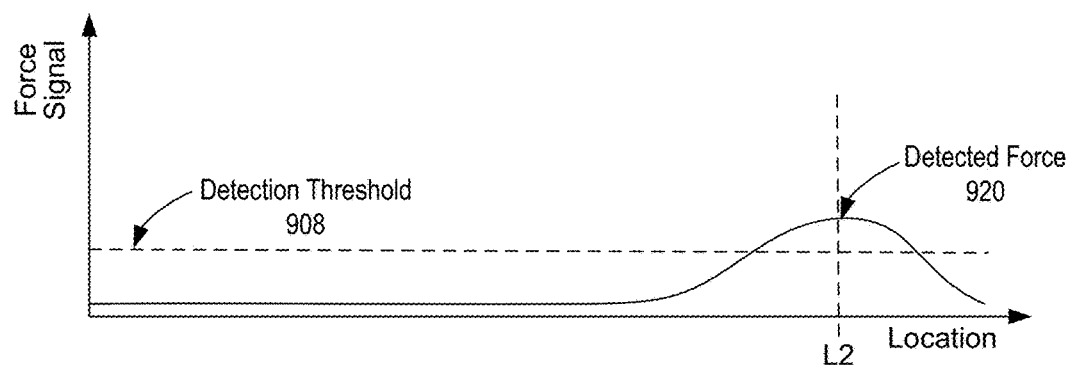
Figure 9D

Touch-Sensitive Surface 902
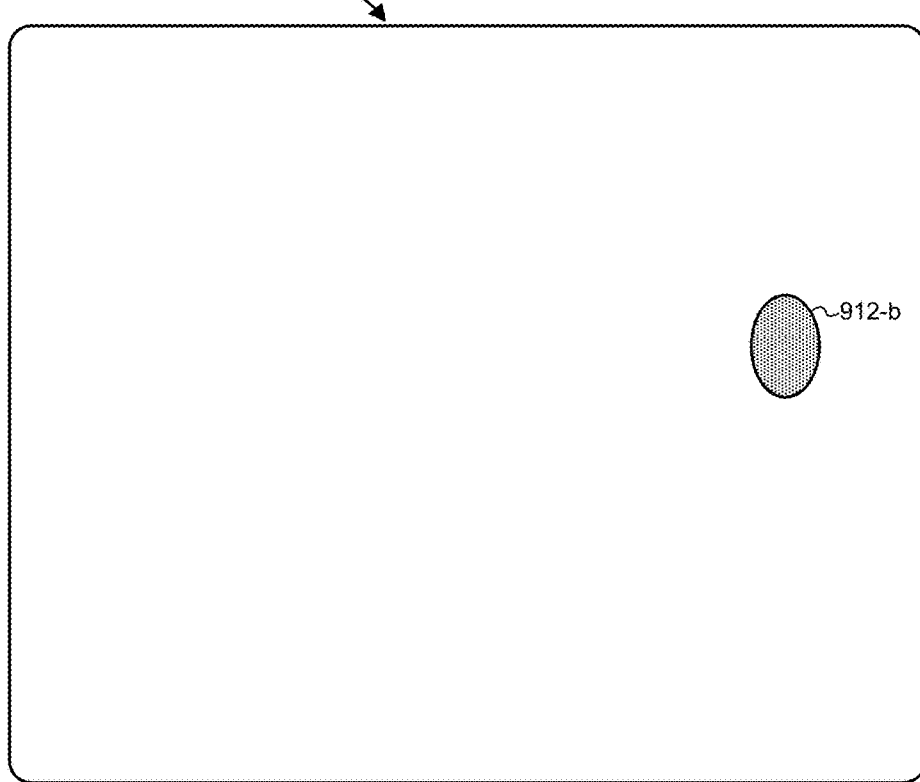
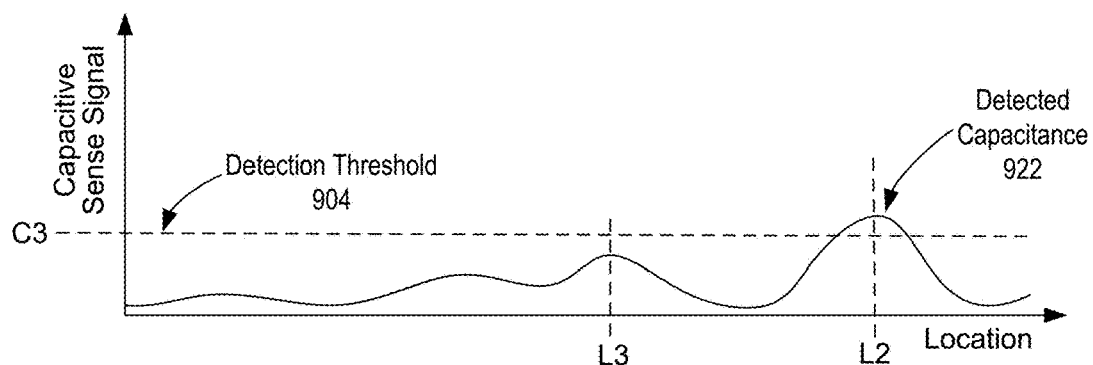
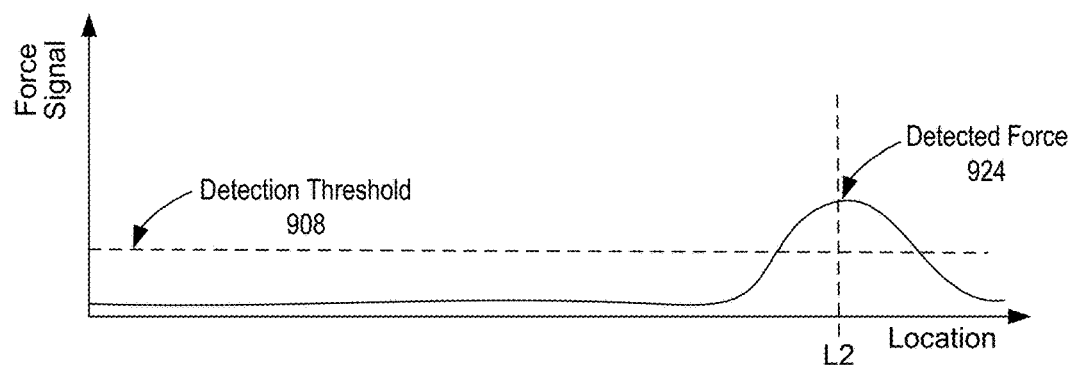
Figure 9F

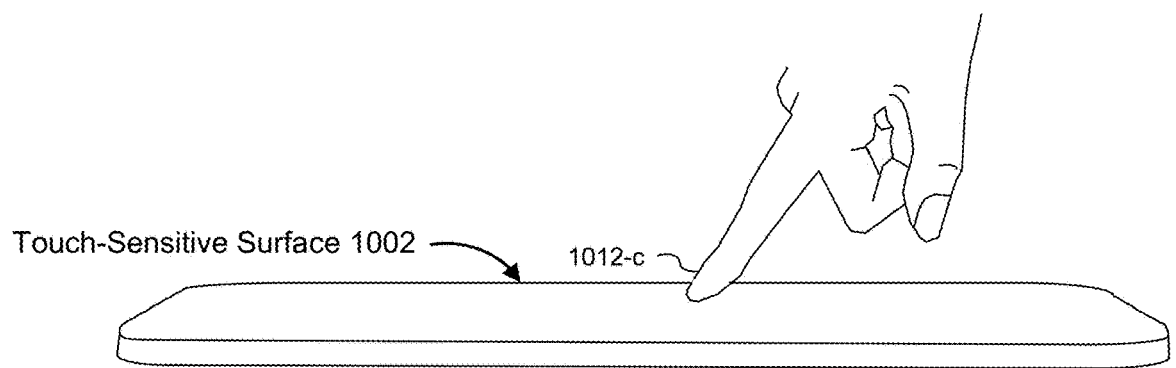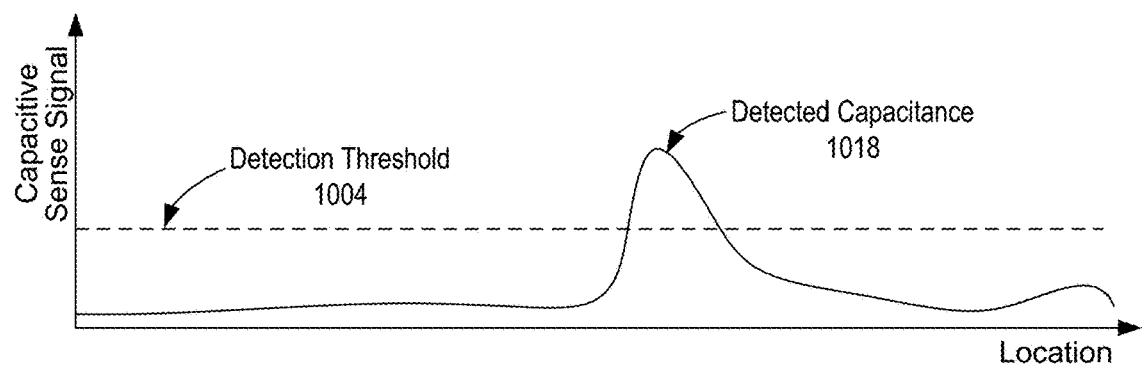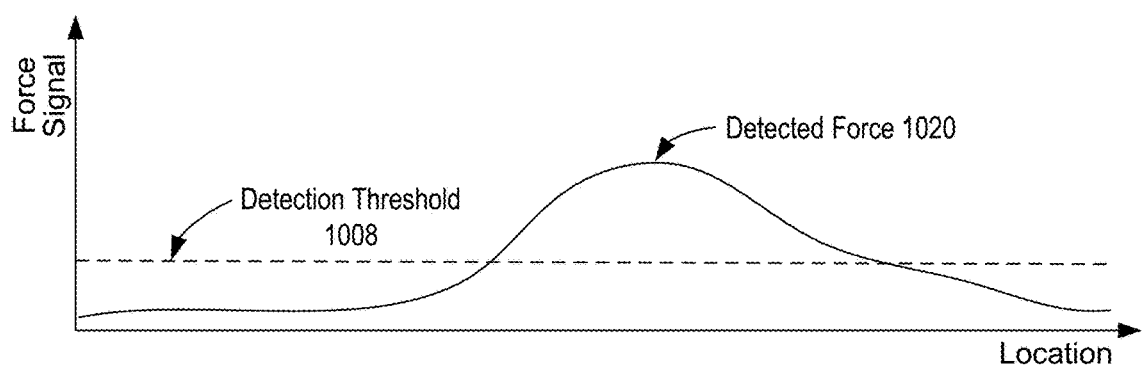
Figure 10C

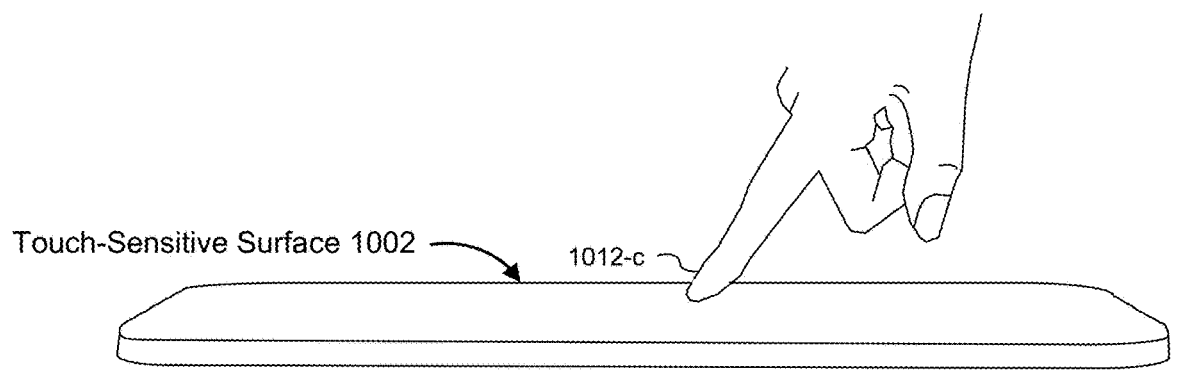
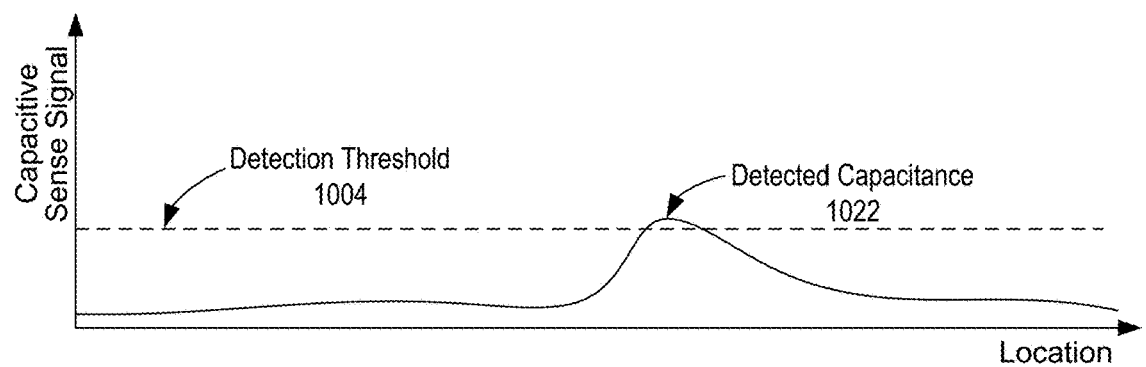
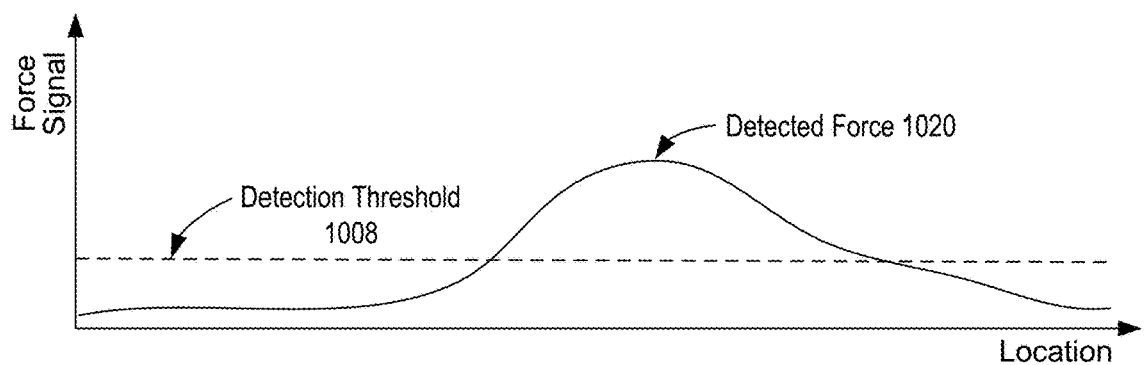
Figure 10D

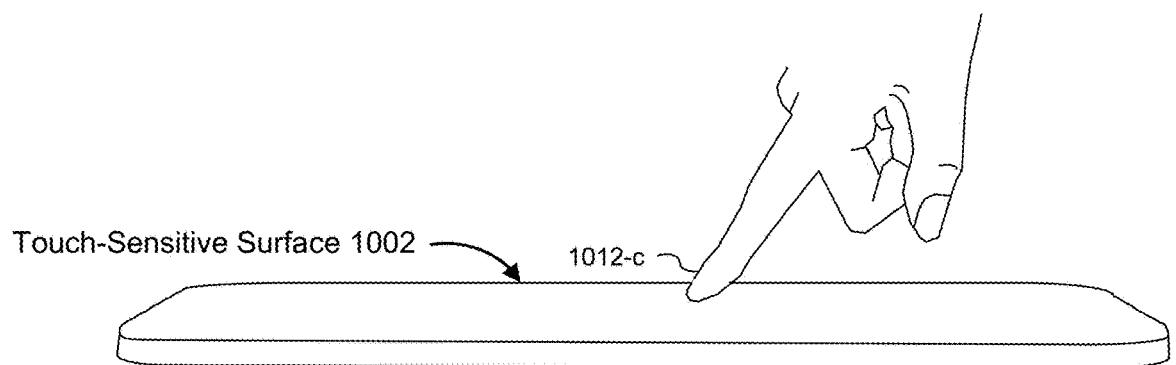
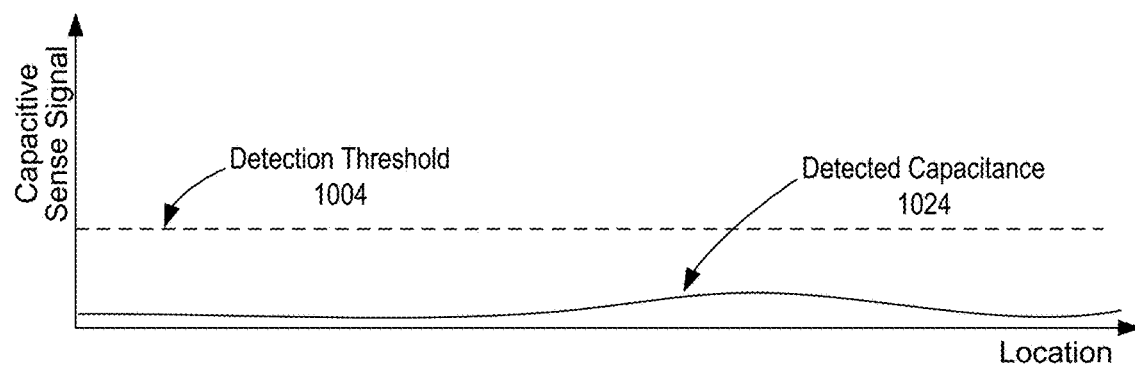
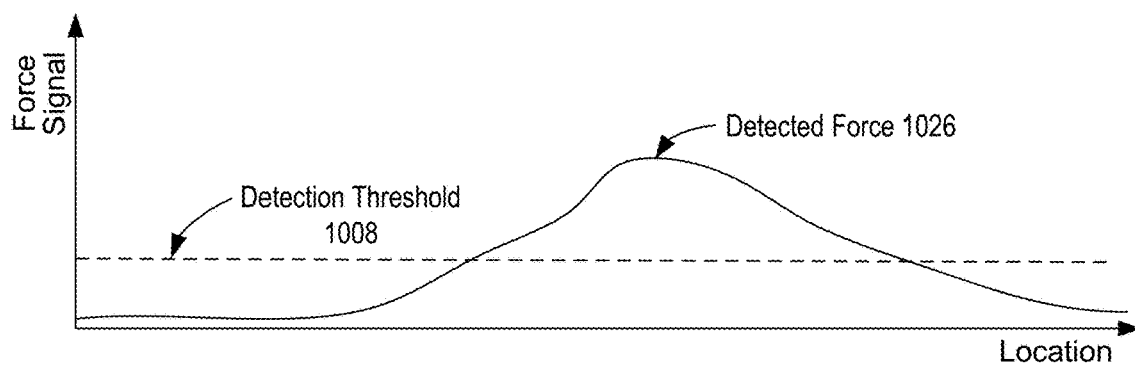
Figure 10E

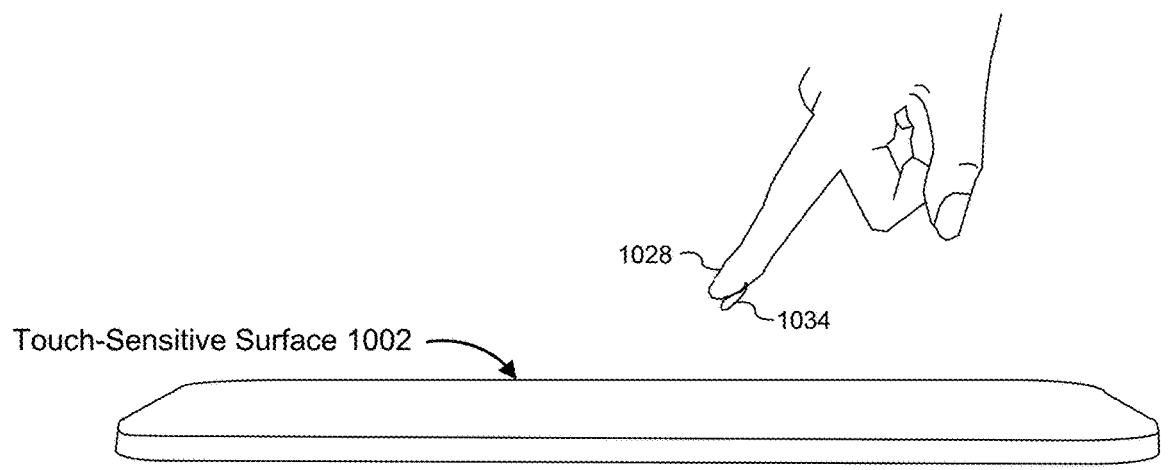
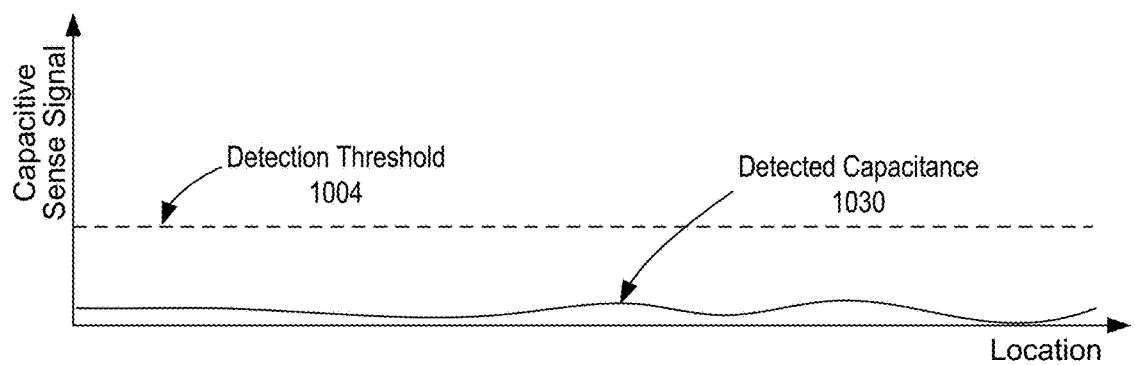
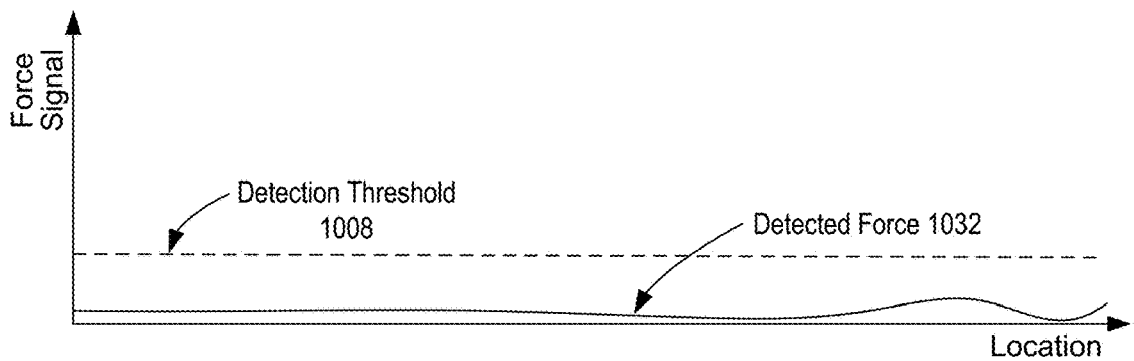
Figure 10F

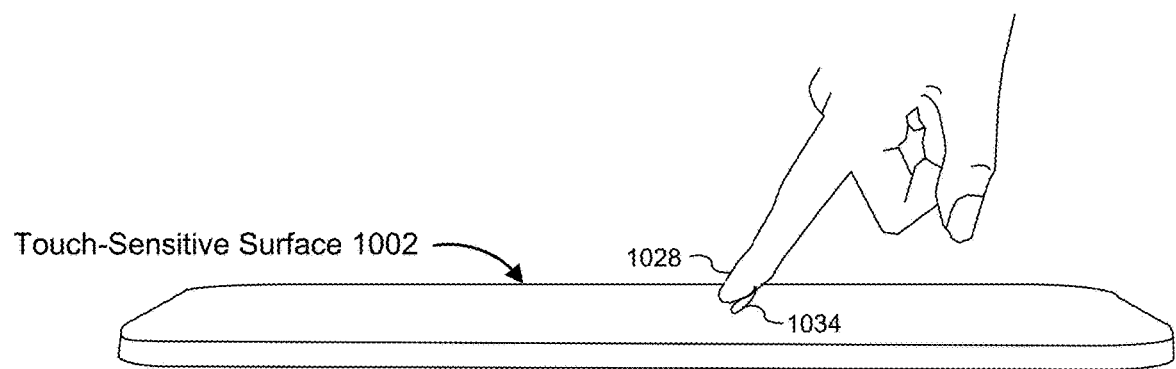
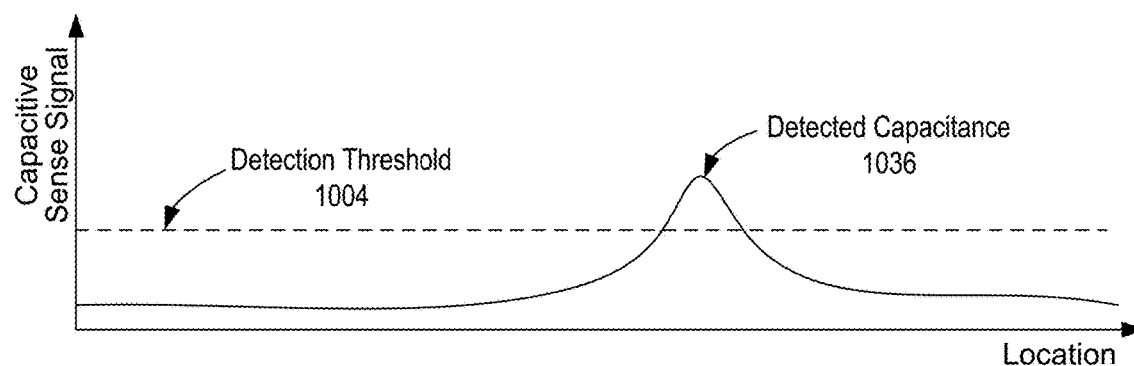
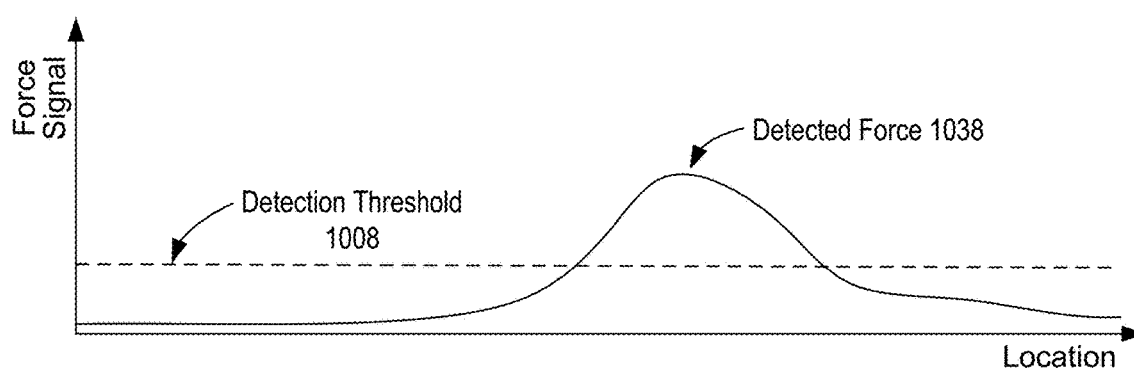
Figure 10G

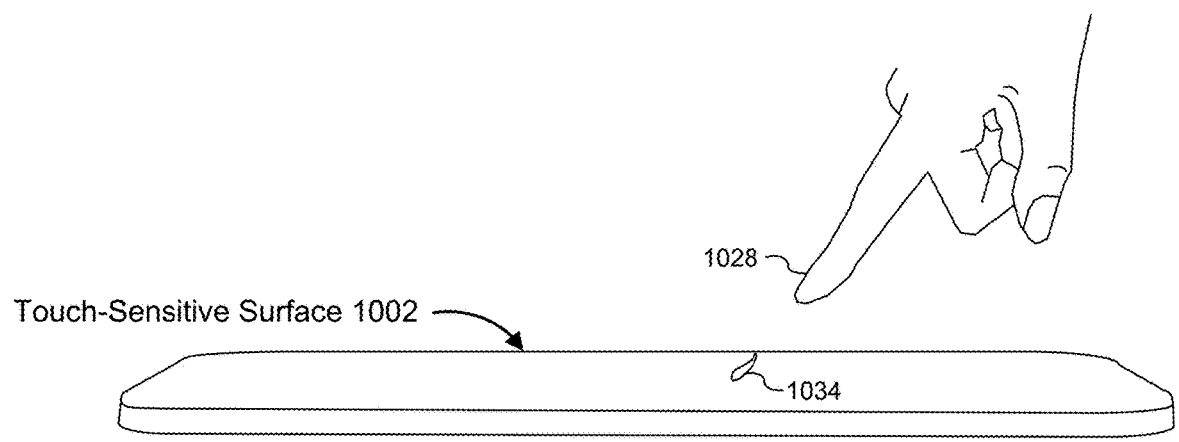
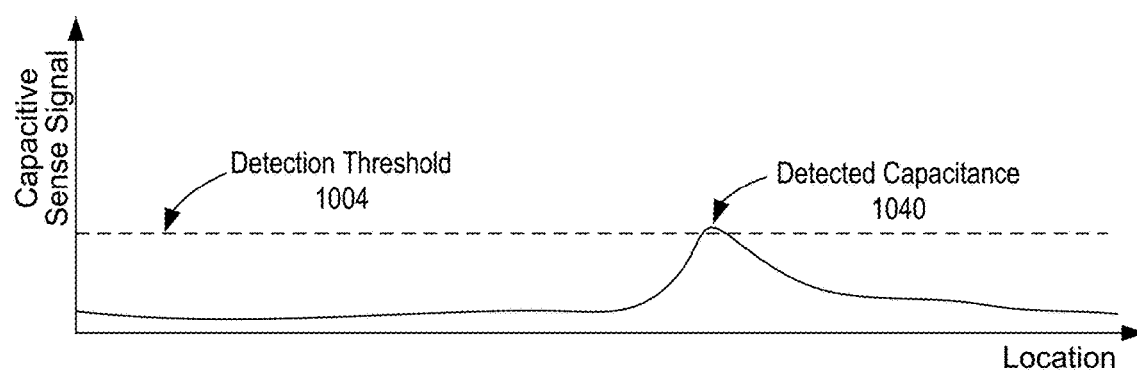
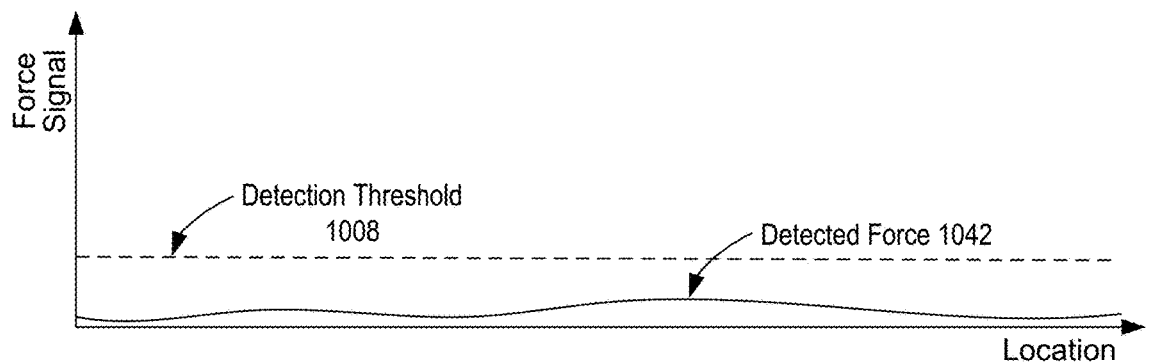
Figure 10H

↙1500

At a processing device coupled to a capacitive sense array and one or more force electrodes associated with the capacitive sense array, wherein the capacitive sense array includes a plurality of sense electrodes:

> Obtain a plurality of capacitive sense signals from the plurality of sense electrodes of the capacitive sense array 1502
>
> ↓
>
> In accordance with the plurality of capacitive sense signals and a plurality of baseline values, determine that a subset of sense electrodes are associated with a candidate touch, where each of the plurality of baseline values is associated with at least one of the plurality of sense electrodes 1504
>
> ↓
>
> Obtain one or more force signals from the one or more force electrodes 1506
>
> ↓
>
> In accordance with a determination that force associated with the one or more force signals is below a predetermined force threshold: 1507
>
>> Determining that associating the candidate touch is not a valid touch 1508
>>
>> ↓
>>
>> For each of the subset of sense electrodes of the capacitive sense array, adjust a respective baseline value for determining subsequent touch events associated with the respective sense electrode according to one of the plurality of capacitive sense signals associated with the respective sense electrode 1510

In accordance with the plurality of capacitive sense signals and the adjusted baseline values of the subset of sense electrodes, determine a subsequent touch event on the touch sense surface, including filtering a subset of the plurality of capacitive sense signals according to the baseline values associated with the plurality of sense electrodes 1512

In accordance with the adjusted baseline values of the subset of sense electrodes, detect a subsequent touch that at least partially overlaps with the area of the touch sensing surface corresponding to the subset of sense electrodes that was covered by the water drop 1514

The subsequent touch overlaps with the area of the touch sensing surface corresponding to the subset of sense electrodes that was covered by the water drop 1516

↓

Determine a subsequent touch event on the touch sense surface, including: in accordance with the adjusted baseline values, detect a subsequent touch that does not overlap with the area of the touch sensing surface corresponding to the subset of sense electrodes that was covered in the water spot, where no touch is detected at the area of the touch sensing surface in accordance with the adjusted baseline values of the subset of sense electrodes 1518

At a processing device coupled to a capacitive sense array and one or more force electrodes associated with the capacitive sense array, wherein the capacitive sense array includes a plurality of sense electrodes:

Obtain a plurality of capacitive sense signals from the plurality of sense electrodes of the capacitive sense array 1802

In accordance with the plurality of capacitive sense signals, determine one or more candidate touches on the touch sensing surface, and determining a capacitive touch profile based on the one or more candidate touches 1804

Obtain one or more force signals from the one or more force electrodes 1806

In accordance with the one or more force signals, determine a force shape caused on the touch sensing surface by the one or more touches 1808

Determining the force shape further comprises determining, according to the force shape, that a second number of touches are applied on the touch sensing surface, and determining one or more candidate touches on the touch sensing surface further includes determining that one or more candidate touches associated with the capacitive touch profile include a first number of candidate touches, wherein the first number is greater than the second number 1810

At least one of the first number of candidate touches is caused by at least one of: a water spot disposed on the touch sensing surface, common mode noise, and hovering of a stylus or a conductive object 1811

At a processing device coupled to a capacitive sense array and one or more force electrodes associated with the capacitive sense array, wherein the capacitive sense array includes a plurality of sense electrodes:

Obtain a plurality of capacitive sense signals from the plurality of sense electrodes of the capacitive sense array 2102

In accordance with the plurality of capacitive sense signals, detect one or more candidate touches on the touch sensing surface, the one or more candidate touches including a first candidate touch 2104

Obtain one or more force signals from the one or more force electrodes 2106

Determining that force associated with the one or more force signals is associated with a grip on an edge area of the touch sensing surface. 2107

In accordance with a determination that force associated with the one or more force signals is associated with a grip on an edge area of the touch sensing surface: 2108

Associate the first candidate touch with the grip on the edge area of the touch sensing surface 2110

Designate the first candidate touch as not a valid touch 2112

Determining that the force is associated with a grip of the edge area further includes at least one of: determining that the force applied on the edge area lasts for a duration of time that exceeds a predetermined grip time threshold; and determining that the first touch associated with the grip of the edge area has a touch area that exceeds a predetermined grip area threshold 2114

At a processing device coupled to a capacitive sense array and one or more force electrodes associated with the capacitive sense array, wherein the capacitive sense array includes a plurality of sense electrodes:

Performing a plurality of scan cycles, including: 2302

Obtain a plurality of capacitive sense signals from the plurality of sense electrodes of the capacitive sense array 2304

Obtain one or more force signals from the one or more force electrodes 2306

Determining a temporal sequence of touches on the touch sensing surface based on the plurality of capacitive sense signals and the one or more force signals obtained from the plurality of scan cycles, including: 2308

For each touch of the sequence of touches, identifying a touch location on the touch sensing surface based on the plurality of capacitive sense signals, and determining a force value associated with force applied at the touch location based on the one or more force signals 2310

Identify a gesture associated with the temporal sequence of touches based on the touch location and the force value for each touch of the sequence of touches 2312

Identify a first predefined gesture, when the touch locations of the temporal sequence of touches are consistent with a predefined stroke pattern and each of the force values varies according to a set of predetermined force values corresponding to the predefined stroke pattern 2314

Figure 23

DETERMINATION OF VALID TOUCHES BASED ON FORCE SHAPE

CROSS REFERENCE TO RELATED APPLICATIONS

This application claims priority to U.S. Provisional Patent Application No. 62/379,721, titled "Using Force Sensing to Improve Accuracy of Touch Detection on a Touch Sensing Surface," filed on Aug. 25, 2016, and U.S. Provisional Patent Application No. 62/383,376, titled "Using Force Sensing to Improve Accuracy of Touch Detection on a Touch Sensing Surface," filed on Sep. 2, 2016, each of which is hereby incorporated by reference in its entirety.

This application is related to PCT/CN2016/071409, filed on Jan. 20, 2016, entitled "Integrated Touch Sensing and Force Sensing in a Touch Detection Device," which is hereby incorporated by reference in its entirety.

This application is also related to U.S. patent application Ser. No. 15/289,102, filed on Oct. 7, 2016, entitled "Using 3D Touch for Tracking Objects on a Wet Touch Surface," U.S. patent application Ser. No. 15/289,098, filed on Oct. 7, 2016, entitled "Using 3D Touch for Signal Conditioning and Noise Reduction on a Touch Surface," U.S. patent application Ser. No. 15/289,096, filed on Oct. 7, 2016, entitled "Signal Conditioning on Touch-Enabled Devices Using 3D Touch," U.S. patent application Ser. No. 15/289,091, filed on Oct. 7, 2016, entitled "Suppression of Grip-Related Signals Using 3D Touch," and U.S. patent application Ser. No. 15/289,085, filed on Oct. 7, 2016, entitled "3D Touch Enabled Gestures," each of which is hereby incorporated by reference in its entirety.

TECHNICAL FIELD

The disclosed implementations relate generally to a touch detection device, including but not limited to methods and systems for integrating touch detection and force sensing in the touch detection device.

BACKGROUND

Touch screens that utilize capacitive sense arrays are widely applied in today's industrial and consumer product markets. Capacitive sense arrays can be found in cellular phones, GPS devices, set-top boxes, cameras, computer screens, MP3 players, digital tablets, and the like, replacing mechanical buttons, knobs, and other conventional user interface controls. A capacitive sense array is often disposed below a touch sensing surface of a touch screen, and includes an array of capacitive sense elements. Capacitances of these capacitive sense elements vary when an object (e.g., a finger, a hand, a stylus, or another object) comes into contact with or hovers above the touch sensing surface. A processing device coupled to the capacitive sense array then measures the capacitances of the capacitive sense elements and/or identifies capacitance variations of the capacitive sense elements for determining a touch or presence of the object associated with the touch sensing surface. The use of the capacitive sense array has offered a convenient and reliable user interface solution that is feasible under many harsh conditions, so capacitive sense arrays made of capacitive sense elements have been widely used in many industrial and consumer products.

Under some circumstances, touch locations cannot be determined from the capacitive sense arrays effectively and efficiently when one or more unwanted factors are involved in touch detection. For example, water present on the touch sensing surface can interfere with touch signals associated with normal touches. Finger temperature may also compromise touch signals associated with a touch of a finger. In some situations, false touches need to be suppressed when a user holds a touch sensing surface with a grip on or near an edge of the touch sensing surface or when touch signals are corrupted by noise. New touch sensing devices that overcome the detrimental impact from some or all of these unwanted factors are desirable.

SUMMARY

It is typical for systems that use capacitive touch-sensitive surfaces, such as touch screens, to be exposed to a variety of environmental factors that affect touch signal data, such as internal electrical noise, external electrical noise, temperature changes and humidity. These listed factors, and others not listed, impact the ability for the touch screen controller to correctly track the baseline (no-touch present) value of the capacitive touch array. In some implementations, the tracking of the baseline value for the capacitive touch sensor is improved by setting the baseline of a valid touch the moment a force value is present.

Although touch data can be compromised by a variety of environmental factors, using the signal data from a force sensor can resolve some of the issues. In some implementations, the tracking of the baseline value for a capacitive touch sensor is improved. In some implementations, the effect of temperature on the touch screen subsystem is reduced by using force sensor data. The touch data may also be compromised when switching between sensing modes, such as when going from a finger above the screen (hover) to a finger placed on a screen (touch). In some implementations, using the force value in conjunction with the touch location reduces the possibility of the controller continuing to report a hover signal after the finger has been placed on the screen.

Some touch enabled devices employ third party hardware to perform additional signal conditioning. Implementations that use force sensors for additional signal conditioning have the benefit of using hardware already available in 3D touch enabled devices.

In some situations, the signal and baseline levels for the capacitive touch sensors are temperature dependent, and by using force sensors, the dependence can be suppressed. The force sensors are typically in deeper layers of a touch system and thus are insulated against some environmental effects. Therefore, in accordance with some implementations, the force sensors are used to check against changes in the touch array. In some implementations, the force sensors are used to detect temperature changes and apply the compensation appropriate for the touch signal.

In addition, it is typical for systems that use a capacitive array of sensors for touch to have a wide set of features that improve the user experience. Many of these features benefit from having one or more force sensors integrated into the system. The combination of force sensors and capacitive touch sensors are sometimes referred to as 3D touch sensors.

In a typical touch screen system, a finger moving toward the screen may be detected as a hover, and continues to be incorrectly detected as a hover after it is placed on the screen. This incorrect behavior is common with small touch objects, or in systems with low signal levels. By distinguishing between a touch and a hover using force data, a "stuck hover" signal is eliminated from the system.

In addition, when the signal from a touch sensor is affected by the presence of water on the screen, it can incorrectly appear to be a touch object, and be reported as such. Also, users of devices are subject to many environmental factors that may cause them to wear gloves. The signal from a user wearing a glove is smaller than the signal from a normal finger and a small signal may be rejected. Another valid touch object that can be difficult to track and detect is a small finger or stylus due to its small signal. Furthermore, a system with various sources of electrical noise can cause false touches in a system, interfering with the user's interaction with the system. A touch-only capacitive system is susceptible to false touches when the device is exposed to any conductive objects unintentionally. Finally, the signal resulting from a user resting a palm on the device is unwanted in a system, but is difficult to reject.

3D touch data can be used to reject a false touch due to water on the screen since water has little-to-no measured force. Typically a glove signal has a larger footprint (X-Y size), but a small peak value due to the insulation between the touch screen and the finger inside. By using the force value from the 3D touch, the peak signal is effectively boosted, allowing more reliable glove finger detection and tracking. Unlike the signal from a finger inside a glove, a small finger or stylus has a small footprint (X-Y size), and a small peak signal. Unlike the glove finger, there is less data around the finger or stylus to help determine a valid touch. Using the additional force data allows a small finger or stylus to be more readily detected and tracked by using the force sensor data as a gain factor for the touch signals. By comparing noise events on the capacitive touch screen sensors and the force sensors, any noise injected by a touch object can be rejected, as the signal will be present in only the system directly exposed to the noise. The addition of touch qualification using data from the force sensor greatly improves rejection of these false or unintentional touches when unintentionally exposed to conductive objects. Fingers or stylus objects can be detected by the localized touch and force data, and data from the palm rejected.

In some implementations, 3D touch data is utilized to detect the presence of water on top of the capacitive touch screen, and distinguish it from a user touch on the touch screen. For example, a capacitive signal due to the presence of water on the touch surface can be rejected by using the force sensor data in conjunction with the capacitive touch sensor data.

In some implementations, the smaller signal from a finger inside an insulated glove is more easily identified by using the 3D touch data to apply a compensation factor to the touch sensor signals. Typically a glove signal has a larger footprint (X-Y size), but a small peak value due to the insulation between the touch screen and the finger inside. Utilizing the 3D touch data can effectively boost the peak signal, allowing more reliable gloved finger detection and tracking.

In some implementations, detection and tracking of small fingers or styli is improved by using 3D touch data. A small finger or stylus has a small footprint (X-Y size) and a small peak signal. And, unlike the gloved finger, there is less data around the finger or stylus to help determine a valid touch. Using the additional data from the force sensor enables a small finger or stylus to be more readily detected and tracked by using the force sensor data as a gain factor for the touch sensor signals.

In some implementations, noise rejection in the system, which can cause false touches, is reduced by using 3D touch data. For example, by comparing noise events on the capacitive touch screen sensors and the force sensors, any noise injected by a touch object is rejected. For example, when the signal is present only the capacitive touch sensors and not in the force sensors, the signal can sometimes be identified as noise.

In some implementations, the rejection of false or unintentional touches is improved using the 3D touch data. Since a touch-only capacitive system is susceptible to false touches when the device is exposed to any conductive objects (e.g., the inside of a pants pocket), the addition of touch qualification using data from the force sensors improve rejection of these false or unintentional touches.

In some implementations, the signal resulting from a user resting his/her palm on the device is rejected (palm rejection) by using the 3D touch sensor to detect the force resulting from a palm on the screen. For example, fingers, or stylus objects, are detected using localized touch and force data, and data from the palm is rejected (e.g., a palm can be identified by the large area of applied force).

Thus, touch devices that use a capacitive array of sensors greatly benefit from additional feature enhancements that are a direct result from implementing force sensors into the system. Accordingly, this disclosure covers, but is not limited to, improving water rejection, glove performance, small finger performance, noise rejection, false touch, palm rejection, and stylus performance.

In accordance with one aspect of the application, a method for detecting touch events on a touch sensing surface coupled to a capacitive sense array is performed at a processing device coupled to a capacitive sense array and one or more force electrodes. The capacitive sense array includes a plurality of sense electrodes. In some implementations, the one or more force electrodes are disposed below the capacitive sense array and separated from the capacitive sense array. The method includes obtaining a plurality of capacitive sense signals from the plurality of sense electrodes of the capacitive sense array, and in accordance with the plurality of capacitive sense signals and a plurality of baseline values, determining that a subset of sense electrodes are associated with a candidate touch. Each of the plurality of baseline values is associated with at least one of the plurality of sense electrodes. The method further includes obtaining one or more force signals from the one or more force electrodes. The method further includes, in accordance with a determination that force associated with the one or more force signals is below a predetermined force threshold: determining that the candidate touch is not a valid touch (e.g., associating the candidate touch with a water drop covering an area of the touch sensing surface corresponding to the subset of sense electrodes); and for each of the subset of sense electrodes of the capacitive sense array, adjusting a respective baseline value for determining subsequent touch events associated with the respective sense electrode according to one of the plurality of capacitive sense signals associated with the respective sense electrode.

In yet another aspect of the application, a method for detecting touch events on a touch sensing surface coupled to a capacitive sense array is performed at a processing device coupled to a capacitive sense array and one or more force electrodes. The capacitive sense array includes a plurality of sense electrodes. In some implementations, the one or more force electrodes are disposed below the capacitive sense array and separated from the capacitive sense array. The method includes obtaining a plurality of capacitive sense signals from the plurality of sense electrodes of the capacitive sense array, and in accordance with the plurality of capacitive sense signals, detecting one or more candidate touches on the touch sensing surface. The one or more candidate touches include a first candidate touch. The method further includes obtaining one or more force signals from the one or more force electrodes. The method further includes determining that force associated with the one or more force signals is associated with a grip on an edge area of the touch sensing surface. The method further includes in accordance with a determination that force associated with the one or more force signals is associated with a grip on an edge area of the touch sensing surface: associating the first candidate touch with the grip on the edge area of the touch sensing surface, and designating the first candidate touch as not a valid touch.

In yet another aspect of the application, a method for detecting touch events on a touch sensing surface coupled to a capacitive sense array is performed at a processing device coupled to a capacitive sense array and one or more force electrodes. The capacitive sense array includes a plurality of sense electrodes. In some implementations, the one or more force electrodes are disposed below the capacitive sense array and separated from the capacitive sense array. The method includes performing a plurality of scan cycles. For each of the plurality of scan cycles, the method obtains a plurality of capacitive sense signals from the plurality of sense electrodes of the capacitive sense array, and obtains one or more force signals from the one or more force electrodes. The method further includes determining a temporal sequence of touches on the touch sensing surface based on the plurality of capacitive sense signals and the one or more force signals obtained from the plurality of scan cycles. For each touch of the temporal sequence of touches, a touch location is determined on the touch sensing surface based on the plurality of capacitive sense signals, and a force value associated with force applied at the touch location is determined based on the one or more force signals. The method further includes identifying a gesture associated with the temporal sequence of touches based on the touch location and the force value for each touch of the temporal sequence of touches.

In yet another aspect of the application, a method for detecting touch events on a touch sensing surface coupled to a capacitive sense array is performed at a processing device coupled to a capacitive sense array and one or more force electrodes. The capacitive sense array includes a plurality of sense electrodes. In some implementations, the one or more force electrodes are disposed below the capacitive sense array and separated from the capacitive sense array. The method includes obtaining a plurality of capacitive sense signals from the plurality of sense electrodes of the capacitive sense array, and in accordance with the plurality of capacitive sense signals, determining one or more candidate touches on the touch sensing surface. The method further includes determining an expected force shape based on the one or more candidate touches. The method further includes obtaining one or more force signals from the one or more force electrodes, and in accordance with the one or more force signals, determining an actual force shape caused on the touch sensing surface by the one or more candidate touches. The method further includes comparing the actual force shape to the expected force shape to determine a magnitude of force associated with each of the one or more touch candidates, including determining whether each of the one or more candidate touches is a valid touch.

In accordance with another aspect of the application, a processing device includes a processing core, a capacitance sense circuit, and memory (e.g., both volatile and non-volatile memory). The memory stores one or more programs configured for execution by the processing core. The one or more programs comprise instructions for implementing any of the methods described herein (e.g., for detecting touch events on a touch sensing surface).

In accordance with another aspect of the application, an electronic system includes a capacitive sense array coupled to a touch sensing surface, one or more force electrodes, and a processing device coupled to the capacitive sense array. In some implementations, the one or more force electrodes are disposed below the capacitive sense array and separated from the capacitive sense array. The processing device is configured to implement any of the methods described herein for detecting touch events on the touch sensing surface.

Thus, devices, storage media, and computing systems are provided with methods for detecting touches on a touch-sensitive surface (also called touch sensing surfaces), thereby increasing the effectiveness, efficiency, and user satisfaction with such systems. Such methods may complement or replace conventional methods for detecting touches on touch-sensitive surfaces.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 2A illustrates an example touch screen assembly that includes a capacitive sense array.

FIG. 2B illustrates an example touch screen assembly that includes a capacitive sense array and two conductive layers that are associated with one or more force electrodes in accordance with some implementations.

FIG. 3A illustrates a solid diamond pattern used to form a capacitive sense array or an array of force electrodes in accordance with some implementations, and FIG. 3B illustrates an example orthogonal electrode matrix used to form a capacitive sense array or an array of force electrodes in accordance with some implementations.

FIGS. 4A-4C illustrate example electronic touch sensing systems using a single force electrode, a column of force electrodes, and a two-dimensional (2D) array of force electrodes in accordance with some implementations.

FIGS. 6A and 6B are two example capacitance sense circuits, each of which is configured to measure both capacitive sense signals and force signals during capacitive sense and force scans in accordance with some implementations.

FIGS. 10A-10H provide examples of touch detection and rejection on a touch surface, in accordance with some implementations.

FIGS. 15A and 15B provide a flowchart of a method of detecting touch events on a touch sensing surface coupled to a capacitive array, in accordance with some implementations.

FIGS. 18A and 18B provide a flowchart of a method of detecting touch events on a touch sensing surface coupled to a capacitive array based on a touch profile and a force shape, in accordance with some implementations.

FIG. 21 provides a flowchart of a method of suppressing signals caused by a grip during the course of detecting touch events on a touch sensing surface coupled to a capacitive array, in accordance with some implementations.

FIG. 23 provides a flowchart of a method of detecting a gesture on a touch sensing surface, in accordance with some implementations.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

There is a need for a touch detection system that implements more effective methods for suppressing the impact from some unwanted factors (e.g., water on a touch sensing surface, temperature variation of an object, a palm touch, a grip on an edge of the touch sensing surface, and various noise sources). Disclosed herein are touch detection devices, which include at least a touch sensing electrode layer and a conductive layer that provide a plurality of force electrodes. In some implementations, the force electrodes are disposed below and separated from the plurality of sense electrodes. The one or more force electrodes provide one or more force signals. The one or more force signals complement capacitive sense signals measured from the sense electrodes, and are used to suppress the impact from unwanted factors to touches detected from the capacitive sense signals. In some implementations, the one or more force signals provide additional parameters related to the touches detected from the capacitive sense signals in addition to touch locations identified based on the capacitive sense signals, and enables more complicated gesture detection than those associated solely with the touch locations.

Figure 1A:
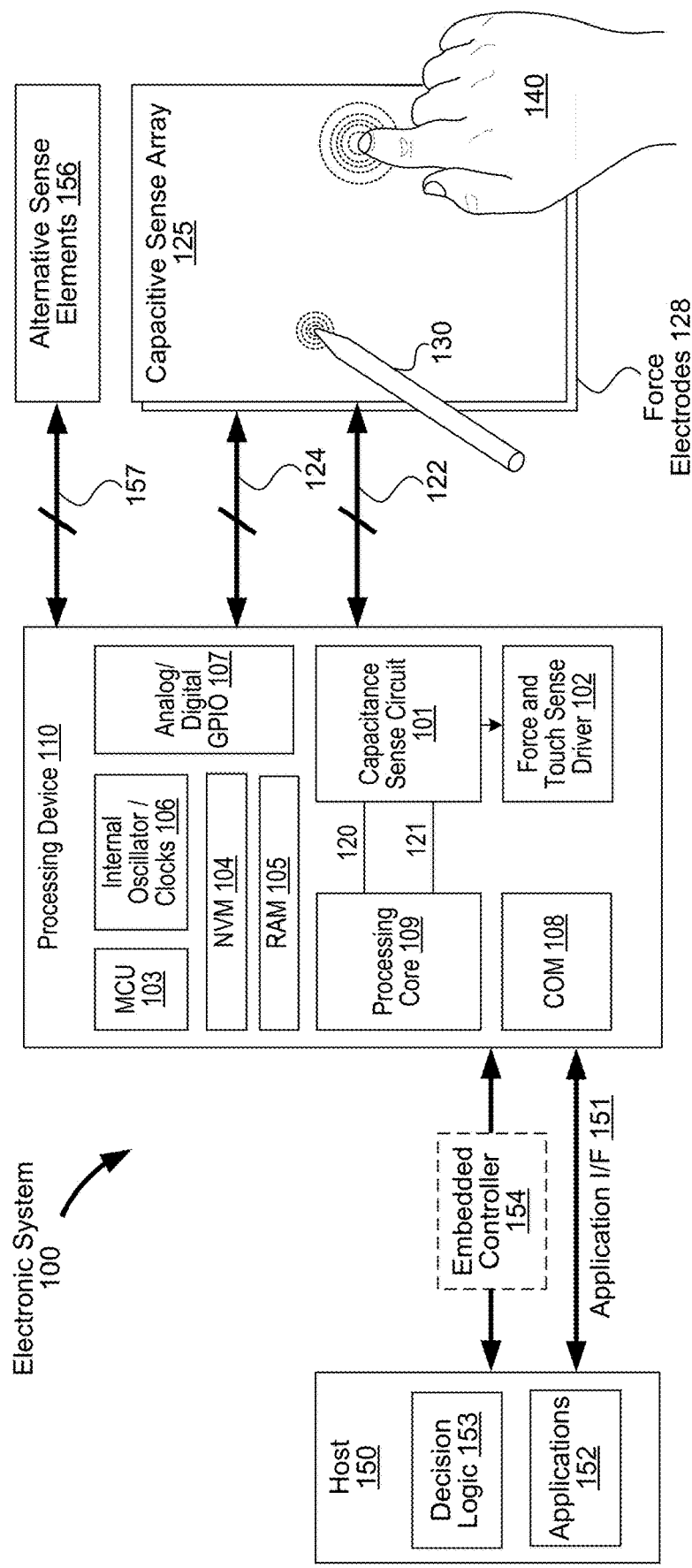
FIG. 1A is a block diagram illustrating an electronic system having a processing device that processes capacitive sense signals and force signals in accordance with some implementations.

FIG. 1A is a block diagram illustrating an electronic system 100 having a processing device 110 that processes capacitive sense signals and force signals in accordance with some implementations. The processing device 110 is configured to detect one or more touches proximate to a touch sensing device, such as capacitive sense array 125. The processing device 110 can detect conductive objects, such as touch objects 140 (a finger), a passive or active stylus 130, or any combination thereof. The capacitance sense circuit 101 can measure touch data created by a touch using the capacitive sense array 125. The touch may be detected by a single or multiple sensing cells, each cell representing an isolated sense element or an intersection of sense elements (e.g., electrodes) of the capacitive sense array 125. In some implementations, when the capacitance sense circuit 101 measures mutual capacitance of the touch sensing device (e.g., using capacitive sense array 125), the processing device 110 acquires a two dimensional capacitive image of the touch sensing object and processes the capacitive image data for peaks and positional information. In some implementations, the processing device 110 is coupled to a microcontroller (e.g., an external host device 150) that obtains a capacitance touch signal data set from capacitive sense array 125. In some implementations, finger detection firmware executing on the microcontroller identifies data set areas that indicate touches, detects and processes peaks, calculates the coordinates, or any combination thereof. The microcontroller can report the precise coordinates and other information to an application processor.

In some implementations, the electronic system 100 includes a processing device 110, a capacitive sense array 125, a stylus 130, and a host 150. The capacitive sense array 125 may include capacitive sense elements that are electrodes made of conductive material, such as copper. The sense elements may also be part of an indium-tin-oxide (ITO) panel (sometimes referred to a VCOM). The capacitive sense elements can be used to allow the capacitance sense circuit 101 to measure self-capacitance, mutual capacitance, or any combination thereof. In the depicted embodiment, the electronic system 100 includes the capacitive sense array 125 coupled to the processing device 110 via a bus 122, and the capacitive sense array 125 is configured to provide capacitive sense signals to the processing device via the bus 122. The capacitive sense array 125 may include a multi-dimension capacitive sense array. In some implementations, the multi-dimension sense array includes multiple sense elements, organized as rows and columns. In some implementations, the capacitive sense array 125 is a non-transparent capacitive sense array (e.g., PC touchpad). The capacitive sense array 125 may be disposed to have a flat surface profile. In some implementations, the capacitive sense array 125 may have a non-flat surface profile. In some implementations, other configurations of capacitive sense arrays are be used. For example, instead of vertical columns and horizontal rows, the capacitive sense array 125 may have a hexagon arrangement, or the like, as would be appreciated by one of ordinary skill in the art having the benefit of this disclosure. In some implementations, the capacitive sense array 125 may be included in an ITO panel or a touch screen panel. More details on a capacitive sense array 125 are explained below with reference to FIGS. 2A-2B and 3A-3B.

In accordance with some implementations, the electronic system 100 further includes one or more force electrodes 128 that are disposed below the capacitive sense array 125 and separated from the capacitive sense array 125. The one or more force electrodes 128 are electrically coupled to the processing device 110 via a bus 124, and are configured to provide force signals to the processing device 110 via the bus 124 for determining force associated with candidate touches detected from the capacitive sense array 125. In some implementations, the force signals are measured from capacitance variation associated with the one or more force electrodes 128. However, the term "capacitive sense array" is used to refer to an electrode array 125 disposed above the force electrodes 128 and used to identify candidate touches on a touch sensing surface (also called a touch-sensitive surface) of a touch sensing device. The term "force electrode" refers to an electrode used to detect force applied on the touch sensing surface in association with the candidate touches.

The operations and configurations of the processing device 110 and the capacitive sense array 125 for detecting and tracking a touch object 140 or a stylus 130 are described herein. In short, the processing device 110 is configurable to detect a presence of a touch object 140, a presence of a stylus 130 on the capacitive sense array 125, or any combination thereof. If the touching object is an active stylus, in some implementations, the active stylus 130 is configured to operate as the timing "master," and the processing device 110 adjusts the timing of the capacitive sense array 125 to match that of the active stylus 130. In some implementations, the capacitive sense array 125 capacitively couples with the active stylus 130, as opposed to conventional inductive stylus applications. It should also be noted that the same assembly (e.g., the processing device 110) used for the capacitive sense array 125, which is configured to detect touch objects 140, is also used to detect and track a stylus 130 without an additional PCB layer for inductively tracking the active stylus 130.

In some implementations, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). In some implementations, the digital block array is configured to implement a variety of digital logic circuits (e.g., DACs, digital filters, or digital control systems) using configurable user modules ("UMs"). The digital block array may be coupled to a system bus. The processing device 110 may also include memory, such as random access memory ("RAM") 105 and non-volatile memory ("NVM") 104. RAM 105 may be static RAM ("SRAM"). The non-volatile memory 104 may be a flash memory, which may be used to store firmware (e.g., control algorithms executable by processing core 109 to implement operations described herein). The processing device 110 may also include a memory controller unit ("MCU") 103 coupled to memory and the processing core 109. The processing core 109 is a processing element configured to execute instructions or perform operations. The processing device 110 may include other processing elements as would be appreciated by one of ordinary skill in the art having the benefit of this disclosure. It should also be noted that the memory may be internal to the processing device 110 or external to it. In the case of the memory being internal, the memory may be coupled to a processing element, such as the processing core 109. In the case of the memory being external to the processing device 110, the processing device 110 is coupled to the other device in which the memory resides as would be appreciated by one of ordinary skill in the art having the benefit of this disclosure.

Some or all of the operations of the processing core 109 may be implemented in firmware, hardware, software, or some combination thereof. The processing core 109 may receive signals from the capacitance sense circuit 101, determine the state of the capacitive sense array 125 (e.g., determining whether an object is detected on or in proximity to the touch sensing surface), resolve where the object is on the sense array (e.g., determining the location of the object), track the motion of the object, or generate other information related to an object detected at the touch sensor. In some implementations, the processing device 110 further includes a force and touch sense driver 102 coupled to the capacitance sense circuit 101. The force and touch sense driver 102 functions in conjunction with the processing core 109, and is configured to implement part or all of the above touch detection functions of the processing core 109. In some implementations, the processing core 109 includes a capacitance sense circuit 101. In some implementations, the processing core 109 performs some or all the functions of capacitance sense circuit 101. Likewise, the force and touch sense driver 102 may include part or all of the capacitance sense circuit 101, and perform some or all the functions of capacitance sense circuit 101.

In some implementations, the processing core 109 generates a multi-touch enable signal 120 and a touch force enable signal 121 that are synchronized to control the capacitance sensing circuit 101 to detect touch locations and measure force associated with the touch locations, respectively. The multi-touch enable signal 120 is used to enable a touch sensing state. In the touch sensing state, the one or more force electrodes 128 are decoupled from any electrical source (e.g., the ground), and self or mutual capacitance of sense electrodes of the capacitive sense array 125 is scanned. One or more touch locations are thereby detected if one or more objects touch the touch sensing surface of the electronic system 100. In some implementations, the touch force enable signal 121 is used to enable a force sensing state. In the force sensing state, self or mutual capacitance of the one or more force electrodes 128 is measured to determine force associated with detected touch events. It is noted that the multi-touch enable signal 120 and the touch force enable signal 121 can be enabled sequentially or simultaneously. More details on sequential touch and force detection are explained with reference to FIGS. 5 and 6A, and more details on simultaneous touch and force detection are explained with reference to FIG. 6B.

The processing device 110 may also include an analog block array (not shown) (e.g., field-programmable analog array). The analog block array is also coupled to the system bus. An analog block array may be configured to implement a variety of analog circuits (e.g., ADCs or analog filters) using, in some implementations, configurable UMs. The analog block array may also be coupled to the GPIO 107.

In some implementations, the capacitance sense circuit 101 is integrated into the processing device 110. The capacitance sense circuit 101 includes analog I/O for coupling to an external component, such as a touch-sensor pad (not shown), a capacitive sense array 125, a touch-sensor slider (not shown), a touch-sensor buttons (not shown), and/or other devices. The capacitance sense circuit 101 may be configured to measure capacitance using mutual-capacitance sensing techniques, self-capacitance sensing technique, charge-coupling techniques, charge balancing techniques, or the like. In some implementations, the capacitance sense circuit 101 operates using a charge accumulation circuit, a capacitance modulation circuit, or other capacitance sensing methods known by those skilled in the art. In some implementations, other capacitance sensing circuits may be used. The mutual capacitive sense arrays, or touch screens, as described herein, may include a transparent, conductive sense array disposed on, in, or under either a visual display itself (e.g. LCD monitor), or a transparent substrate in front of the display.

A capacitive sense array 125 includes a plurality of sense electrodes. When a touch object, such as a finger or stylus, approaches the capacitive sense array 125, the object causes a decrease in mutual capacitance between some of the sense electrodes. In some implementations, the presence of a finger increases the capacitance of the electrodes to the environment (Earth) ground, typically referred to as self-capacitance change. In some implementations, the plurality of sense electrodes of the capacitive sense array 125 are configured to operate as transmit (TX) electrodes and receive (RX) electrodes of a mutual capacitive sense array in a first mode to detect touch objects, and to operate as electrodes of a coupled-charge receiver in a second mode to detect a stylus on the same electrodes of the sense array.

Specifically, in the first mode, a mutual capacitance is measured at an intersection of a RX electrode and a TX electrode when a transmit signal provided at the RX electrode is coupled to the TX electrode. Utilizing the change in mutual capacitance, the location of the finger on the capacitive sense array 125 is determined by identifying an RX electrode having a decreased coupling capacitance with a TX electrode whose signal was applied at the time the decreased capacitance is measured on the RX electrode. Therefore, the locations of one or more touch objects can be determined by sequentially scanning the capacitances associated with the intersection of electrodes. In some implementations, in the second mode, the stylus 130 is activated to generate a stylus transmit signal, which is then coupled to a subset of sense electrodes of the capacitive sense array 125 that is located below the stylus 130.

In some implementations, the processing device 110 calibrates the sense elements (intersections of RX and TX electrodes) by determining baselines for the sense elements. In some implementations, interpolation is used to detect finger position at better resolutions than a spatial pitch of the sense electrodes of the capacitive sense array 125, and various types of coordinate interpolation algorithms are optionally used to detect a center location of a touch.

The processing device 110 may include internal oscillator/clocks 106 and a communication block ("COM") 108. In some implementations, the processing device 110 includes a spread-spectrum clock (not shown). The oscillator/clocks 106 provides clock signals to one or more of the components of processing device 110. The communication block 108 may be used to communicate with an external component, such as an application processor 150, via an application interface ("I/F") line 151. In some implementations, the processing device 110 may also be coupled to an embedded controller 154 to communicate with the external components, such as a host 150. In some implementations, the processing device 110 is configured to communicate with the embedded controller 154 or the host 150 to send and/or receive data.

The processing device 110 may reside on a common carrier substrate such as, for example, an integrated circuit ("IC") die substrate, a multi-chip module substrate, or the like. In some implementations, the components of the processing device 110 may be one or more separate integrated circuits and/or discrete components. In some implementations, the processing device 110 may be one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It is also noted that the implementations described herein are not limited to having a configuration of a processing device coupled to an application processor, but may include a system that measures the capacitance on the sensing device and sends the raw data to a host computer 150 where it is analyzed by an application. In effect, the processing that is done by the processing device 110 may also be done in the application processor. Specifically, in some implementations, instead of performing the operations of the processing core 109 in the processing device 110, the processing device 110 may send the raw data or partially-processed data to the host 150. The host 150, as illustrated in FIG. 1, may include decision logic 153 that performs some or all of the operations of the processing core 109. Operations of the decision logic 153 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing core 109 may be implemented in the decision logic 153, the applications 152, or in other hardware, software, and/or firmware external to the processing device 110. In some other embodiments, the processing device 110 is the host 150.

The capacitance sense circuit 101 may be integrated into the IC of the processing device 110, or in a separate IC. In some implementations, descriptions of capacitance sense circuit 101 may be generated and compiled for incorporation into other integrated circuits. For example, behavioral level code describing the capacitance sense circuit 101, or portions thereof, may be generated using a hardware descriptive language, such as VHDL or Verilog, and stored to a machine-accessible medium (e.g., CD-ROM, hard disk, floppy disk, or flash memory). Furthermore, the behavioral level code can be compiled into register transfer level ("RTL") code, a netlist, or a circuit layout and stored to a machine-accessible medium. The behavioral level code, the RTL code, the netlist, and the circuit layout may represent various levels of abstraction to describe the capacitance sense circuit 101.

It is noted that the components of the electronic system 100 may include all the components described above. In some implementations, the electronic system 100 includes fewer than all of the components described above.

In some implementations, the electronic system 100 is used in a tablet computer. In some implementations, the electronic device is used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. The embodiments described herein are not limited to touch screens or touch-sensor pads for notebook implementations. Implementations can be used in other capacitive sensing devices, such as a touch-sensor slider (not shown) or touch-sensor buttons (e.g., capacitance sensing buttons). In some implementations, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these capacitive sensing implementations may be used in conjunction with non-capacitive sensing elements, including but not limited to pick buttons, sliders (e.g., display brightness and contrast), scroll-wheels, multi-media control (e.g., volume, track advance), handwriting recognition, and numeric keypad operation.

In some implementations, the electronic system 100 further includes one or more alternative sense elements 156 configured to communicate with the processing device 110 via a bus 157. Each alternative sense element 156 is optionally a capacitance based sensor or a non-capacitance sensor. Example alternative sense elements 156 include, but are not limited to, an ambient light sensor, a capacitive touch button, and a side touch sensor.

Figure 1B:
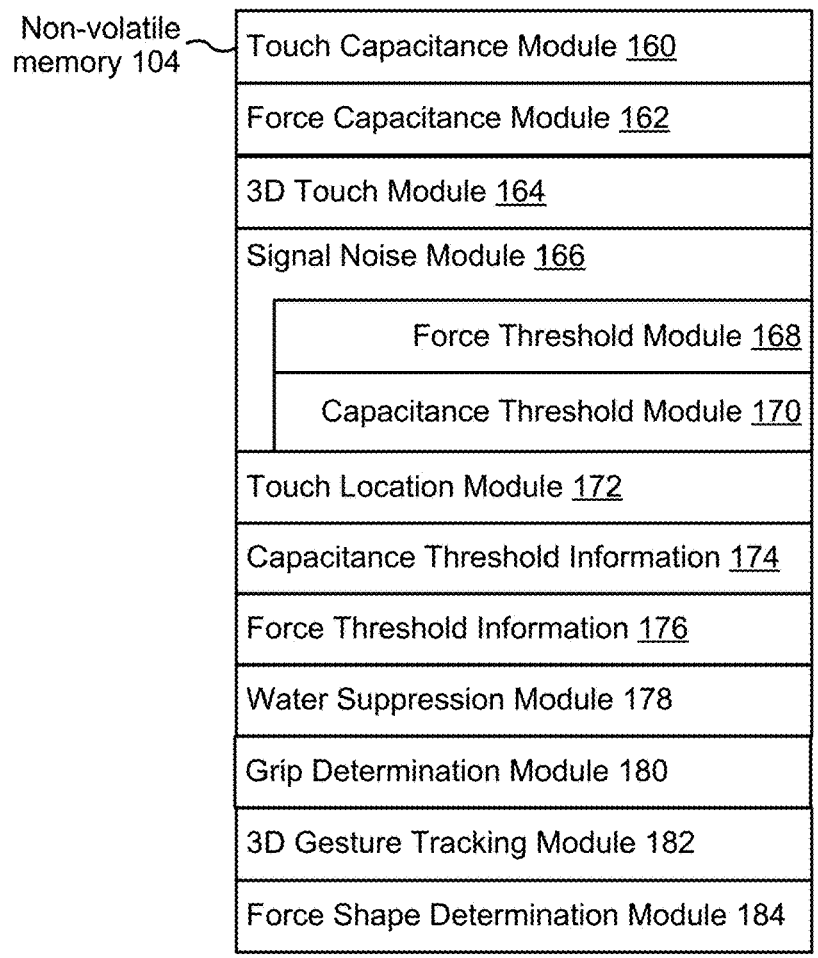
FIGS. 1B and 1C illustrate various modules and data structures used in some implementations.
Figure 1C:
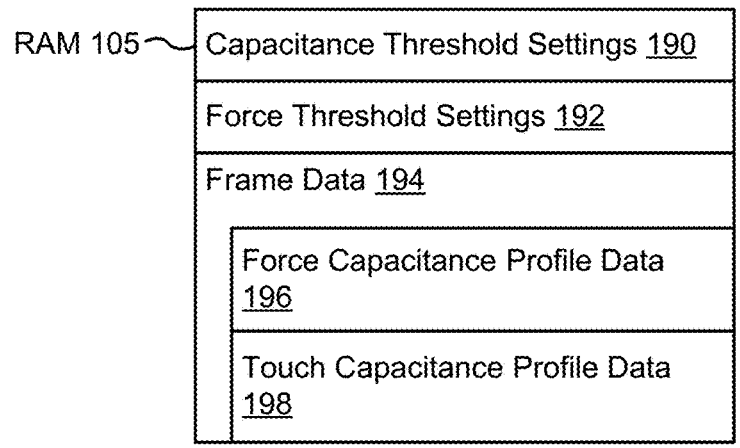

FIGS. 1B and 1C illustrate various modules and data structures used in some implementations. The non-volatile memory (NVM) 104 of FIG. 1B optionally includes one or more magnetic disk storage devices, one or more optical disk storage devices, one or more flash memory devices, and/or one or more other non-volatile solid state storage devices. In some implementations, the NVM 104 includes a non-transitory computer-readable storage medium. In some implementations, the NVM 104, or the non-transitory computer-readable storage medium of NVM 104, stores the following programs, modules, and data structures, or a subset or superset thereof:

- a touch capacitance module 160 for analyzing touch capacitance signals from a capacitive sense array, such as the capacitive sense array 125;
- a force capacitance module 162 for analyzing force capacitance signals from one or more force electrodes, such as the force electrodes 128;
- a 3D touch module 164 for comparing and/or analyzing touch capacitance data and force capacitance data;
- a signal noise module 166 for analyzing signal noise and/or adjusting operating settings based on signal noise. The signal noise module may include:
  - a force threshold module 168 for setting and/or adjusting a force capacitance threshold, such as the detection threshold 908 in FIG. 9A; and
  - a touch capacitance threshold module 170 for setting and/or adjusting a touch capacitance threshold, such as the detection threshold 904 in FIG. 9A;
- a touch location module 172 for determining the location of touch inputs on a touch-sensitive surface, such as touch-sensitive surface 902 in FIG. 9A;
- capacitance threshold information 174 for storing and managing touch capacitance threshold data, such a plurality of predetermined threshold values and/or one or more predetermined threshold adjustment increments;
- force threshold information 176 for storing and managing force capacitance threshold data, such a plurality of predetermined threshold values and/or one or more predetermined threshold adjustment increments;
- a water suppression module 178 for associating a candidate touch with a water drop covering an area of a touch sensing surface and compensating for the impact of the water drop (e.g., by adjusting baselines associated with capacitive sense elements covered by the water drop);
- a grip determination module 180 for associating a candidate touch with a grip on the edge area and suppressing it as an invalid touch;
- a three-dimension (3D) gesture tracking module 182 for identifying a gesture associated with a sequence of touches based on locations and force parameters for each touch of the sequence of touches; and
- a force shape determination module 184 for determining a force shape based on force signals and comparing the force shape and a touch profile to determine whether each of a plurality of candidate touches is a valid touch.

The RAM 105 in FIG. 1C optionally includes high-speed random access memory, such as DRAM, SRAM, DDR SRAM, or other random access solid state memory devices.

In some implementations, the RAM 105 stores the following data structures, or a subset or superset thereof:
- capacitance threshold settings 190 for storing operational touch capacitance threshold settings information;
- force threshold settings 192 for storing operational force capacitance threshold settings information; and
- frame data 194 for storing one or more frames of capacitance (e.g., self capacitance and/or mutual capacitance) data and force data, including but not limited to:
  - force capacitance profile data 196 for storing one or more force profiles or shapes (e.g., for use in comparing with touch capacitance data); and
  - touch capacitance profile data 198 for storing one or more touch profiles (e.g., for use in comparing with force capacitance data).

Each of the above identified modules corresponds to a set of instructions for performing a function described above. The above-identified modules or programs (i.e., sets of instructions) need not be implemented as separate software programs, procedures, or modules, and thus various subsets of these modules may be combined or otherwise rearranged in various implementations. In some implementations, the NVM 104 and/or the RAM 105 store a subset of the modules and data structures identified above. Furthermore, the NVM 104 and/or the RAM 105 may store additional modules and/or data structures not described above.

FIG. 2A illustrates an example touch screen assembly 200 that includes a capacitive sense array 125. The touch screen assembly 200 includes a liquid crystal display (LCD) 202 overlaid by the glass 204. A sensor pattern 206 is constructed on a surface of the glass 204 to form the capacitive sense array 125. Optionally, as shown in FIG. 2A, the sensor pattern 206 is constructed on a top surface of the glass 204 that faces away from the LCD 202. Optionally, the sensor pattern 206 is constructed on a bottom surface of the glass 204 that faces the LCD 202. Optically clear adhesive (OCA) 208 is used to bond a top glass 210 to the surface of the glass 204 on which the sensor pattern 206 is constructed, thus protecting the sensor pattern 206.

Optionally, the sensor pattern 206 is a diamond pattern (FIG. 3A) or a row-column pattern (FIG. 3B). The capacitive sense array 125 formed from the sensor pattern 206 includes row and column sense electrodes that can be expressed as a matrix of the intersections between row and column electrodes. In some implementations, the row and column sense electrodes are formed on two conductive layers that are electrically insulated from each other, and both of the conductive layers are formed on one of the top or bottom surfaces of the glass 206. The resolution of the capacitive sense array 125 is represented as the product of the number of columns and the number of rows. For example, when a capacitive sense array 125 has N row electrodes and M column electrodes, the number of intersections is N×M, and the resolution of the capacitive sense array 125 is N×M as well.

FIG. 2B illustrates an example touch screen assembly 250 that includes a capacitive sense array and two conductive layers 212 and 214 associated with one or more force electrodes 128 in accordance with some implementations. The two conductive layers 212 and 214 are formed below the top glass 210, the OCA 208, the glass 204 supporting the capacitive sense array 125, and the LCD 202. The two conductive layers are separated from each other by a compressible gap (e.g., an air gap 216) having a thickness that varies in response to a force applied on a touch sensing surface formed on the top glass 210. A top conductive layer 212 is disposed above the compressive gap, and a bottom conductive layer 214 is disposed below the compressible gap.

In some implementations, the top conductive layer 212 is patterned to provide one or more force electrodes 128, and the bottom conductive layer 214 is electrically coupled to a ground. The one or more force electrodes 128 and the capacitive sense array 125 are therefore disposed on one side of the compressible gap. In some implementations, the bottom conductive layer 214 is patterned to provide the one or more force electrodes 128, and the top conductive layer 212 is electrically coupled to a ground. The one or more force electrodes 128 and the capacitive sense array 125 are therefore disposed on two distinct sides of the compressible gap. When the top or bottom conductive layer is used to provide the force electrodes 128, self capacitance measured between the force electrodes 128 and the ground is monitored to determine force applied on the touch sensing surface formed on the top glass 210.

In some implementations, both the top and bottom conductive layers 212 and 214 are patterned to form the one or more force electrodes 128. Mutual capacitance between two force electrodes respectively disposed on the top and bottom conductive layers 212 and 214 is monitored to determine force applied on the touch sensing surface formed on the top glass 210.

The LCD 202 is electrically coupled to a thin film transistor (TFT) array and a backlight diffuser that are disposed below the LCD 202. The TFT array is configured to drive the LCD 202 electrically, and the backlight diffuser is configured to provide substantially uniform illumination to the LCD 202. In some implementations, the top and bottom conductive layers 212 and 214 are both disposed under the combination of the LCD 202, the TFT array, and the backlight diffuser. In some implementations, the top conductive layer 212 is integrated into the TFT array, and separated from the bottom conductive layer 214 by the compressible gap, the backlight diffuser, and part of the TFT array. In some implementations, the top conductive layer 212 is coated on a first stand-alone substrate. The first stand-alone substrate is optionally disposed above or below the backlight diffuser, and separated from the bottom conductive layer 214 by at least the compressible gap. In this situation, the bottom conductive layer 214 is optionally coated on the backlight diffuser that is separated from the top conductive layer 212 by the compressible gap, or coated on a second stand-alone substrate that may be disposed above or below the backlight diffuser. It is noted that the top and bottom conductive layers 212 and 214 are made of transparent conductive materials (e.g., indium tin oxide (ITO)) when they are disposed between the backlight diffuser and the LCD 202 (i.e., in a light path of the substantially uniform illumination provided to the LCD 202).

The touch sensing portion is above the LCD layer and forms the capacitive sense array 125. In some implementations, each electrode layer can be used independently to measure the self-capacitance between the electrode and (Earth or system) ground to form a capacitive sense array 125. The touch electrodes can be in the same layer or on separate layers. In some implementations, the Pixel electrodes in LCD layer 202 can be used as electrodes for capacitive measurement to (Earth or system) ground and form a capacitive sense array 125. In some implementations, the conductive routing to circuitry operating the LCD can be used as electrodes for capacitive measurement to (Earth or system) ground and form a capacitive sense array 125.

FIG. 2B is a perspective view of a touch screen assembly, including a plurality of structural layers and an air gap or otherwise compressible layer 216 of a predetermined thickness along with an additional or existing electrode layer 128 suitable for enabling quantitative measurement of touch force associated a touch event caused by a conductive or non-conductive object. The air gap or compressible layer form what is known to those skilled in the art as an effective air gap. This arrangement of a compressible layer and electrodes is in accordance with some implementations for measuring the pressure or force associated with a touch on the capacitive array. In some implementations, the predetermined thickness of the air gap is within a range of 0.1-3 mm. In some implementations, the air gap is replaced or augmented with a layer of resistive and compressible material to form the effective air gap. The height of the air gap 216 or effective air cap changes as force is applied to the touch sensing stack 250 (causing deflection of the stack 250), which is reflected in corresponding changes in capacitance measured at electrodes with locations near the x-y position of the applied force. In some implementations, the air gap or effective air gap may not be uniform across the layer and may vary across the sense array. The force electrode layer 128 includes at least one force electrode. Optionally, one of the conductive layers 212 or 214 includes the array of force electrodes.

The capacitive sense array 125 may measure the capacitance between electrode elements (mutual capacitance), the capacitance between electrodes and Earth or system ground (self capacitance), or the capacitance between layers of electrodes, or any combination of these sensing methods.

The touch sensing stack may also be formed using one or more of the at least one pixel electrode layers in the LCD layer 202.

In some implementations, the presence of a finger increases the capacitance of the electrodes relative to the environment (Earth or system) ground, typically referred to as self-capacitance change.

The capacitive touch-sensing system 250 includes a sense array 125. The sense array 125 may be a capacitive-sense array. The sense array 125 may include multiple row electrodes and multiple column electrodes, or multiple sense electrodes as an array or matrix of sensing pads, not shown in FIG. 2B. The electrodes and/or an array or matrix of sensing pads are connected to a processing device 110, which may include the functionality of the capacitance-sensing circuit 101, as illustrated above in FIG. 1A.

Other implementations of force measurement place the force sensing electrodes 128 above the compressible layer 216. In some implementations, the compressible layer may be between the TFT glass layer and the back light. In some implementations, one or more of the pixel electrodes of the LCD layer 202 may be used as the force sensing electrodes. In some implementations, the compressible layer 216 may be between the LCD 202 and the touch sensing stack (e.g., layers 204-210). In some implementations, the compressible layer 216 may be in the touch sensing stack between electrode layers. Other implementations utilize other configurations for measuring the applied force at a touch location FIG. 3A illustrates a solid diamond pattern 300 used to form a capacitive sense array 125 or force electrodes 128 in accordance with some implementations. FIG. 3B illustrates an example orthogonal electrode matrix 350 used to form a capacitive sense array 125 or force electrodes 128 in accordance with some implementations. When the solid diamond pattern 300 or the orthogonal electrode matrix 350 is applied in a capacitive sense array 125, the capacitive sense array 125 includes a plurality of row sense electrodes 301-310 and a plurality of column sense electrodes 311-318. The row and column sense electrodes 301-318 are connected to a processing device 110 (which may include the functionality of a capacitance sensing circuit 101) by the bus 122, and configured to provide capacitive sense signals to the processing device 110. In some implementations, the processing device 110 may perform TX-RX scans of the capacitive sense array 125 to measure a mutual capacitance value associated with each of the intersections between a row sense electrode and a column sense electrode in the capacitive sense array 125. The measured mutual capacitances are further processed at the processing device or at a host 150 to determine higher resolution locations of one or more contacts on the capacitive sense array 125.

Similarly, in some implementations, either the dual solid diamond pattern 300 or the orthogonal electrode matrix 350 is used for the one or more force electrodes 128. The plurality of row sense electrodes 301-310 and the plurality of column sense electrodes 311-318 are separately formed on the top and bottom conductive layers 212 and 214. The row and column sense electrodes 301-318 are connected to a processing device 110 (which may include the functionality of a capacitance sensing circuit 101), and configured to provide force signals to the processing device 110. Here, the processing device 110 is configured to perform TX-RX scans of the force electrodes 128 to measure a mutual capacitance value associated with each of the intersections between a row sense electrode and a column sense electrode in the force electrodes 128. The measured mutual capacitances are further processed in the processing device or a host 150 to determine force and/or a force shape associated with the contacts detected at the touch sensing surface of the capacitive sense array 125.

Referring to FIG. 3A, the electrodes of the capacitive sense array 125 or the one or more force electrodes 128 form a single solid diamond (SSD) pattern. In some implementations, each intersection between a row electrode and a column electrode defines a unit cell. Each point within the unit cell is closer to the associated intersection than to any other intersection. For example, the unit cell 320 contains the points that are closest to the intersection between the row electrode 304 and the column electrode 316.

In some implementations, a capacitive touch sensing system may collect data from the entire touch sensing surface of sense array 125 by performing a scan to measure capacitances of the unit cells in the touch sensing surface, then process the touch data serially or in parallel with a subsequent scan. For example, a system that processes touch data serially may collect raw capacitance data from each unit cell of the entire touch sensing surface, and filter the raw data. Based on the filtered raw data, the system may determine local maxima (corresponding to local maximum changes in capacitance) to calculate positions of fingers or other conductive objects, then perform post processing of the resolved positions to report locations of the conductive objects, or to perform other functions such as motion tracking or gesture recognition. In some implementations, the capacitive touch sensing system may perform mutual capacitance sensing of the touch sensing surface (e.g., sense array 125) by individually sensing each intersection between a row electrode and a column electrode. Thus, a total number of sense operations for a capacitive sense array (e.g., sense array 125) having X rows and Y columns is X×Y. In some implementations, performing a mutual capacitance measurement of a unit cell formed at the intersection of a row electrode and a column electrode includes applying a signal (TX) to one electrode and measuring characteristics of the signal on another electrode resulting from the capacitive coupling between the electrodes.

It is noted that the above mutual capacitance measurement and scan can be applied to the one or more force electrodes 128 when they are arranged in the diamond pattern 300 or the orthogonal matrix 350. In some implementations, the capacitive sense array 125 has a greater resolution than that of the force electrodes 128. Additionally, although the row and column electrodes appear as bars, elongated rectangles or diamonds in FIGS. 3A and 3B, various tessellated shapes (e.g., rhomboids and chevrons) may also be used.

FIGS. 4A-4C illustrate example electronic touch sensing systems using a single force electrode 400 (FIG. 4A), a column of force electrodes 420 (FIG. 4B), or a two-dimensional (2D) array of force electrodes 440 (FIG. 4C) in accordance with some implementations. The single force electrode 400 overlaps a substantial portion of a touch sensing surface of a capacitive sense array 125. Capacitance of the single force electrode 400 is monitored to detect whether there is force applied on the touch sensing surface. Each of the columns of the force electrodes 420 (e.g., a unit force cell 430) extends to overlap a substantial portion of the width of the capacitive sense array 125. It is noted that a row of force electrodes can be similarly applied like the column of force electrodes 420. The 2D array of force electrodes 440 includes a plurality of square electrodes (e.g., unit force cells 450) overlapping the substantial portion of the touch sensing surface of the capacitive sense array 125. Each of the single force electrode 400, the unit force cell 430 of the force electrode column 420, and the unit force cell 450 of the 2D force electrode array is electrically coupled to the processing device 110 via the bus 124, and configured to provide force signals to the processing device 110. One of skilled in the art knows that other tessellated shapes (e.g., elongated rectangles, diamonds rhomboids and chevrons) can also be used to form the 2D array of force electrodes 440. Capacitances of the force electrodes 420 or 440 are monitored to detect whether there is force applied on the touch sensing surface and enable mapping of a force shape across the touch sensing surface.

In some implementations, the force electrodes 400, 420 and 440 are formed on one of the first and second conductive layers 212 and 214, and capacitively coupled to the ground that is formed on the other of the first and second conductive layers 212 and 214. As such, the force electrodes 400, 420 and 440 are separated from the ground by a compressive gap (e.g., an air gap). Self capacitances are measured between each of the force electrodes 128 and the ground to determine force applied on the touch sensing surface formed on the top glass 210. For example, unit force cells of the 2D array of force electrodes 440 are scanned to detect variations of their corresponding self capacitance, and the self capacitance variations are mapped to determine a force shape of force applied on the touch sensing surface.

Figure 5:
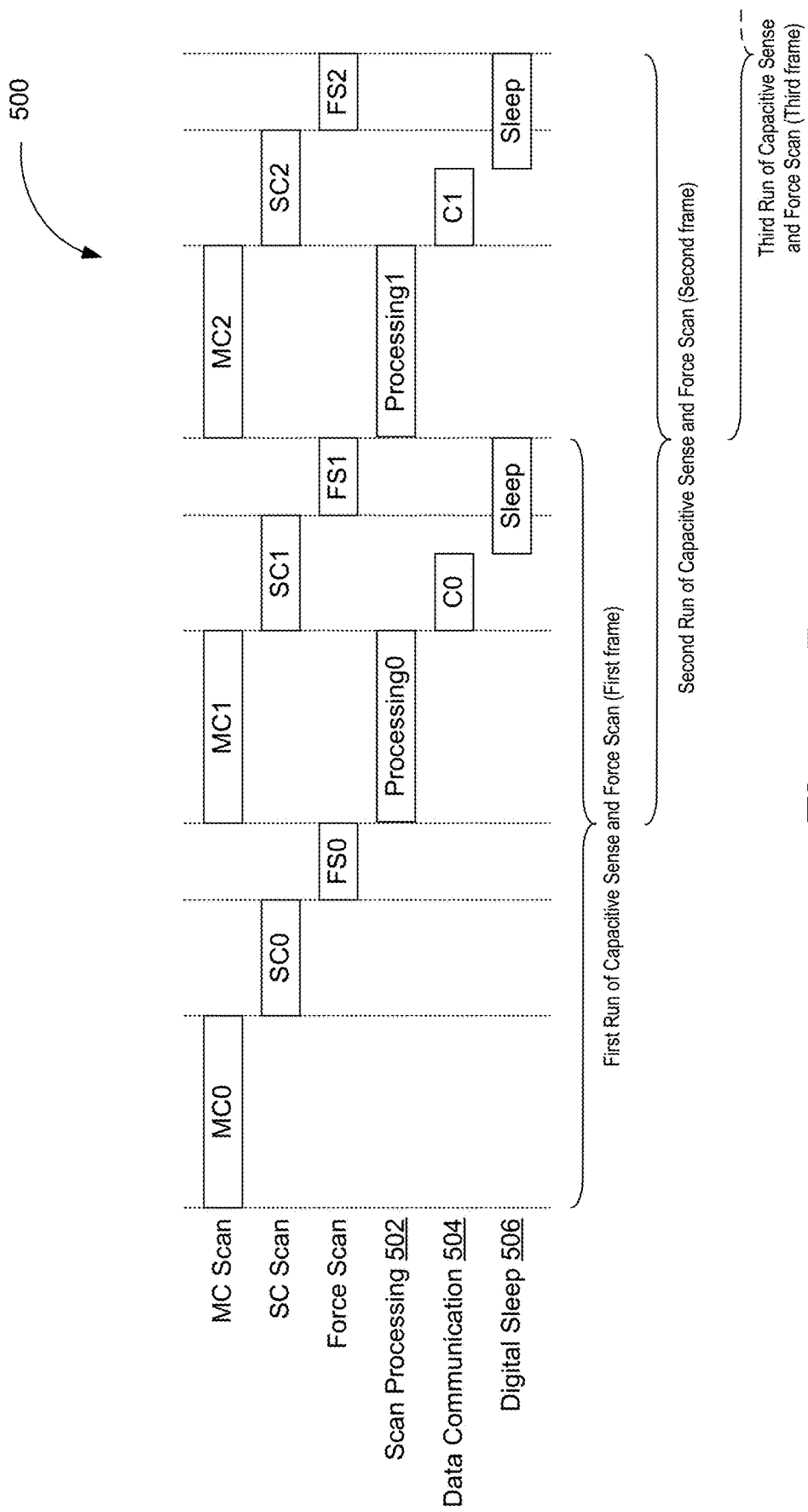
FIG. 5 provides a timing diagram of a sequence of capacitive sense scans and force scans in accordance with some implementations.

FIG. 5 is a timing diagram 500 of a sequence of capacitive sense scans, force scans, scan processing 502, and data communication 504, in accordance with some implementations. The illustrated sequence of capacitive sense scans and force scans includes three runs of capacitive sense and force scans. During each run of scans, one or more of the capacitive sense scans optionally precedes or follows a force scan. In some implementations, the capacitive sense scans and the force scan are conducted within a small time span so that these scans are substantially synchronous. Each capacitive sense scan further includes one or both of a mutual capacitance (MC) scan and a self capacitance (SC) scan of the capacitive sense array 125. Referring to FIG. 5, in some implementations, the MC scan precedes the SC scan and is implemented on the entire capacitive sense array 125. The SC scan is implemented on a subset of sense electrodes of the capacitive sense array 125 determined based on the preceding MC scan. In some implementations not shown in FIG. 5, the SC scan precedes the MC scan and is implemented on the entire capacitive sense array 125. The MC scan is implemented on a subset of sense electrodes of the capacitive sense array 125 determined based on the preceding SC scan. In some situations, after the SC scan, it is determined that the MC scan can be bypassed.

The sequence of capacitive sense scans and force scans are implemented by the capacitance sense circuit 101, and provide a plurality of capacitive sense signals and one or more force signals, respectively. In accordance with the capacitive sense and force signals, the capacitance sense circuit 101, the processing core 109, and the force and touch sense driver 102 are configured to, independently or collaboratively, determine the state of the capacitive sense array 125 (e.g., determining whether an object is detected on or in proximity to the touch sensing surface), resolve where the object is on the sense array (e.g., determining the location of the object), track the motion of the object, or generate other information related to an object detected at the touch sensing surface associated with the capacitive sense array 125. More specifically, during each run of capacitive sense and force scans, the respective capacitive sense and force scans are followed by touch determination processing of the capacitive sense and force signals to determine touch events on the touch sensing surface. In some implementations, the touch determination process includes a scan processing phase 502, a data communication phase 504, and a digital sleep phase 506. The scan processing phase 502 results in a frame of touch and force data obtained based on the corresponding capacitive sense and force scans. The frame of data is then communicated to the host device 150 during a subsequent data communication phase 504 before the respective run of capacitive sense and force scan is terminated at the digital sleep phase 506. In some implementations, the capacitive sense scan and the force scan are implemented as analog functions of the processing device 110, while the scan processing phase 502, the data communication phase 504 and the digital sleep phase 506 are controlled as digital functions of the processing device 110.

Each frame of touch and force data includes a set of force data calculated based on capacitive sense signals and force signals measured from the respective capacitive sense and force scans. In some implementations, force data has an 8-bit resolution. In addition, each frame of touch and force data includes touch information associated with touches detected during the respective capacitive sense and force scans, and the touch information optionally includes locations and finger identifications of the detected touches (e.g., for up to 10 fingers).

In some implementations, a second capacitive sense and force scan (e.g., MC1/SC1/FS1) is preceded by a first capacitive sense and force scan (e.g., MC0/SC0/FS0) and followed by a third capacitive sense and force scan (e.g., MC2/SC2/FS2) without overlapping with each other. In some implementations, each capacitive sense and force scan is followed by respective touch determination processing. Some implementations use a signal processing pipeline to complete two consecutive touch event detection operations on the touch sensing surface in parallel. For example, when the capacitance sense circuit 101 completes a preceding capacitive sense and force scan (MC0/SC0/FS0) and directly moves to a current capacitive sense and force scan (MC1/SC1/FS1), touch determination processing operations (Processing0, C0, and Sleep) associated with the first capacitive sense and force scan (MC0/SC0/FS0) is executed simultaneously with the second capacitive sense and force scan (MC1/SC1/FS1) by one or more of the capacitance sense circuit 101, the processing core 109, and the force and touch sense driver 102. Likewise, when the capacitance sense circuit 101 completes the second capacitive sense and force scan (MC1/SC1/FS1) and directly moves to the third capacitive sense and force scan (MC2/SC2/FS2), digital touch determination processing (Processing1, C1 and Sleep) associated with the second capacitive sense and force scan (MC1/SC1/FS1) is executed simultaneously with the third capacitive sense and force scan (MC2/SC2/FS2) by one or more of the capacitance sense circuit 101, the processing core 109, and the force and touch sense driver 102. Thus, consecutive touch detection operations are executed partially in parallel in the processing device 110, thereby enabling a fast detection rate for accurate touch detection.

FIGS. 6A and 6B illustrate two example capacitance sense circuits 101A and 101B, each of which is configured to measure both capacitive sense signals and force signals during capacitive sense and force scans in accordance with some implementations. Referring to FIG. 6A, the capacitance sense circuit 101A includes one or more capacitive sense channels 602. In some implementations, the channels are substantially identical. Each of the one or more capacitance sense channels 602 is coupled to the multiplexers 604, thereby enabling connection to both sense electrodes of the capacitive sense array 125 and force electrodes of the force electrodes 128 by the bus 122 and the bus 124, respectively. When the multiplexers 604 for a capacitance sense channel 602 select one or more of the sense electrodes of the capacitive sense array 125, the capacitance sense channel 602 is configured to measure the corresponding capacitive sense signal(s) for detecting candidate touches on the touch sensing surface. In some implementations, when the multiplexers 604 for a capacitance sense channel 602 select one or more of the force electrodes of the one or more force electrodes 128, the capacitance sense channel 602 is configured to measure the corresponding force signals used to improve touch detection results (e.g., by eliminating an invalid candidate touch or by adjusting a baseline and a touch detection threshold used in touch detection).

Referring to FIG. 6B, the capacitance sense circuit 101B includes one or more touch sense channels 606. In some implementations, the touch sense channels are substantially identical and the one or more force sense channels 608 are substantially identical. A touch sense channel 606 and a force sense channel 608 are optionally identical or different as determined by signal processing requirements associated with the capacitive sense array 125 and the force electrodes 128. Each capacitance sense channel 606 is coupled to the multiplexers 610, thereby only enabling connection to the sense electrodes of the capacitive sense array 125 by the bus 122. The touch sense channels 606 are dedicated to measuring the corresponding capacitive sense signals for detecting candidate touches on the touch sensing surface. On the other hand, each force sense channel 608 is coupled to the multiplexers 612, thereby only enabling connection to the capacitive sense array 128 by the bus 124. The force sense channels 608 are dedicated to measuring the corresponding force signals used to improve touch detection results obtained from the touch sense channels 606 (e.g., by eliminating an invalid candidate touch or by adjusting a baseline and a touch detection threshold used in touch detection). In some implementations, the touch sense channels 606 and the force sense channels 608 are configured to execute the capacitance sense and force scans (e.g., MC0/SC0 and FC0 shown in FIG. 5) in parallel.

In some implementations, each of the capacitance sense circuit 101A and 101B includes a state machine 620 and registers 640. For example, the registers 640 include configuration information for the capacitive sense electrodes selected for the capacitive sense scans, configuration information for the force electrodes selected for the force scans, a scan frequency, and pulse numbers of a transmission signal used for mutual capacitance scans. Referring to FIG. 6A, the state machine 620 obtains information stored in the registers 640 to configure the capacitance sense channels 602 to measure capacitive sense signals or force signals provided by the capacitive sense array 125 or the force electrodes 128, respectively. In some implementations, referring to FIG. 6B, the state machine 620 obtains information stored in the registers 640 to configure the touch and/or force sense channels to measure capacitive sense signals or force signals provided by the capacitive sense array 125 or the force electrodes 128, respectively.

Figure 7A:
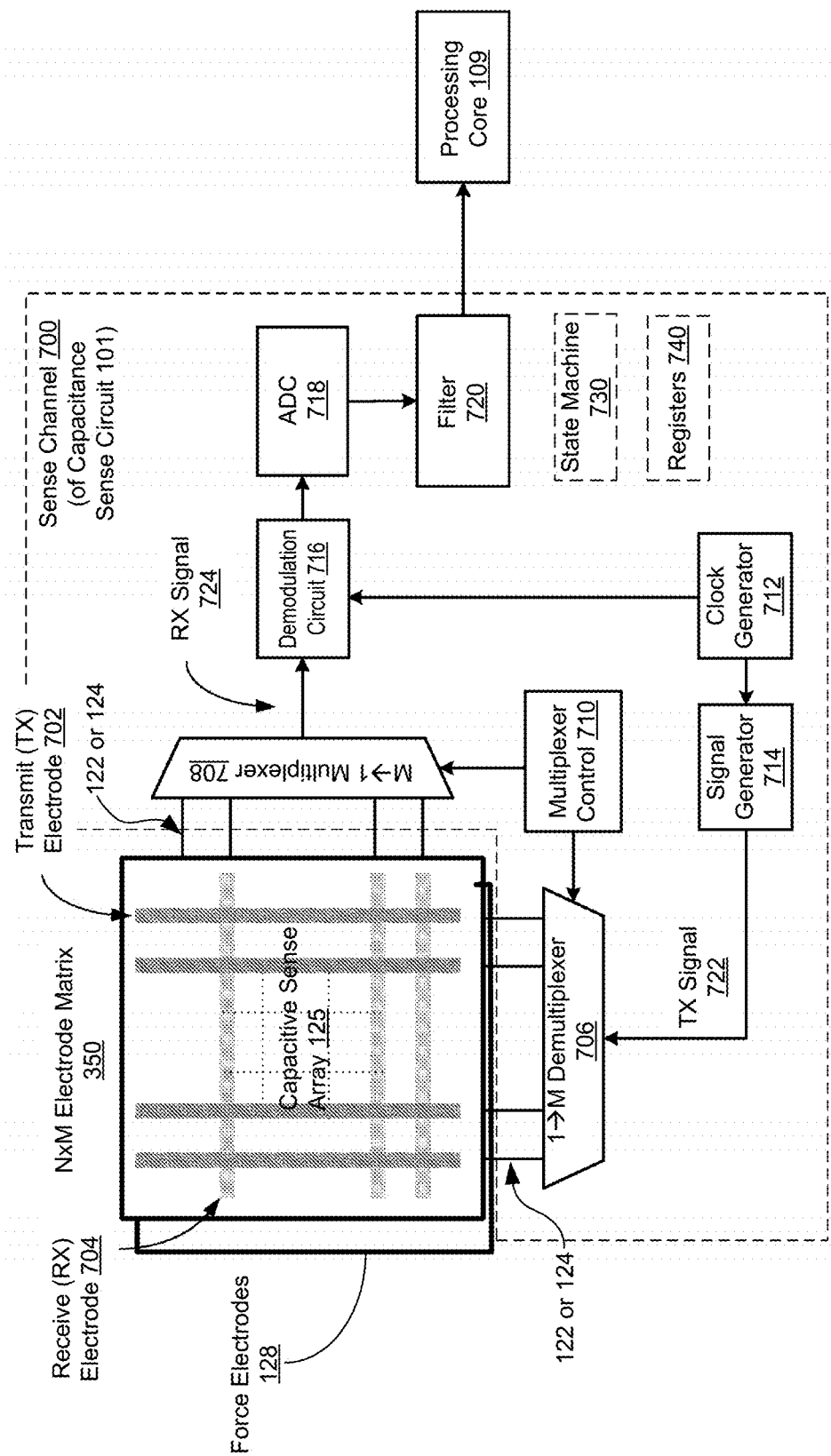
FIG. 7A is a block diagram illustrating a capacitive sense array and a sense channel that is configurable to measure capacitive sense signals or force signals in accordance with some implementations.

FIG. 7A is a block diagram illustrating a capacitive sense array 125 and a sense channel 700 (e.g., a capacitance sense channel 602, a touch sense channel 604, or a force sense channel 608) that is configurable to measure capacitive sense signals or force signals in accordance with some implementations. The sense channel 700 is part of the capacitance sense circuit 101, and is configured to measure the capacitive sense signals or the force signals associated with changes in measured capacitances. The capacitive sense signals or the force signals are further processed to determine coordinates indicating the presence and location of touch. The coordinates are calculated based on changes in measured capacitances relative to the capacitances of the same touch capacitive sense array 125 in an un-touched state. In some implementations, the capacitive sense array 125 and capacitance sense circuit 101 are implemented in a system such as electronic system 100. In some implementations, the capacitive sense array 125 includes a matrix 350 of N×M electrodes (N receive electrodes and M transmit electrodes), which includes transmit (TX) electrode 702 and receive (RX) electrode 704. Each of the electrodes in the matrix 350 is connected with the demultiplexer 706 or the multiplexer 708 of the capacitance sense circuit 101 by the bus 122 or the bus 124. Each of the electrodes in the matrix 350 is configured to receive a transmission signal from the capacitance sense circuit 101 by the bus 122 or 124, or provide a capacitive sense signal or a force signal to the capacitance sense circuit 101 by the bus 122 or the bus 124.

The sense channel 700 of the capacitance sense circuit 101 includes a multiplexer control 710, a demultiplexer 706, a multiplexer 708, a clock generator 712, a signal generator 714, a demodulation circuit 716, and an analog to digital converter (ADC) 718. The ADC 718 is further coupled with a filter 720. The filter 720 is optionally implemented in the processing core 109. The above circuit blocks 706-720 are applied for mutual capacitance scans. However, some of these circuit blocks (e.g., the demultiplexer 706, the clock generator 712, and the signal generator 714) are disabled for self capacitance scans because self capacitance scans do not need transmission signals to drive the capacitive sense array 125 or the force electrodes 128.

The transmit and receive electrodes in the electrode matrix 350 may be arranged so that each of the transmit electrodes overlaps and crosses each of the receive electrodes, forming an array of intersections, while maintaining galvanic isolation from each other. Thus, each transmit electrode may be capacitively coupled with each of the receive electrodes. For example, the transmit electrode 702 is capacitively coupled with the receive electrode 704 at the point where the transmit electrode 702 and the receive electrode 704 overlap.

The clock generator 712 supplies a clock signal to the signal generator 714, which produces a TX signal 722 to be supplied to the transmit electrodes of capacitive sense array 125. In some implementations, the signal generator 714 includes a set of switches that operate according to the clock signal from clock generator 712. The switches may generate a TX signal 722 by periodically connecting the output of the signal generator 714 to a first voltage and then to a second voltage, where the first and second voltages are different.

The output of signal generator 714 is connected with a demultiplexer 706, which allows the TX signal 722 to be applied to any of the M transmit electrodes of the capacitive sense array 125. In some implementations, the multiplexer control 710 controls demultiplexer 706 so that the TX signal 722 is applied to each transmit electrode 702 in a controlled sequence. The demultiplexer 706 may also be used to ground, float, or connect an alternate signal to the other transmit electrodes to which the TX signal 722 is not currently being applied. In some implementation, the TX signal 722 is presented in a true form to a subset of the transmit electrodes 702 and in a complement form to a second subset of the transmit electrodes 702, where there is no overlap in members of the first and second subsets of transmit electrodes 702.

Because of the capacitive coupling between the transmit and receive electrodes, the TX signal 722 applied to each transmit electrode induces a current within each of the receive electrodes. For instance, when the TX signal 722 is applied to transmit electrode 702 through demultiplexer 706, the TX signal 722 induces an RX signal 724 on the receive electrodes in matrix 350. The RX signal 724 on each of the receive electrodes can then be measured in sequence by using the multiplexer 708 to connect each of the N receive electrodes to demodulation circuit 716 in sequence.

The mutual capacitance associated with each intersection between a TX electrode and an RX electrode can be sensed by selecting every available combination of TX electrode and an RX electrode using the demultiplexer 706 and the multiplexer 708. To improve performance, the multiplexer 708 may also be segmented to allow more than one of the receive electrodes in the matrix 350 to be routed to additional demodulation circuits 716. In configurations with a 1-to-1 correspondence of instances of demodulation circuit 716 with receive electrodes, the multiplexer 708 may not be present in the system.

When an object, such as a finger, approaches the electrode matrix 350, the object causes a change in the measured mutual capacitance between only some of the electrodes. For example, if a finger is placed near the intersection of transmit electrode 702 and receive electrode 704, the presence of the finger will decrease the charge coupled between electrodes 702 and 704. Thus, the location of the finger on the touchpad can be determined by identifying the one or more receive electrodes having a decrease in measured mutual capacitance in addition to identifying the transmit electrode to which the TX signal 722 was applied at the time the decrease in capacitance was measured on the one or more receive electrodes.

By determining the mutual capacitances associated with each intersection of electrodes in the matrix 350, the presence and locations of one or more conductive objects may be determined. The determination may be sequential, in parallel, or may occur more frequently at commonly used electrodes.

In some implementations, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced current signal 724 is integrated by the demodulation circuit 716. The rectified current output by demodulation circuit 716 can then be converted to a digital code by the ADC 718, and filtered by a filter 720 based on a baseline associated with the corresponding TX and RX electrodes. In some implementations, the baseline associated with each combination of TX and RX electrodes is adjusted individually according to a surface condition at a corresponding location of the touch sensing surface (e.g., whether the corresponding location is covered by a water drop).

A series of such filtered digital codes measured from adjacent sensors or intersections is further converted to touch coordinates indicating a position of an input on touch capacitive sense array 125 by a touch coordinate converter (not shown) optionally disposed in the capacitance sense circuit 101, the force and touch sense driver 102, or the processing core 109. The touch coordinates may then be used to detect gestures or perform other functions by the processing core 109.

In some implementations, the capacitance sense circuit 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

In some implementations, the one or more force electrodes 128 are also arranged as an electrode matrix similar to the electrode matrix 350 associated with the capacitive sense array 125. As explained with reference to FIG. 3B, the force electrodes 128 also include a set of row electrodes and a set of column electrodes disposed on two distinct conductive layers 212 and 214 that are separated by a compressive gap. Mutual capacitance can be measured between a row electrode and a column electrode. When the sense channel 700 of the capacitance sense circuit 101 is configured to connect to the electrode matrix associated with a force electrode 128, it measures changes in capacitances relative to the mutual capacitances of the same force electrodes 128 in the un-touched state. Each of the electrodes in the matrix 350 associated with the force electrodes 128 is connected with the capacitance sense circuit 101 through the demultiplexer 706 and the multiplexer 708.

When the sense channel 700 of the capacitance sense circuit 101 is coupled to the one or more force electrodes 128, a series of filtered digital codes is measured from adjacent force electrodes or intersections of the force electrodes 128, and converted to information indicating force associated with candidate touches identified on the capacitive sense array 125. In some implementations, the force information is applied to improve touch detection results by eliminating an invalid candidate touch from the identified candidate touches or by adjusting a baseline and a touch detection threshold used in touch detection. More details on application of the force information to improve touch detection results are explained below with reference to FIGS. 13-23.

In some implementations, the sense channel 700 includes a state machine 730 and registers 740. The registers 740 store information for capacitive sense electrodes selected for capacitive sense scans, information for force electrodes selected for force scans, a scan frequency and pulse numbers of a transmission signal used for mutual capacitance scans. The state machine 730 obtains information stored in the registers 740 to configure the demultiplexer 706, the multiplexer 708, the clock generator 712, the signal generator 714, and the demodulation circuit 716 to measure capacitive sense signals or force signals provided by the capacitive sense array 125 or the force electrodes 128, respectively.

Figure 7B:
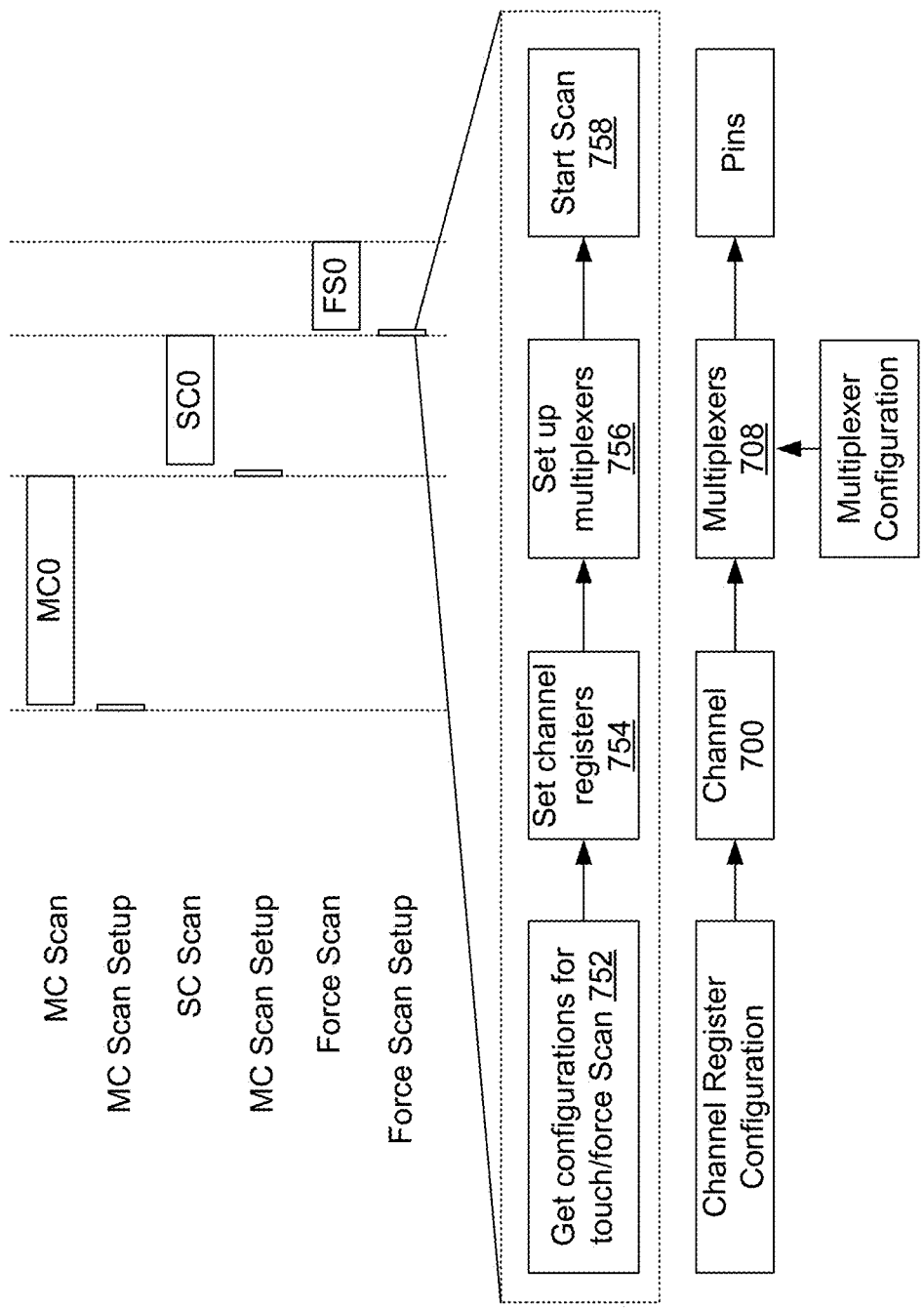
FIG. 7B is a flowchart of an example method of configuring a capacitive sense channel to measure capacitive sense signals or force signals in accordance with some implementations.

FIG. 7B is a flowchart of an example method for configuring a capacitive sense channel 700 to measure capacitive sense signals or force signals in accordance with some implementations. Referring to FIG. 5, a sequence of capacitive sense and force scans includes a mutual capacitance scan (e.g., MC0), a self capacitance scan (e.g., SC0), and a force scan (e.g., FS0). Each of the MC, SC, and force scans is preceded with a scan preparation phase during which the sense channel 700 of the capacitance sense circuit 101 is configured to load corresponding scan configurations for the purposes of implementing the respective scan. The scan configuration associated with each scan type includes one or more multiplexer settings, transmission parameters (e.g., transmission frequency, and the number of transmission pulses), and baseline values. In some implementations, the capacitance sense circuit 101 includes one or more channel registers that are configured to store the transmission parameters associated with each scan type. The transmission parameters are modified using inter-integrated circuit (I2C) commands, and thus scan configurations of the sense channel 700 are tunable based on the transmission parameters stored in the channel registers.

For example, during a scan preparation phase prior to a force scan, the sense channel 700 of the capacitive sense array 101 determines that a subsequent scan includes a force scan and obtains (752) scan configuration data associated with the force scan. At least the transmission parameters of the scan configurations are stored (754) in the channel registers for use in the subsequent force scan implemented by the sense channel 700. The sense channel 700 of the capacitive sense array 101 also sets up (756) the mutliplexers 708 and/or demultiplexers 706 according to the mutliplexer settings. As such, the sense channel 700 of the capacitive sense array 101 can start (758) the force scan based on the scan parameters loaded onto the sense channel 700 of the capacitive sense array 101.

Figure 8A:
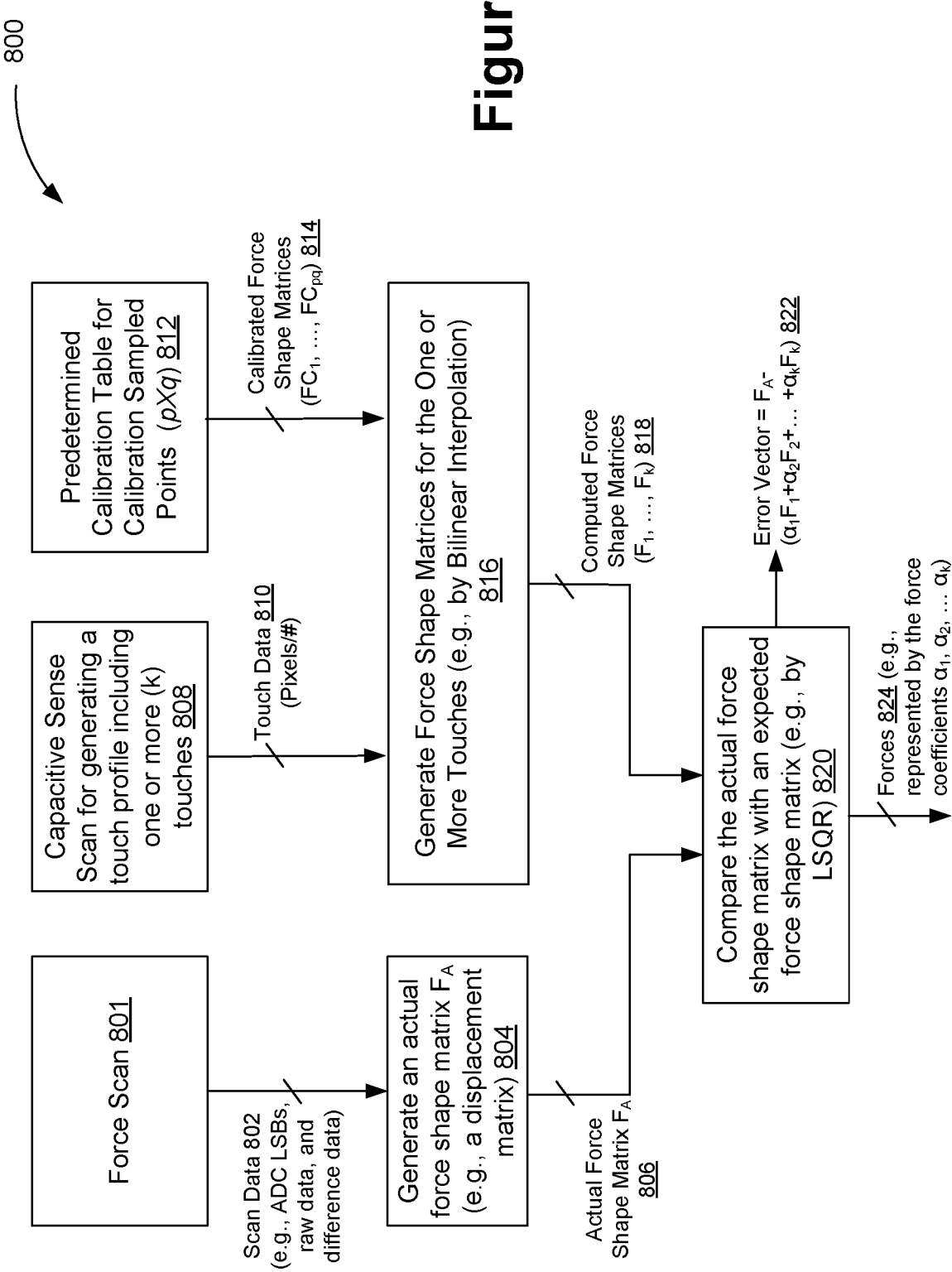
FIG. 8A is a flowchart illustrating a method of correlating force signals and touch signals, in accordance with some implementations.
Figures 8B, 8C:
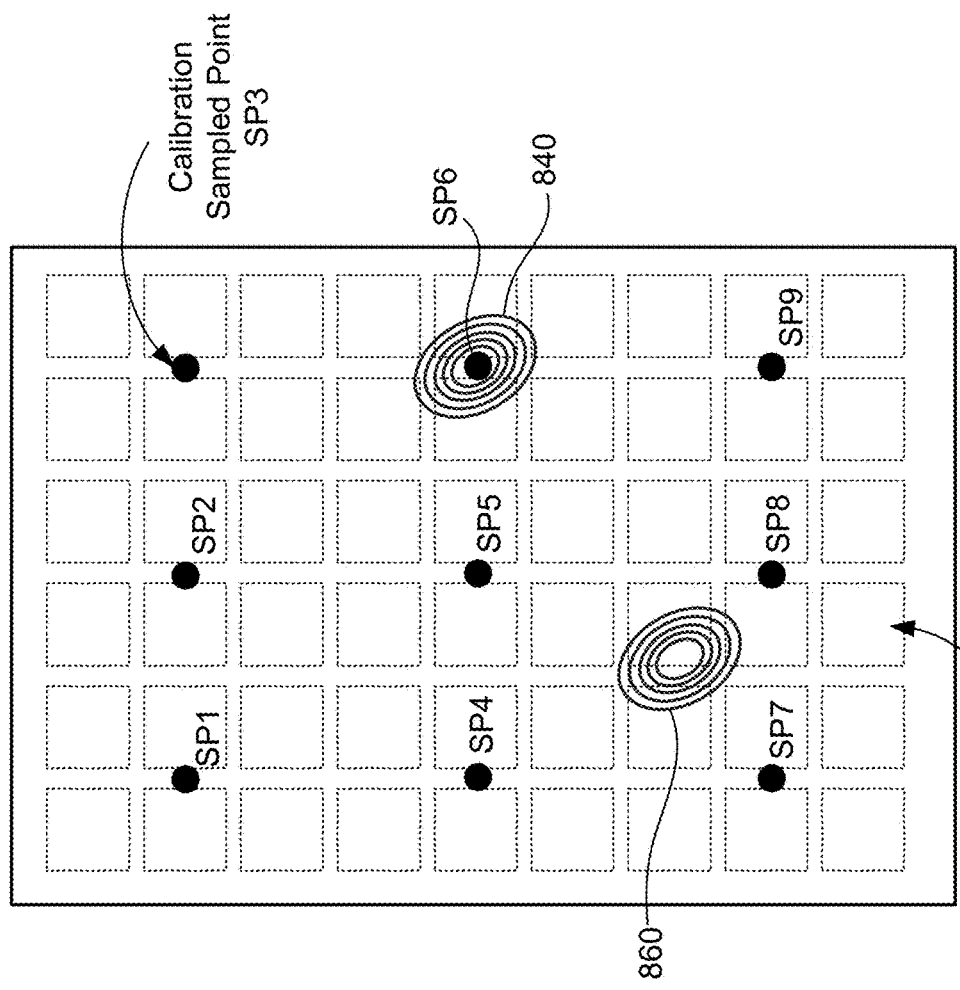
FIG. 8B is an example two-dimensional (2D) force electrode array 128 associated with a plurality of predetermined calibration sampled points (e.g., SP1, . . . , SP9), in accordance with some implementations.
FIG. 8C is a force shape calibration table for the force electrode array 128 shown in FIG. 8B, in accordance with some implementations FIGS. 9A-9F provide examples of utilizing an adaptive threshold with touch detection on a touch surface, in accordance with some implementations.

FIG. 8A is a flowchart illustrating a method 800 of correlating force signals and touch signals in accordance with some implementations. FIG. 8B is an example two-dimensional (2D) force electrode array 128 associated with a plurality of predetermined calibration sampled points (e.g., SP1-SP9) in accordance with some implementations, and FIG. 8C is a force shape calibration table 812 for the force electrode array 128 shown in FIG. 8B in accordance with some implementations. Both the predetermined calibration sampled points and the force shape calibration table 812 are used to compare a touch profile and a force shape that are determined from capacitive sense signals (also called touch signals) and force signals measured from a capacitive sense array 125 and force electrodes 128, respectively.

As shown in FIG. 8A, force scan data 802 is obtained from performing a force scan 801 on the force electrodes 128. In some implementations, the force scan data 802 is received from a plurality of Analog to Digital Converters (ADCs), such as the ADC 718 in FIG. 7A (e.g., the least significant bit outputs of the ADCs). In some implementations, the force scan data 802 includes raw data (e.g., force signals) from each force sensor included in the force scan. The raw data of each force sensor is optionally measured based on self capacitance (e.g., its capacitance to ground) or mutual capacitance (e.g., its capacitance to another force sensor). In some implementations, the raw data includes a baseline capacitance sensing value for each force sensor included in the force scan. In some implementations, the force scan data 802 includes capacitive difference data for each force sensor, e.g., a difference between a measured capacitive force signal (e.g., concurrent with a potential touch on the touch-sensitive surface) and a baseline for the respective force sensor.

An actual force shape matrix $F_A$ 806 is generated (804) from the force scan data 802. When the force electrodes 128 is a row or column of force electrodes as shown in FIG. 4B, the actual force shape matrix 806 includes a vector in which each element is associated with a force signal obtained from one of the row or column of force electrodes. When the force electrodes 128 form a 2D array of force electrodes as shown in FIG. 4C, the actual force shape matrix 806 includes a vector or a 2D data array in which each element is associated with a force signal obtained from one of the force electrodes in the 2D array of force electrodes.

In some implementations, each element of the actual force shape matrix $F_A$ 806 represents a respective physical displacement or thickness variation of the compressible gap 216 associated with a respective force electrode 128 during a touch event, and this physical displacement or thickness variation is derived from the force signal measured from the respective force electrode. Therefore, in some implementations, generating the actual force shape matrix $F_A$ 806 includes generating distance displacement data from the scan data 802 for each force electrode, and mapping the generated distance displacement data into the actual force shape matrix $F_A$. In some instances, the actual force shape matrix $F_A$ 806 includes a displacement value corresponding to each force sensor in the force scan. In some implementations, the actual force shape matrix $F_A$ 806 corresponds to a physical deformation of a compressible layer, such as the air gap 216. In some implementations, the actual force shape matrix $F_A$ 806 corresponds to the amount of force associated with the force electrodes lying below the touch-sensitive surface, and the amount of force is determines based on the scan data 802.

Referring to FIG. 8B, in a specific example, the actual force shape matrix $F_A$ is a vector or a 2D data array including 54 elements each element associated with one of the 54 force electrodes. In some implementations, each element of the actual force shape matrix $F_A$ is calculated from the raw data 802 and represents a physical displacement, a thickness variation of the compressible gap, or an amount of force associated with the corresponding force electrode during a touch event.

The touch data 810 is obtained from a plurality of capacitive sense signals from the capacitive sense array 125 during one or more capacitive sense scans 808. A touch event is identified from the touch data 810, and includes one or more (e.g., k) touches that form a touch profile associated with the touch event. In some implementations, the capacitive sense scans 808 use self capacitance and/or mutual capacitance for each touch capacitance sensor. In some implementations, the capacitance values are further analyzed to determine a location for each detected touch in the touch profile (e.g., an x-position and a y-position on the touch-sensitive surface for one or more fingers). In some implementations, the touch data 810 includes an x-coordinate and a y-coordinate for each detected touch. In FIG. 8A, k denotes the total number of detected touches for a particular touch scan that gives the touch profile.

In accordance with a predetermined calibration table 812, one or more calibrated force shape matrices ($FC_1, \ldots, FC_{PQ}$) 814 are obtained for a plurality of predetermined calibration sampled points distributed on the touch sensing surface. Here, p is an integer that specifies the amount of sampling in one dimension and q is an integer that specifies the sampling in the second dimension, so the product pq is the total number of sample points. In the example of FIGS. 8B and 8C, p=3 and q=3, so there are a total of nine sample points $SP_1, \ldots, SP_9$. In some implementations, each calibrated force shape matrix 814 represent force or displacement mappings for a touch at a specific predetermined location (i.e., one of the calibration sampled points) on the touch-sensitive surface. For example, a touch at a particular calibration sampled point generates a particular displacement shape that can be mapped into a corresponding calibrated force shape matrix 814 stored in the calibration table 812. In some implementations, the values of the elements of the calibrated force shape matrices 814 are in units of displacement per gram of force. Referring to FIGS. 8B and 8C, there are nine predetermined calibration sampled points SP1, . . . , SP9 distributed on the touch sensing surface. In accordance with the predetermined calibration table 812, each of the predetermined calibration sampled points SP1, . . . , SP9 is associated with a calibrated force shape matrix 814. Each calibrated force shape matrix 814 is a vector or a 2D data array including 54 elements, each corresponding to a respective one of the 54 force electrodes. In some implementations, each element of the calibrated force shape matrix 814 represents a physical displacement, a thickness variation of the compressible gap, or an amount of force associated with the corresponding calibration sampled point. In the example of FIG. 8B, the calibration sampled points have a lower resolution than that of the force electrodes 128 (54 force electrodes, but only 9 sampled points). In some implementations not shown in FIGS. 8A-8C, the calibration sampled points have a resolution that is greater than the resolution of the force electrodes 128 (e.g., 54 force electrodes, as depicted in FIG. 8B, but 200 calibrated sample points arranged in a 20×10 pattern).

In some implementations, the one or more calibrated force shape matrices ($FC_1, \ldots, FC_{PQ}$) 814 are calibrated at different stages of manufacturing when force is actually applied at the predetermined calibration sampled points. In some implementations, process-related parameters (e.g., material thickness, material stress, etc.) are obtained based on a manufacturing processing, and used to compute the one or more calibrated force shape matrices ($FC_1, \ldots, FC_{PQ}$) 814 associated with the predetermined calibration sampled points.

Referring to FIG. 8B, in some situations, a detected touch 840 substantially matches one of the predetermined calibration sampled points SP6, and the detected touch 840 is associated with one of the calibrated force shape matrices $FC_6$ 814 corresponding to the the predetermined calibration sampled point SP6. More commonly, a detected touch 860 does not match any single predetermined calibration sampled point, and is located among a subset of the predetermined calibration sampled points such as SP4, SP5, SP7, and SP8 for detected touch 860. For the detected touch 860, a computed force shape matrix 818 is interpolated from or generated by combining the subset of the calibrated force shape matrices (including $FC_4$, $FC_5$, $FC_7$, and $FC_8$) 814 corresponding to the subset of the predetermined calibration sampled points. In an example, the computed force shape matrix 818 for the detected touch 860 is generated by bilinear interpolation (816) based on the subset of the calibrated force shape matrices ($FC_4$, $FC_5$, $FC_7$, and $FC_8$) 814. The computed force shape matrix 818 is calculated based on the location (e.g., xPos and yPos) of the detected touch 860 with respect to the locations of the subset of the predetermined calibration sampled points (SP4, SP5, SP7, and SP8) surrounding the touch 860. Distances are calculated between a centroid of the detected touch 860 and each of the subset of the predetermined calibration sampled points (SP4, SP5, SP7, and SP8), and used to calculate interpolation weights for combining the corresponding subset of the calibrated force shape matrices ($FC_4$, $FC_5$, $FC_7$, and $FC_8$) 814. In a specific example, the interpolation weights are inversely proportional to the distances between the detected touch 860 and each of the predetermined calibration sampled points. That is, when a predetermined calibration sampled point (e.g., SP8) has a smaller distance to the detected touch 860, the corresponding calibrated force shape matrix 814 (e.g., $FC_8$) is associated with a larger interpolation weight.

When a touch profile includes one or more touches, a force shape matrix 818 is computed for each touch. For example, for the two touches 840 and 860, two computed force shape matrices 818 are generated, and include 2×i matrix elements, where i is the number of force sensors measured in the force scan (e.g., the number of force sensors coupled to the touch-sensitive surface). Each of the k touches has an associated force, and the next step in the process 800 estimates each of the forces. The forces cannot be negative, but they can be zero. The forces here are labeled as and represented by their corresponding force coefficients $\alpha_1, \alpha_2, \ldots, \alpha_k$. Using these force coefficients, the total combined force shape is $\alpha_1 F_1 + \alpha_2 F_2 + \ldots + \alpha_k F_k$, which is the expected force shape based on the touch data. The expected force shape includes an array of expected values associated with force applied on the one or more force electrodes. In some implementations, the goal is to compute values for the forces so that the expected force shape is as close as possible to the actual force shape $F_A$.

The actual force shape matrix $F_A$ 806 is compared (820) with the expected force shape matrix FE that is calculated from the touch profile based on the predetermined calibration table 812, thereby determining the forces 824 associated with the touches of a touch profile. For example, the coefficients of the forces 824 are determined from a sparse set of linear equations and a sparse least squares process (LSQR) 820 on the actual force shape matrix $F_A$ 806 and the computed force shape matrices 818 (e.g., $F_1, \ldots, F_k$). In some implementations, in accordance with the LSQR process 820, the error vector 822 is $F_A - (\alpha_1 F_1 + \alpha_2 F_2 + \ldots + \alpha_k F_k)$. The force coefficients of the forces 824 (e.g., represented by $\alpha_1, \alpha_2, \ldots, \alpha_k$) are determined by minimizing the magnitude of the error vector 822 or making the magnitude of the error vector 822 fall below an error threshold. In some implementations, the force coefficients of the forces 824 correspond to a plurality of forces, and specify a magnitude for each force. In some implementations, the magnitude for each force is normalized or scaled for to a particular number of bits.

In some implementations, the error vector 822 is analyzed to determine whether one or more of the detected touches is not valid. In some instances, one or more of the forces is determined to be zero (e.g., exactly zero, or below a small threshold). In this case, the corresponding touch is not valid. In other instances, it is not possible to reduce the total error below the error threshold, regardless of how the coefficients of the forces (e.g., represented by $\alpha_1, \alpha_2, \ldots, \alpha_k$) are selected (e.g., after performing 10 iterations of an optimization algorithm, the error is still too high). In this case, the comparison of the actual force shape with the expected force shape is inconclusive. In some implementations, after an inconclusive comparison, another force scan and/or capacitive sense scan is performed. In some implementations, touch information from a previous scan is reported.

Signal Conditioning and Noise Reduction on a Touch Surface

Figure 9A:
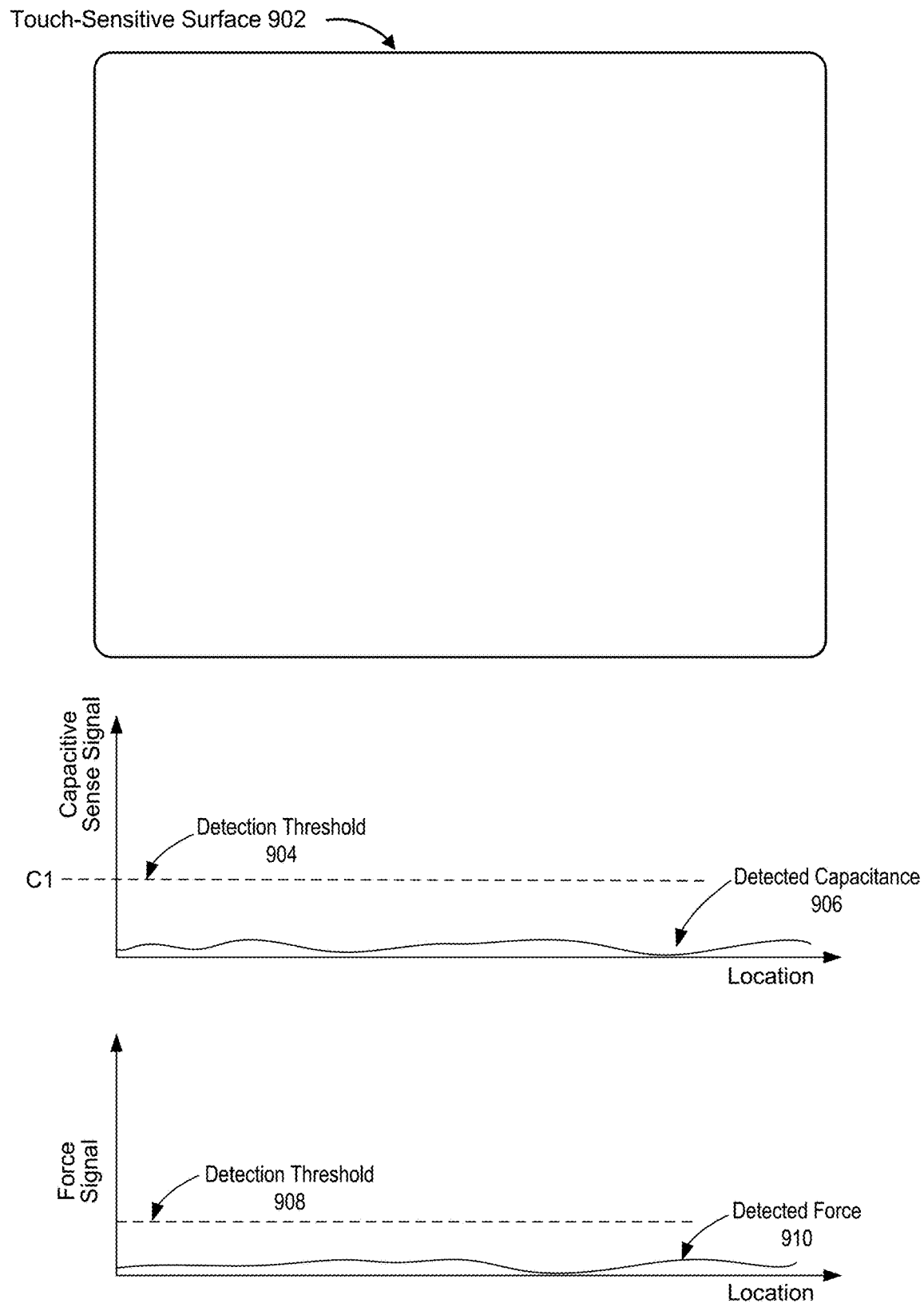

FIGS. 9A-9F provide examples of utilizing an adaptive threshold with touch detection on a touch surface, in accordance with some implementations. FIGS. 9A-9F show a touch-sensitive surface 902 and corresponding graphs for touch capacitance and touch force. FIG. 9A shows no touches on the touch-sensitive surface 902, and the corresponding detected touch capacitance 906 and force 910 are below the respective detection thresholds 904 and 908. In some circumstances, as shown in FIG. 9A, the detected capacitance 906 and/or the detected force 910 are non-zero across the touch-sensitive surface 902 due to environmental effects, such as ambient temperature, humidity, and/or air pressure on the touch-sensitive surface 902.

Although FIGS. 9A-9F show one-dimensional location information for the detected capacitance and the detected force, in some implementations, the detected capacitance and/or the detected force includes two-dimensional information (e.g., a two-dimensional profile corresponding to a two-dimensional array of electrodes). For example, the two-dimensional array shown in FIG. 3B produces two-dimensional capacitance information corresponding to rows 301-310 and columns 311-318. FIGS. 9A-9F and 10A-10H show one-dimensional location plots for ease of understanding, and are not intended to be limiting in any way.

In some implementations, the touch detection threshold 904 is set to a first value, C1, so as to distinguish between capacitance due to touches and capacitance due to environmental effects. In some implementations, the force detection threshold 908 is set to a first value so as to distinguish between detected force due to touches and detected force due to environmental effects. In some implementations, the touch detection threshold 904 and/or the force detection threshold 908 is reset continuously or periodically (e.g., based on current environmental conditions). In some implementations, there is an adaptive threshold that is configured to be set to any one of a plurality of predetermined values.

FIG. 9B shows a touch 912 on the touch-sensitive surface 902 and corresponding detected capacitance 914 and detected force 916. As shown in FIG. 9B, there is a spike in the detected capacitance 914 at location L1, but the spike is below the touch detection threshold 904. The detected force 916 shows a spike at location L1 and the spike is greater than the detection threshold 908.

FIG. 9C shows the touch detection threshold 904 at value C2, adjusted down from value C1 in FIG. 9B. FIG. 9C further shows the spike in the detected capacitance 914 at location L1 exceeding the touch detection threshold 904 at value C2. Thus, having the touch detection threshold 904 at value C2 enables the touch detection at location L1 corresponding to the touch 912.

FIG. 9D shows the touch 912 moving from a position 912-*a* (as shown in FIG. 9C) to a position 912-*b*. FIG. 9D further shows the detected capacitance 918 and the detected force 920 each with a spike at location L2 corresponding to the position 912-*b* of touch 912. In FIG. 9D the detected capacitance 918 exceeds the touch detection threshold 904 and the detected force 920 exceeds the force detection threshold 908.

Figure 9E:
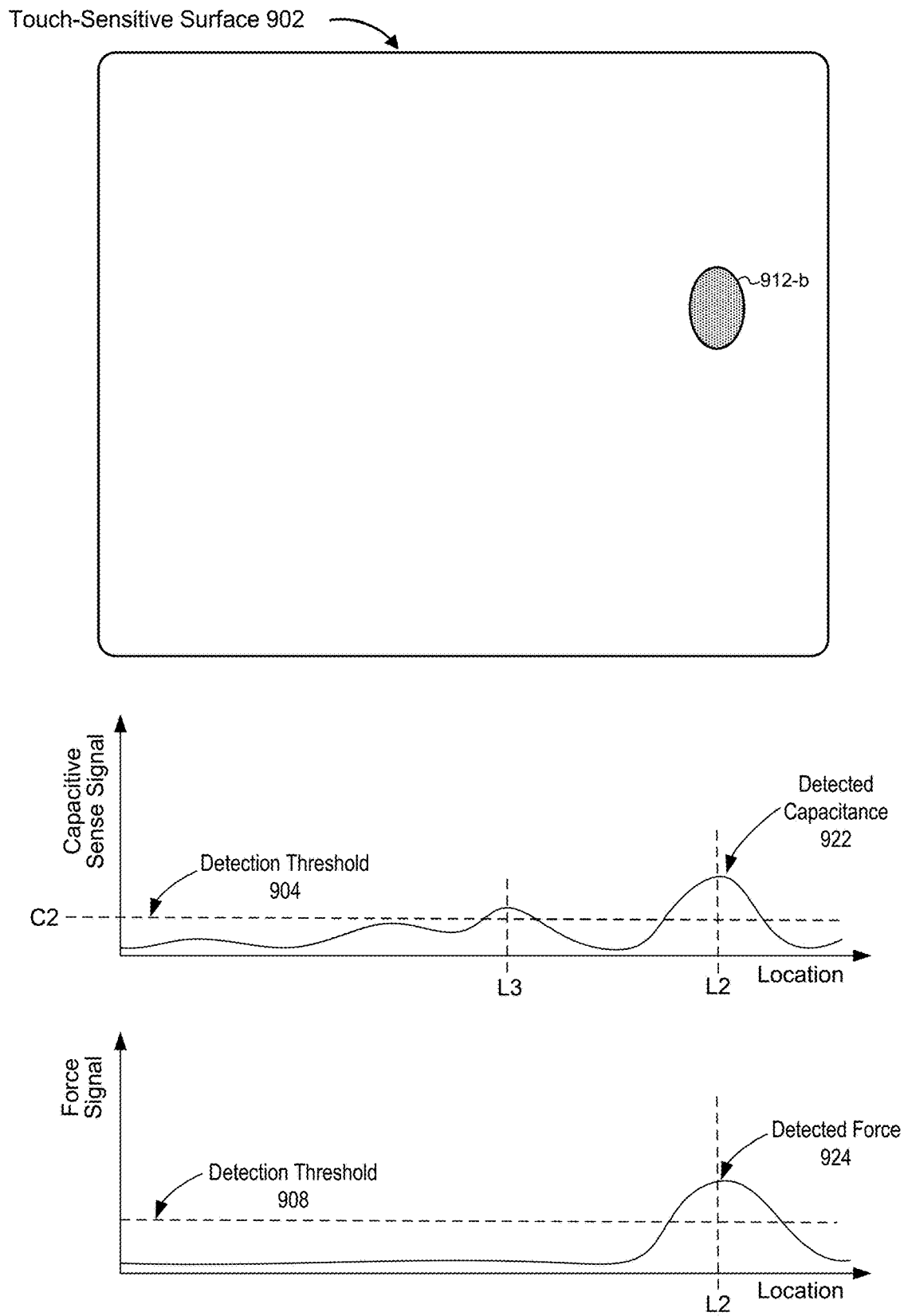

FIG. 9E shows the touch 912 at position 912-*b* on the touch-sensitive surface 902. FIG. 9E further shows the detected capacitance 922 and the detected force 924 each with a spike at location L2 corresponding to the position 912-*b* of touch 912. The detected capacitance 922 also shows a spike at location L3 (e.g., due to environmental conditions) exceeding the detection threshold of 904.

FIG. 9F shows the touch detection threshold 904 at value C3, adjusted up from value C2 in FIG. 9E. FIG. 9F further shows the spike in the detected capacitance 922 at location L3 below the detection threshold 904 and the spike at location L2 above the threshold. Thus, having the touch detection threshold 904 at value C3 eliminates the false touch detection at location L3 while maintaining the touch detection at location L2 corresponding to touch 912.

FIGS. 10A-10H provide examples of touch detection and rejection on a touch surface, in accordance with some implementations. Although FIGS. 10A-10H show one-dimensional location information for the detected capacitance and the detected force, in some implementations, the detected capacitance and/or the detected force includes two-dimensional information (e.g., a two-dimensional profile corresponding to a two-dimensional array of electrodes). As discussed above, FIGS. 9A-9F and 10A-10H show one-dimensional location plots for ease of understanding, and are not intended to be limiting in any way.

Figure 10A:
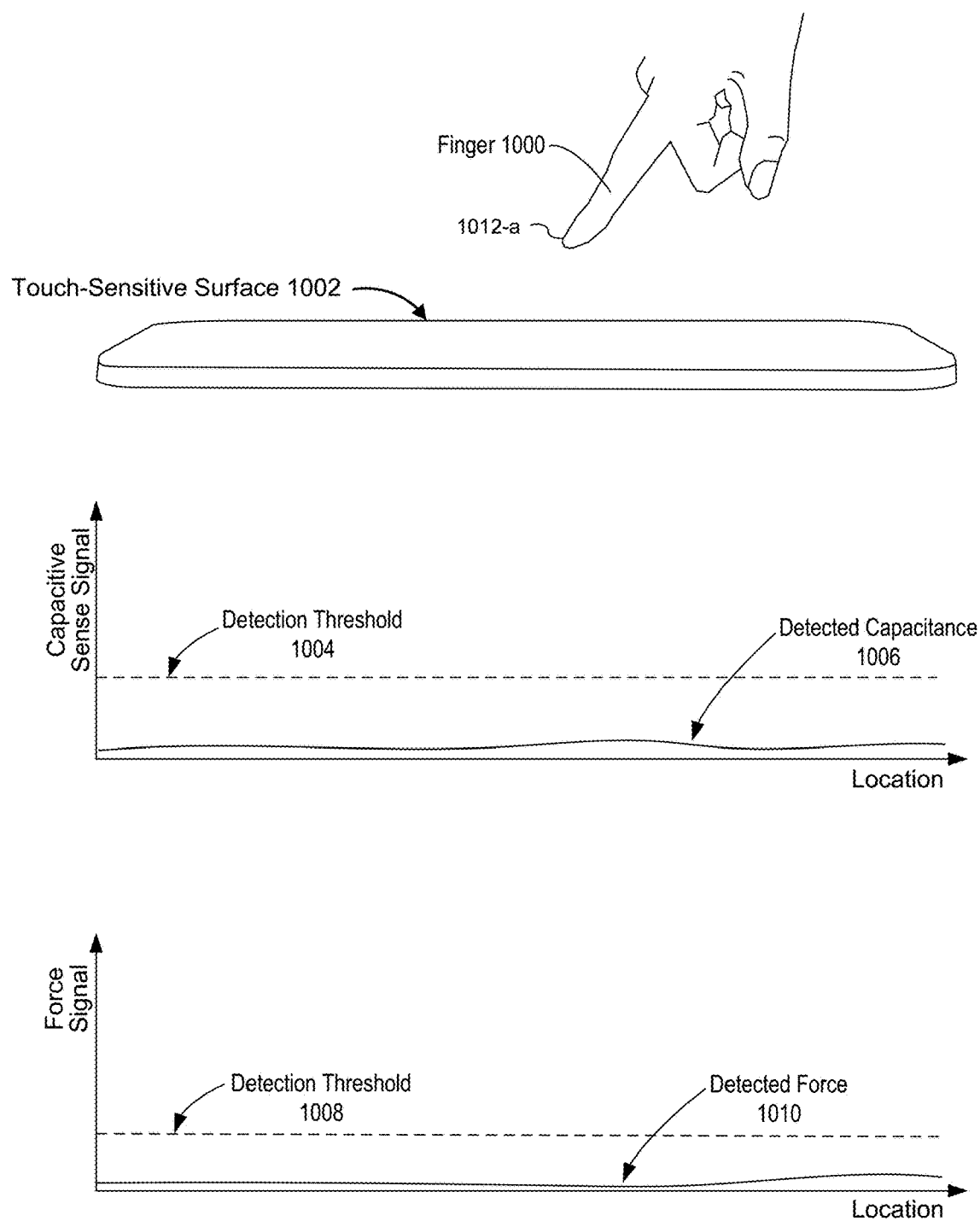
Figure 10B:
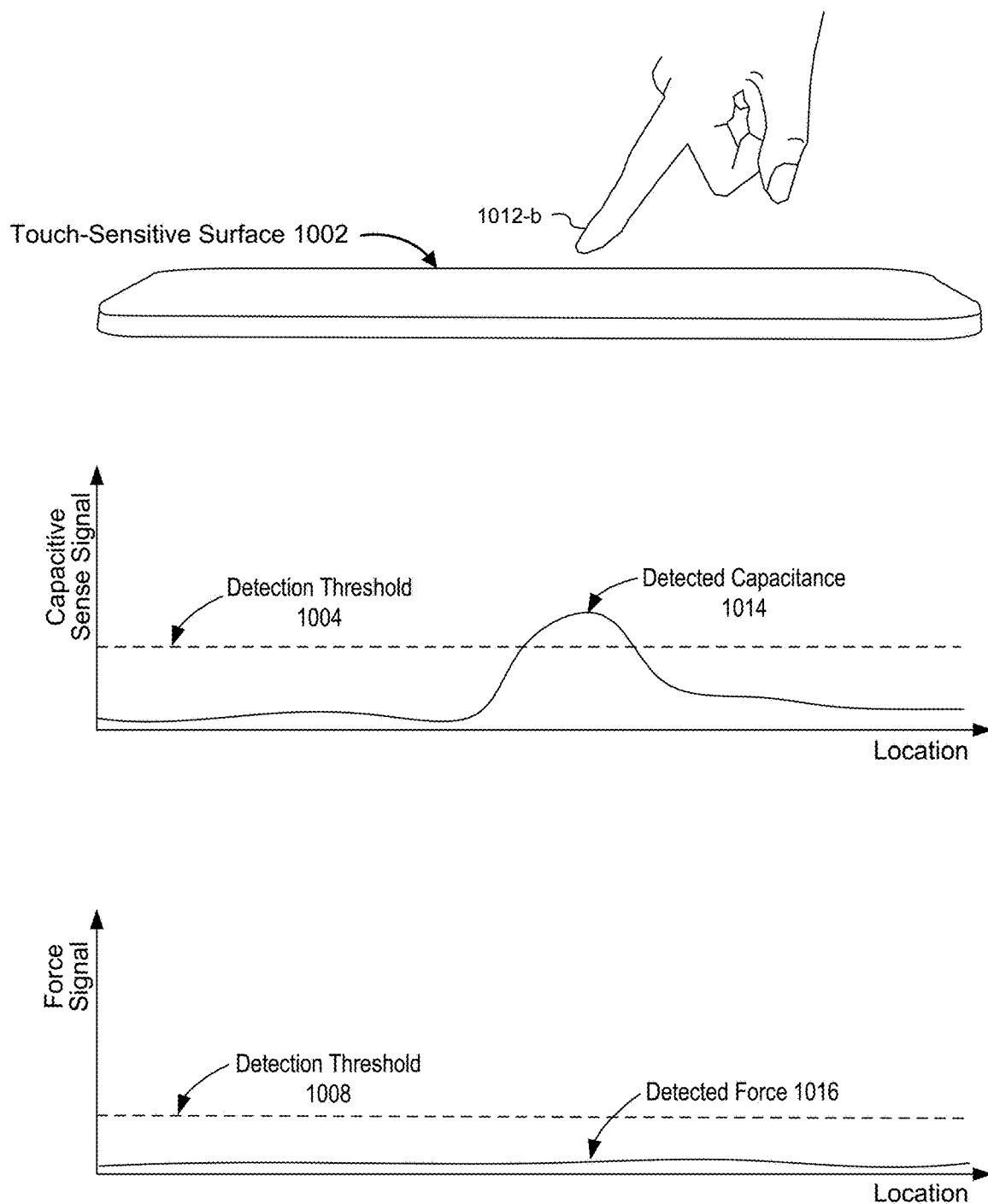

FIGS. 10A-10C show a finger 1012 transitioning from hovering above the touch-sensitive surface 1002 to contacting the surface. FIGS. 10A and 10B show a touch-sensitive surface 1002 with a finger 1000 hovering above the surface. FIG. 10A shows the finger 1012 at a position 1012-*a*. FIG. 10A also shows a corresponding detected capacitance 1006 below a touch detection threshold 1004 and a corresponding detected force 1010 below a force detection threshold 1008. FIG. 10B shows the finger 1000 at a position 1012-*b*, closer to the touch-sensitive surface 1002 than position 1012-*a* in FIG. 10A. FIG. 10B also shows a detected capacitance 1014 with a spike above the touch detection threshold 1004 at a location corresponding to the finger 1000. FIG. 10B further shows a corresponding detected force 1016 below the force detection threshold 1008 (e.g., without a spike at a location corresponding to the finger 1000).

FIG. 10C shows the finger 1000 touching the touch-sensitive surface 1002 at a position 1012-*c*. FIG. 10C also shows a detected capacitance 1018 with a spike above the touch detection threshold 1004 at a location corresponding to the finger 1000. FIG. 10C further shows a detected force 1020 with a spike above the force detection threshold 1008 at a location corresponding to the finger 1000.

FIGS. 10D and 10E show a detected capacitance ceasing to exceed the touch detection threshold 1004 for a finger in contact with the touch-sensitive surface 1002 (e.g., due to environmental conditions such as temperature). FIG. 10D shows the finger 1012 at the position 1012-*c* on the touch-sensitive surface 1002, unchanged from FIG. 10C. FIG. 10D also shows the detected capacitance 1022 slightly exceeding the detection threshold 1004, but lower than the detected capacitance 1018 in FIG. 10C. FIG. 10D further shows the detected force 1020 unchanged. In some circumstances, as illustrated in FIGS. 10C and 10D, the detected force 1020 remains essentially unchanged due to insulation from the environmental conditions impacting the detected capacitance 1022.

FIG. 10E shows the finger 1012 at the position 1012-c on the touch-sensitive surface 1002, unchanged from FIG. 10D. FIG. 10E also shows the detected capacitance 1024 lower than the previous detected capacitance 1022 in FIG. 10D and below the touch detection threshold 1004. FIG. 10E further shows the detected force 1026 exceeding the detection threshold 1008 and essentially unchanged. In some circumstances, as illustrated in FIGS. 10D and 10E, the pressure from the finger 1012 varies and thus the detected forces 1020 and 1026 vary accordingly.

FIGS. 10F-10H show a finger 1028 with a foreign substance 1034 (e.g., water) hovering above the touch-sensitive surface 1002, making contact, then lifting off and leaving the foreign substance 1034 on the touch-sensitive surface. FIG. 10F shows the finger 1028 with the foreign substance 1034 hovering above the touch-sensitive surface 1002. FIG. 10F also shows the corresponding detected capacitance 1030 below the touch detection threshold 1004 and the corresponding detected force 1032 below the force detection threshold 1008.

FIG. 10G shows the finger 1028 with the foreign substance 1034 touching the touch-sensitive surface 1002. FIG. 10G also shows the detected capacitance 1036 with a spike above the touch detection threshold 1004 at a location corresponding to the location of the finger 1028. FIG. 10F further shows the detected force 1038 with a spike above the force detection threshold 1008 at a location corresponding to the location of the finger 1028.

FIG. 10H shows the finger 1028 hovering above the touch-sensitive surface 1002 and the foreign substance 1034 remaining on the touch-sensitive surface. FIG. 10H also shows the corresponding detected capacitance 1040 with a spike above the touch detection threshold 1004 at a location corresponding to the location of the foreign substance 1034. FIG. 10H further shows the corresponding detected force 1042 below the force detection threshold 1008.

Figure 11:
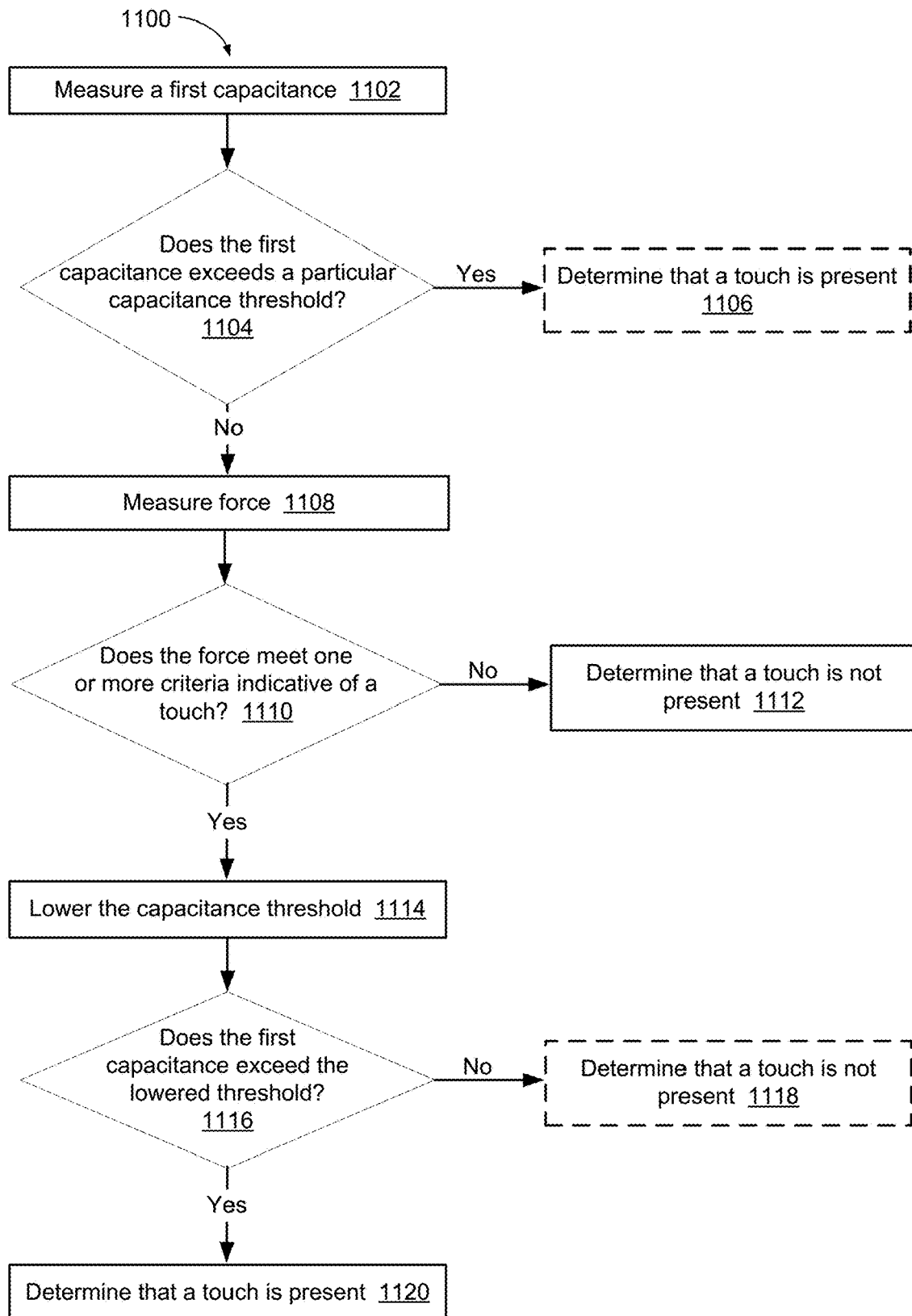
FIG. 11 is a flowchart illustrating a method of determining whether a touch is present, in accordance with some implementations.
Figure 12:
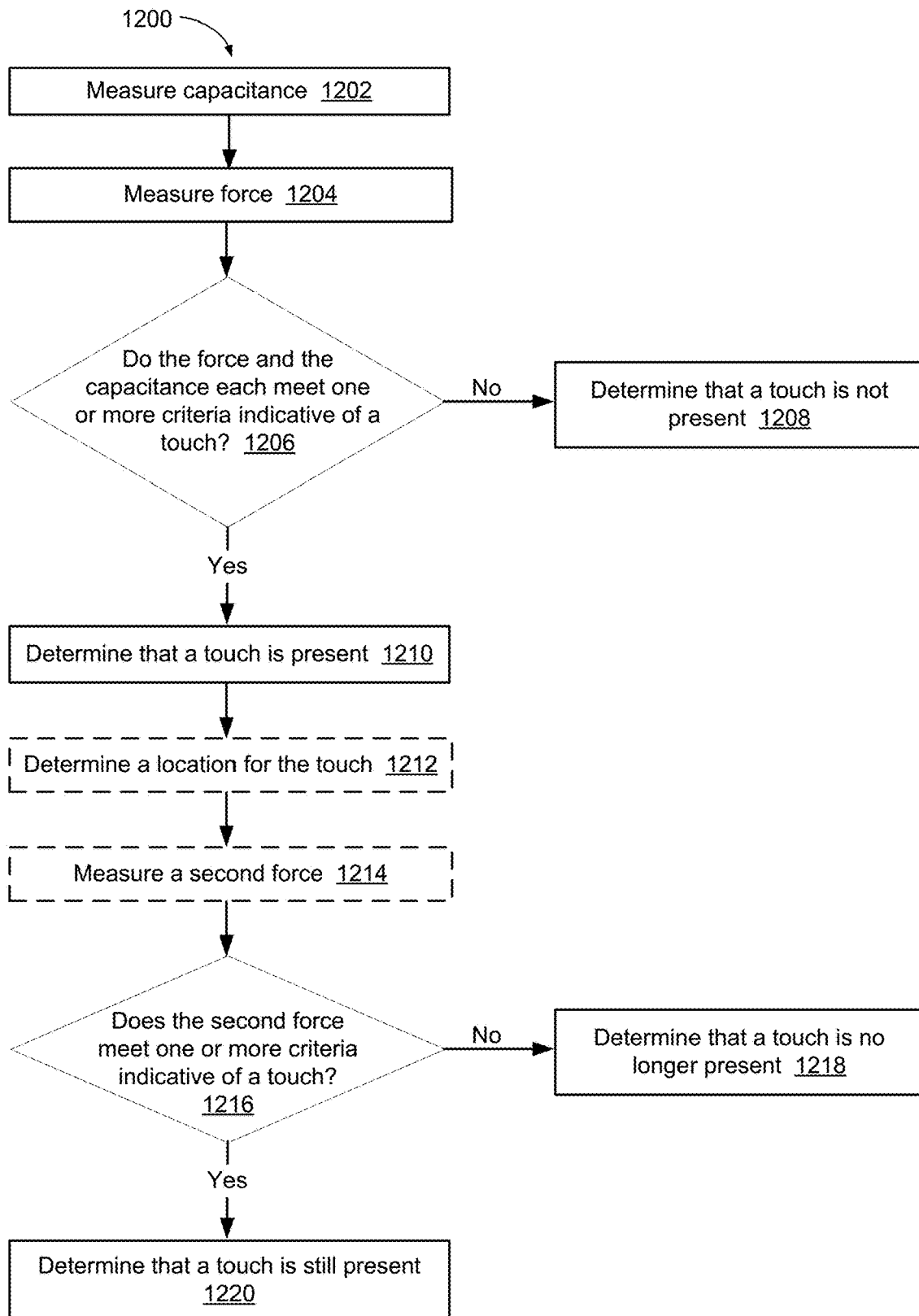
FIG. 12 is a flowchart illustrating another method of determining whether a touch is present, in accordance with some implementations.

Attention is now directed to the flowcharts in FIGS. 11 and 12. FIG. 11 provides a flowchart for a method 1100 of determining whether a touch is present, in accordance with some implementations. FIG. 12 provides a flowchart for a method 1200 of determining whether a touch is present, in accordance with some implementations.

In some implementations, the methods 1100 and 1200 are performed by an electronic system 100 (FIG. 1A) or one or more components thereof, such as a capacitance sense circuit 101 and/or a processing core 109. In some implementations, the methods 1100 and 1200 are performed by a touch detection device or a component thereof. In some implementations, the operations of the methods 1100 and 1200 described herein are interchangeable, and respective operations of the methods 1100 and 1200 are performed by any of the aforementioned devices, systems, or combination of devices and/or systems. In some embodiments, the methods 1100 and 1200 are governed by instructions that are stored in a non-transitory computer-readable storage medium, and are executed by one or more processors of a device/computing system, such as the processing core 109 of the electronic system 100. For convenience, the methods 1100 and 1200 will be described below as being performed by a touch detection device.

Referring to FIG. 11, the touch detection device measures (1102) a first capacitance. In some implementations, the first capacitance corresponds to a touch-sensitive surface, such as the touch-sensitive surface 902 in FIG. 9B. In some implementations, measuring the first capacitance includes measuring a self-capacitance of one or more capacitive touch sensors. For example, one or more row sense electrodes 301-310 and/or one or more of column sense electrodes 311-318 as illustrated in FIG. 3A. In some implementations, measuring the first capacitance includes measuring a mutual capacitance across a plurality of capacitive touch sensors. In some implementations, measuring the first capacitance comprises measuring a capacitance from each sense electrode in a sense array (e.g., each sense electrode in the capacitive sense array 125 in FIG. 1A). In some implementations, the touch detection device utilizes capacitance sense circuitry 101 (e.g., in conjunction with a force and touch sense driver 102) to measure the first capacitance. In some implementations, the device measures a first capacitance of at least a subset of the plurality of sense electrodes. In some implementations, the touch detection device utilizes a touch capacitance module 160 to measure the first capacitance (e.g., in conjunction with the capacitance sense circuitry 101).

In some implementations, prior to measuring the first capacitance, the device sets a capacitance threshold to a first value. For example, in accordance with some implementations, the device corresponding to FIG. 9A sets the touch detection threshold 904 to a value of C1. In some implementations, the device sets the touch detection threshold based on one or more environmental conditions (e.g., temperature and/or humidity). In some implementations, the device sets the touch detection threshold based an analysis of the noise in the detected capacitance 906.

The device determines (1104) whether the first capacitance exceeds a particular capacitance threshold (e.g., a touch capacitance threshold, such as the touch detection threshold 904 in FIG. 9A). In some implementations, the device determines whether the first capacitance meets or exceeds a particular capacitance threshold. In some implementations, the device determines whether the first capacitance meets one or more criteria indicative of a touch input. In some implementations, the particular capacitance threshold is an adaptive threshold set to a particular value. For example, FIG. 9B shows a touch detection threshold 904 at a value of C1. In accordance with some implementations, the detection device corresponding to FIG. 9B determines whether the detected capacitance 914 exceeds the touch detection threshold 904 at value C1. In some implementations, the touch detection device utilizes capacitance sense circuitry 101 and/or a processing core 109 to determine whether the first capacitance exceeds the particular capacitance threshold. In some implementations, the device determines whether a magnitude of the measured first capacitance exceeds an adaptive threshold set to a first value. In some implementations, the touch detection device utilizes a touch capacitance module 160 (e.g., in conjunction with the capacitance sense circuitry 101) to determine whether the first capacitance exceeds the particular threshold.

In some implementations, in accordance with a determination that the first capacitance exceeds the particular capacitance threshold, the device determines (1106) that a touch is present. In some implementations, in accordance with a determination that the first capacitance meets or exceeds the particular capacitance threshold, the device determines that a touch is present. For example, in accordance with some implementations, the device corresponding to FIG. 9C determines that the detected capacitance 914 exceeds the touch detection threshold 916, and determines that a touch 912 is present on the touch-sensitive surface 902. In some implementations, after determining that the touch is present, the device determines a location of the touch on the touch-sensitive surface. For example, in accordance with some implementations, the device corresponding to FIG. 9C determines a location of the touch 912 on the touch-sensitive surface 902 (e.g., corresponding to the spike in the detected capacitance at location L1). In some implementations, the touch detection device utilizes capacitance sense circuitry 101 and/or a processing core 109 to determine that the touch is present on a touch-sensitive surface. In some implementations, the touch detection device utilizes a touch capacitance module 160 and/or a 3D touch module 164 to determine that the touch is present.

In accordance with a determination that the first capacitance does not exceed the particular capacitance threshold, the device measures (1108) a force (e.g., using the force capacitance module 162). In some implementations, the force corresponds to a touch-sensitive surface, such as the touch-sensitive surface 902 in FIG. 9C. For example, FIG. 9C shows a detected force 916 corresponding to a touch 912 on the touch-sensitive surface 902. In some implementations, the measured force corresponds to compression of a compression layer (e.g., the air gap 216 in FIG. 2B) resulting from a force on the touch-sensitive surface. In some implementations, measuring the force includes measuring a signal from one or more force electrodes (e.g., the force electrodes 128 in FIG. 1A). In some implementations, measuring the force includes measuring a capacitance from one or more force electrodes. In some implementations, the touch detection device utilizes capacitance sense circuitry 101 (e.g., in conjunction with a force and touch sense driver 102) to measure the force. In some implementations, in accordance with a determination that the magnitude of the measured first capacitance does not exceed the adaptive threshold, the device determines, at least preliminarily, that a touch input is not present on the touch surface. For example, the device preliminarily determines that a touch input is not present and then measures a force to assess the preliminary determination.

In some implementations, the device measures a force signal of at least one of one or more force electrodes. In some implementations, the device measures the force signal of the at least one of one or more force electrodes in accordance with the determination that the magnitude of the measured first capacitance does not exceed the adaptive threshold. In some implementations, the device measures the force concurrently with measuring the first capacitance. In some implementations, the device measures the first capacitance and the force prior to determining whether the first capacitance meets or exceeds the particular capacitance threshold. In some implementations, measuring the first capacitance of the at least a subset of the plurality of sense electrodes and measuring the force of the at least one of the one or more force electrodes includes concurrently measuring the first capacitance of the at least a subset of the plurality of sense electrodes and measuring the force of the at least one of the one or more force electrodes.

The device determines (1110) whether the force meets one or more criteria indicative of a touch (e.g., using a force capacitance module 162 and/or the force threshold information 176). In some implementations, the touch detection device utilizes capacitance sense circuitry 101 and/or a processing core 109 to determine whether the force meets the one or more criteria indicative of a touch. In some implementations, determining whether the force meets the one or more criteria indicative of a touch includes determining whether the force meets or exceeds a force detection threshold, such as the force detection threshold 908 in FIG. 9C. In some implementations, determining whether the force meets the one or more criteria indicative of a touch includes determining whether the force has one or more characteristics (e.g., a force shape across the force sensor array) consistent with a touch input, instead of force characteristics consistent with a force applied by a grip or device holder.

In accordance with a determination that the force does not meet the one or more criteria indicative of a touch, the device determines (1112) that a touch is not present (e.g., using the force capacitance module 162 and/or the 3D touch module 164). For example, the device determines that the measured force does not exceed a force detection threshold (e.g., detection threshold 908, FIG. 9C); or determines that the measured force is consistent with a force applied by a grip on the device rather than a touch input. In some implementations, the touch detection device utilizes the capacitance sense circuitry 101 and/or the processing core 109 to determine that a touch is not present on the touch-sensitive surface. For example, in accordance with some implementations, the device corresponding to FIG. 10B determines that a touch is not present because the detected force 1016 does not exceed the force detection threshold 1008.

In accordance with a determination that the force does meet the one or more criteria indicative of a touch, the device lowers (1114) the capacitance threshold (e.g., using the touch capacitance threshold module 170). For example, in accordance with some implementations, the device in FIG. 9B determines that the detected force 916 corresponding to the touch 912 exceeds the detection threshold 908 and adjusts the capacitance detection threshold 904 from a value of C1 in FIG. 9B to a value of C2 in FIG. 9C. In some implementations, the device lowers the capacitance threshold from a first predetermined value to a second predetermined value of a plurality of predetermined values. In some implementations, the predetermined threshold values are stored in memory on the device (e.g., in the RAM 105 and/or the NVM 104 in FIG. 1A). In some implementations, the device lowers the capacitance threshold by a predetermined amount. In some implementations, the device lowers the capacitance threshold to a value based on one or more characteristics of the measured force (e.g., amplitude of the measured force signal) and/or noise present in the measured capacitance signal. In some implementations, in accordance with a determination that the measured force meets one or more predefined criteria indicative of a touch input, the device sets the adaptive threshold to a second value, lower than the first value.

In some implementations, in accordance with the determination that the force does meet the one or more criteria indicative of a touch, the device amplifies the first capacitance by a predetermined amount (e.g., 1.5 times or 2 times). In some implementations, the device determines whether the amplified first capacitance meets or exceeds the touch capacitance threshold.

In some implementations, in accordance with the determination that the force does meet the one or more criteria indicative of a touch, the device adjusts a gain for the capacitance sensors (e.g., increases the gain) and measures a second capacitance with the adjusted gain. In some implementations, the device determines whether the second capacitance meets or exceeds the touch capacitance threshold. In some implementations, in accordance with a determination that the magnitude of the measured second capacitance does not exceed the touch capacitance threshold, the device determines that the touch input is not present on the touch surface The device determines (1116) whether the first capacitance exceeds the lowered capacitance threshold (e.g., using the touch capacitance module 160 and/or the capacitance threshold information 174). In some implementations, the device determines whether the first capacitance meets or exceeds the lowered capacitance threshold. In some implementations, the lowered capacitance threshold is an adaptive threshold set to a lowered value. For example, FIG. 9C shows the touch detection threshold 904 at a value of C2, lower than the value of C1 in FIG. 9B. In accordance with some implementations, the detection device corresponding to FIG. 9C determines whether the detected capacitance 914 exceeds the touch detection threshold 904 at value C2. In some implementations, the touch detection device utilizes the capacitance sense circuitry 101 and/or the processing core 109 to determine whether the first capacitance exceeds the lowered capacitance threshold.

In some implementations, after measuring the force, the device determines whether the magnitude of the measured first capacitance exceeds the adaptive threshold set to the second value. In some implementations, in accordance with a determination that the magnitude of the measured first capacitance exceeds the adaptive threshold, the device determines that the touch input is present on the touch surface.

In some implementations, the device measures a second capacitance of at least the subset of the plurality of sense electrodes. In some implementations, the device determines whether a magnitude of the measured second capacitance exceeds the adaptive threshold set to the second value. In some implementations, in accordance with a determination that the magnitude of the measured second capacitance exceeds the adaptive threshold, the device determines that the touch input is present on the touch surface.

In some implementations, in accordance with a determination that the first capacitance exceeds the lowered capacitance threshold, the device determines (1120) that a touch is present (e.g., using the touch capacitance module 160 and/or the 3D touch module 164). In some implementations, in accordance with a determination that the first capacitance meets or exceeds the lowered capacitance threshold, the device determines that a touch is present. For example, in accordance with some implementations, the device corresponding to FIG. 9C determines that the detected capacitance 914 exceeds the touch detection threshold 916, and determines that a touch 912 is present on the touch-sensitive surface 902. In some implementations, after determining that the touch is present, the device determines a location of the touch on the touch-sensitive surface. For example, in accordance with some implementations, the device corresponding to FIG. 9C determines a location of the touch 912 on the touch-sensitive surface 902 (e.g., corresponding to the spike in the detected capacitance at location L1). In some implementations, the touch detection device utilizes the capacitance sense circuitry 101 and/or the processing core 109 to determine that the touch is present on a touch-sensitive surface.

In some implementations, after determining that the touch input is present on the touch surface, the device determines a location of the touch input based on the measured second capacitance and the measured force. In some implementations, the touch detection device utilizes the capacitance sense circuitry 101 and/or the processing core 109 to determine the location of the touch input.

In some implementations, in accordance with a determination that the first capacitance does not exceed the lowered capacitance threshold, the device determines (1118) that a touch is not present (e.g., using the touch capacitance module 160 and/or the 3D touch module 164). For example, the device determines that the first capacitance does not exceed the lowered capacitance detection threshold (e.g., the detection threshold 904 at value C2 in FIG. 9C). In some implementations, the touch detection device utilizes the capacitance sense circuitry 101 and/or the processing core 109 to determine that a touch is not present on the touch-sensitive surface.

In some implementations, in accordance with a determination that the first capacitance does not exceed the lowered capacitance threshold, the device lowers the capacitance threshold once again (e.g., repeats operation 1114). In some implementations, the device repeats the threshold lowering and determination as to whether the capacitance exceeds the lowered threshold a preset number of times (e.g., 3 times). In some implementations, the device repeats the threshold lowering and determination as to whether the capacitance exceeds the lowered threshold until a minimum capacitance threshold value is reached.

In some implementations, the device compares the detected capacitance to the detected force to determine whether one or more potential touch inputs is a false positive. For example, in accordance with some implementations, the device corresponding to FIG. 9E determines that the spike in the detected capacitance 922 at location L3 corresponds to a false positive while the spike in the detected capacitance 922 at location L2 corresponds to a touch input (touch input 912), by comparing the detected capacitance 922 with the detected force 924. In some implementations, in accordance with a determination that one or more potential touch inputs is a false positive, the device increases the capacitance detection threshold. For example, the device in FIG. 9F increases the value of the touch detection threshold 904 from C2 in FIG. 9E to C3 in FIG. 9F.

Referring to FIG. 12, the touch detection device measures (1202) a capacitance (e.g., using the touch capacitance module 160). In some implementations, the capacitance corresponds to a touch-sensitive surface, such as the touch-sensitive surface 1002 in FIG. 10A. In some implementations, measuring the capacitance includes measuring a self-capacitance of one or more capacitive touch sensors. For example, one or more row sense electrodes 301-310 and/or one or more of column sense electrodes 311-318 as illustrated in FIG. 3A. In some implementations, measuring the capacitance includes measuring a mutual capacitance across a plurality of capacitive touch sensors. In some implementations, measuring the capacitance comprises measuring a capacitance from each sense electrode in a sense array (e.g., each sense electrode in the capacitive sense array 125 in FIG. 1A). In some implementations, the touch detection device utilizes capacitance sense circuitry 101 (e.g., in conjunction with a force and touch sense driver 102) to measure the capacitance.

The device measures (1204) a force (e.g., using the force capacitance module 162). In some implementations, the force corresponds to a touch-sensitive surface, such as touch-sensitive surface 1002 in FIG. 10A. For example, FIG. 10C shows a detected force 1020 corresponding to a touch 1012 on the touch-sensitive surface 1002. In some implementations, the measured force corresponds to compression of a compression layer (e.g., the air gap 216 in FIG. 2B) resulting from a force on the touch-sensitive surface. In some implementations, measuring the force includes measuring a signal from one or more force electrodes (e.g., the force electrodes 128 in FIG. 1A). In some implementations, measuring the force includes measuring a capacitance signal from the one or more force electrodes. In some implementations, the touch detection device utilizes capacitance sense circuitry 101 (e.g., in conjunction with the force and touch sense driver 102) to measure the force. In some implementations, the device measures a force signal of at least one of one or more force electrodes. In some implementations, the device measures the force concurrently with measuring the capacitance.

The device determines (1206) whether the measured capacitance and the measured force each meet one or more criteria indicative of a touch (e.g., using the touch capacitance module 160, force capacitance module 162, and/or 3D touch module 164). In some implementations, the touch detection device utilizes capacitance sense circuitry 101 and/or a processing core 109 to determine whether the force meets one or more criteria indicative of a touch. In some implementations, determining whether the force meets the one or more criteria indicative of a touch includes determining whether the force meets or exceeds a force detection threshold, such as the force detection threshold 1008 in FIG. 10A. In some implementations, determining whether the force meets the one or more criteria indicative of a touch includes determining whether the force has one or more characteristics (e.g., a force shape across the force sensor array) consistent with a touch input, instead of force characteristics consistent with a force applied by a grip or device holder.

In some implementations, determining whether the measured capacitance meets one or more criteria indicative of a touch includes determining whether the measured capacitance meets or exceeds a particular capacitance threshold, such as the touch detection threshold 1004 in FIG. 10A. In some implementations, the capacitance threshold is an adaptive threshold set to a particular value. For example, FIG. 9B shows a touch detection threshold 904 at a value of C1. In some implementations, the touch detection device utilizes the capacitance sense circuitry 101 and/or the processing core 109 to determine whether the capacitance meets the one or more criteria indicative of a touch. In some implementations, determining whether the measured capacitance meets one or more criteria indicative of a touch includes determining whether the capacitance has one or more characteristics (e.g., a capacitance shape across the sensor array) consistent with a touch input, instead of characteristics consistent with a capacitance due to foreign objects in contact with the touch-sensitive surface and/or capacitance due to environmental conditions such as temperature, humidity, or various noise sources.

In accordance with a determination that the measured capacitance and/or the measured force does not meet the one or more criteria indicative of a touch, the device determines (1208) that a touch is not present (e.g., using the 3D touch module 164). For example, in accordance with some implementations, the device corresponding to FIG. 10A determines that a touch is not present (e.g., that the finger 1012 is not in contact with the touch surface 1002) based on the detected capacitance 1006 not exceeding (or meeting) the touch detection threshold 1004 and/or the detected force 1010 not exceeding (or meeting) the force detection threshold 1008. As another example, in accordance with some implementations, the device corresponding to FIG. 10B determines that a touch is not present (e.g., that the finger 1012 is not in contact with the touch surface 1002) based on the detected force 1016 not exceeding (or meeting) the force detection threshold 1008. In some implementations, the touch detection device utilizes the capacitance sense circuitry 101 and/or the processing core 109 to determine whether a touch is present on the touch-sensitive surface.

In some implementations, in accordance with a determination that the measured capacitance meets the one or more first predefined criteria and a determination that the measured force does not meet the one or more second predefined criteria, the device determines that a touch input is not present on the touch surface. In some implementations, the measured capacitance and the measured force are indicative of an object hovering over the touch surface. For example, FIG. 10B shows a finger 1012 hovering over the touch-sensitive surface 1002 and a corresponding detected capacitance 1014 with a spike above the touch detection threshold 1004, but the detected force 1016 does not exceed the force detection threshold 1008. In some implementations, the measured capacitance and the measured force are indicative of water deposition on the touch surface. For example, FIG. 10H shows a foreign substance 1034, such as water, on the touch-sensitive surface 1002 and a corresponding detected capacitance 1040 with a spike exceeding the touch detection threshold 1004, but the detected force 1042 does not exceed the force detection threshold 1008.

In accordance with a determination that the measured capacitance and the measured force each meet the one or more criteria indicative of a touch, the device determines (1210) that a touch is present (e.g., using the 3D touch module 164). In some implementations, in accordance with a determination that the measured capacitance meets or exceeds a capacitance threshold and a determination that the measured force meets or exceeds a force detection threshold, the device determines that a touch is present. For example, in accordance with some implementations, the device corresponding to FIG. 10C determines that a touch is present (e.g., that the finger 1012 is in contact with the touch surface 1002) based on the detected capacitance 1006 exceeding (or meeting) the touch detection threshold 1004 and the detected force 1010 exceeding (or meeting) the force detection threshold 1008. In some implementations, the touch detection device utilizes the capacitance sense circuitry 101 and/or the processing core 109 to determine that the touch is present on a touch-sensitive surface. In some implementations, determining that a touch is present on the touch-sensitive surface includes determining a location of the touch input.

In some implementations, the device determines (1212) a location for the touch (e.g., using the touch location module 172). For example, in accordance with some implementations, the device corresponding to FIG. 10C determines a location 1012-c of the touch 1012 on the touch-sensitive surface 1002 (e.g., corresponding to the spike in the detected capacitance). In some implementations, the touch detection device utilizes capacitance sense circuitry 101 and/or processing core 109 to determine that the touch is present on a touch-sensitive surface. In some implementations, in accordance with a determination that the touch input is present on the touch surface, the device determines a location of the touch input based on the measured capacitance and the measured force.

In some implementations, the device measures (1214) a second force (e.g., with force capacitance module 162). In some implementations, measuring the second force is the same or similar to measuring the force in operation 1204 discussed previously. In some implementations, the device periodically measures the force applied to the touch-sensitive surface (e.g., touch-sensitive surface 1002). For example, FIGS. 10D and 10E show subsequent force measurements, which are the detected force 1020 in FIG. 10D and the detected force 1026 in FIG. 10E. In some implementations, the touch detection device utilizes capacitance sense circuitry 101 (e.g., in conjunction with the force and touch sense driver 102) to measure the second force.

In some implementations, after determining a location for the touch, the device: (1) measures a second capacitance of at least the subset of the plurality of sense electrodes; and (2) measures a second force of the at least one of the one or more force electrodes.

In some implementations, the device determines (1216) whether the second force meets one or more criteria indicative of a touch (e.g., using the force capacitance module 162 and/or the force threshold information 176). In some implementations, the touch detection device utilizes the capacitance sense circuitry 101 and/or the processing core 109 to determine whether the second force meets one or more criteria indicative of a touch. In some implementations, determining whether the second force meets the one or more criteria indicative of a touch includes determining whether the second force meets or exceeds a force detection threshold, such as the force detection threshold 1008 in FIG. 10D. In some implementations, determining whether the second force meets the one or more criteria indicative of a touch includes determining whether the second force has one or more characteristics (e.g., a force shape across the force sensor array) consistent with a touch input, instead of force characteristics consistent with a force applied by a grip or device holder.

In some implementations, in accordance with a determination that the second force does not meet the one or more criteria indicative of a touch, the device determines (1218) that the touch is no longer present (e.g., using the force capacitance module 162 and/or the 3D touch module 164). For example, the device determines that the measured force does not exceed a force detection threshold (e.g., the force detection threshold 1008 in FIG. 10F); or determines that the measured force is consistent with a force applied by a grip on the device rather than a touch input. In some implementations, the touch detection device utilizes the capacitance sense circuitry 101 and/or the processing core 109 to determine that a touch is not present on the touch-sensitive surface. For example, in accordance with some implementations, the device corresponding to FIG. 10F determines that a touch is not present because the detected force 1032 does not exceed the force detection threshold 1008.

In some implementations, the device determines that the touch is no longer present based on the second force, without measuring a second capacitance. In some implementations, the device determines that the touch is no longer present based on the determination that the second force does not meet the one or more criteria and/or a determination that a second capacitance does not meet one or more criteria indicative of a touch input.

In some implementations, in accordance with a determination that the measured second capacitance meets the one or more first predefined criteria and a determination that the measured second force does not meet one or more second predefined criteria, the device determines that the touch input is not present on the touch surface. For example, the sensing layer senses a capacitance due to water left by a wet finger.

In some implementations, in accordance with a determination that the second force does meet the one or more criteria indicative of a touch, the device determines (1220) that the touch is still present (e.g., using the force capacitance module 162 and/or the 3D touch module 164). In some implementations, the device determines that the touch is still present based on the second force, without measuring a second capacitance or without regards to a measured second capacitance. For example, FIGS. 10D and 10E show a touch 1012 on the touch-sensitive surface 1002, yet the detected capacitance lowers from slightly above the touch detection threshold 1004 in FIG. 10D to below the touch detection threshold 1004 in FIG. 10E. In some circumstances this effect is caused by temperature changes at the touch-sensitive surface. In this example, in accordance with some implementations, the device determines that the touch 1012 is still present on the touch-sensitive surface 1002 (and at the same location) based on the measured force 1026 having a spike above the force detection threshold 1008 in FIG. 10E. In some implementations, the device determines that the touch is still present based on the determination that the second force meets the one or more criteria and a determination that a second capacitance meets one or more criteria indicative of a touch input (e.g., the second capacitance has a magnitude that exceeds a touch detection threshold, such as the touch detection threshold 1004 or a lowered touch detection threshold).

In some implementations, in accordance with a determination that the measured second capacitance does not meet the one or more first predefined criteria and a determination that the measured second force meets one or more second predefined criteria, the device determines that the touch input continues to be present on the touch surface. In some implementations, the measured second capacitance and the measured second force are indicative of an increase in temperature on the touch surface. For example, the capacitance does not meet the criteria due to temperature changes or water on the touch surface.

In some implementations, the device compares the previously measured force with the second force. In some implementations, the device determines whether the second force has similar or same characteristics as the previously measured force. For example, the device determines whether the previously measured force and the second force have a same or similar profile across the touch-sensitive surface. In some implementations, the device determines whether the previously measured force and the second force correspond to a touch at a same or similar location on the touch-sensitive surface. In some implementations, in accordance with a determination that the previously measured force and the second force have similar or the same characteristics, the device determines that the touch is still present (and at the same location) on the touch-sensitive surface.

In some implementations, in accordance with the determination that the touch input continues to be present on the touch surface, the device sets the touch input location as the previously determined location. In some implementations, the device holds the location as the last determined location until the sense layer once again senses the touch.

In some implementations, the touch detection device includes: (1) a touch surface; (2) a plurality of sense electrodes coupled to the touch surface and configured to sense capacitance of a touch input; (3) one or more force electrodes coupled to the touch surface and configured to sense force of the touch input; and (4) a sensing module (e.g., the capacitance sense circuit 101 in FIG. 1A) electrically coupled to the plurality of sense electrodes and the one or more force electrodes. In some implementations, the plurality of sense electrodes are in a touch-sensing electrode layer coupled to the touch surface, such as the glass with sensor array 204 in FIG. 2B. In some implementations, the device includes a compressible layer, and the one or more force electrodes are in a conductive layer coupled to the compressible layer. The force electrodes measure distortions in the compressible layer due to an applied force. In some implementations, the compressible layer is an air gap, such as the air gap 216 in FIG. 2B.

In some implementations, the sensing module is configured to: (1) measure capacitance of at least a subset of the plurality of sense electrodes; (2) measure force applied to at least one of the one or more force electrodes; and (3) in accordance with a determination that the measured capacitance meets one or more first predefined criteria indicative of a touch input and a determination that the measured force meets one or more second predefined criteria indicative of a touch input, determine that the touch input is present on the touch surface.

In some implementations, the device is configured to measure the capacitance of the at least a subset of the plurality of sensing electrodes while in a sensing mode; and is configured to measure the force of at least one of the one or more force electrodes while in a force mode. In some implementations, in the sensing mode, the device is configured to set the one or more force electrodes electrically afloat; and, in the force mode, the device is configured to drive the one or more force electrodes.

Suppression of Touch Detection Caused by Water Drops

An electronic system 100 having a touch sensing surface is exposed to water in a variety of situations (e.g., when the electronic system 100 is used in a rain or snow storm, when a wet object touches the touch sensing surface, when temperature variation causes condensation, or when a user of the electronic system 100 is engaged in water sports). Capacitive sense signals associated with a touch are often measured from a capacitive sense array 125 with a high level of accuracy in the electronic system 100 in a dry environment. However, when water drops fall on the touch sensing surface, the accuracy of measurement of the capacitive sense signals is normally compromised (e.g., the capacitive sense signals are disrupted or distorted), thereby making it difficult to detect and track touch locations on the touch sensing surface.

In accordance with some implementations of this application, force applied on a touch sensing surface of the electronic system 100 is measured from one or more force electrodes 128 in addition to the capacitive sense signals. Such measured force is associated with touches detected from the capacitive sense signals. The force is then used to calibrate the processing device 110 coupled to the capacitive sense array 125, determine a presence of water drops, determine whether a valid touch occurs in the presence of water, and improve the level of accuracy for touch detection and tracking. For example, when no force is detected from the one or more force electrodes 128 while the capacitive sense signals still indicate that there is a candidate touch on an area of the touch sensing surface, it is determined that a water drop has covered the area of the touch sensing surface. Baselines of the subset of sense electrodes are raised to reject the impact of the water drop. Sometimes, force measurement can enable accurate touch detection and tracking, even when the electronic system 100 is submerged entirely underwater (e.g., when a smart watch is worn on the wrist of a swimmer or diver).

Figure 13A:
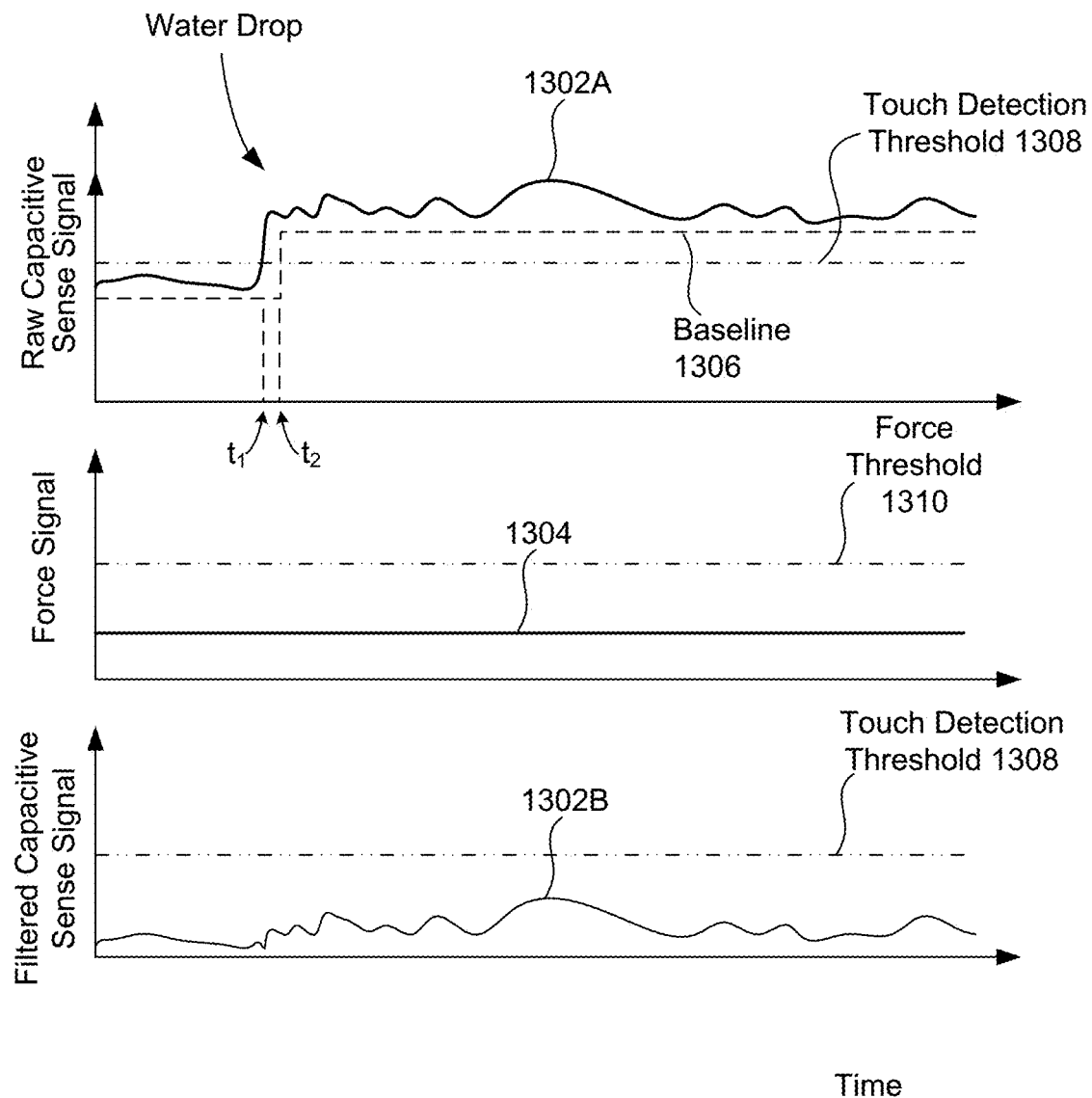
FIGS. 13A-13C are three sets of timing diagrams illustrating a raw capacitive sense signal, a filtered capacitive sense signal, and a force signal measured from a capacitive sense electrode of a capacitive sense array that is covered by a water drop, in accordance with some implementations.
Figure 13B:
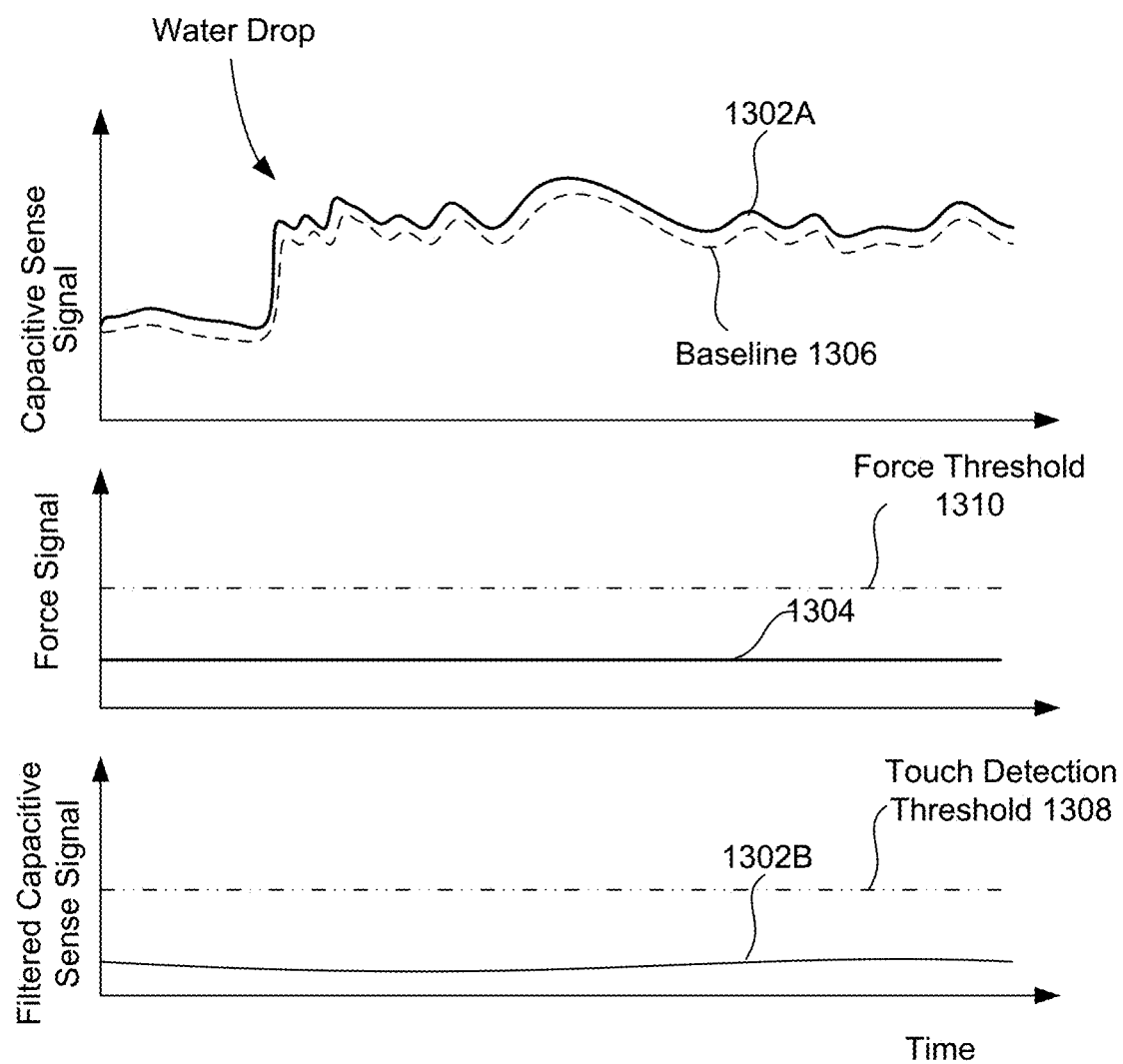

FIGS. 13A and 13B are two sets of timing diagrams, each illustrating a raw capacitive sense signal 1302A, a filtered capacitive sense signal 1302B, and a force signal 1304 measured from a capacitive sense electrode of a capacitive sense array that is covered by a water drop, in accordance with some implementations. The raw capacitive sense signal 1302A is optionally measured based on self capacitance of one of a plurality of sense electrodes of a capacitive sense array 125, or based on mutual capacitance of two of the plurality of sense electrodes of the capacitive sense array 125. The raw capacitive sense signal 1302A is filtered with a baseline 1306 prior to being further processed to determine whether the corresponding sense electrode(s) are associated with a candidate touch. The filtered capacitive sense signal 1302B is then compared with a touch detection threshold 1308. Referring to FIG. 5, the raw capacitive sense signal 1302A is optionally obtained from a capacitive sense scan (e.g., MC0 or SC0), and the force signal 1304 is measured during a force scan (e.g., FS0) that precedes or follows the capacitive sense scan, such that the force signal 1304 is substantially synchronous with the raw capacitive sense signal 1302A.

When a water drop falls onto a touch sensing surface and covers a capacitive sense electrode at a time $t_1$, capacitance change of the capacitance sense electrode can be detected. However, the weight of the water drop is negligibly low, and is insufficient to tilt or bend the stack of the top glass 210, the OCA 208, the glass 204, the LCD 202, and the top conductive layer 212 that are disposed above the compressible gap 216. Thus, at the time $t_1$, when the raw capacitive signal 1302A increases (optionally beyond the touch detection threshold 1306) and force associated with the force signal is substantially small, it is determined that the candidate touch associated with the capacitive sense electrode is caused by a water drop, rather than an object coming into contact with an area of the touch sensing surface corresponding to the capacitive sense electrode.

To prevent false detection of a water drop as a valid touch, the baseline is adjusted to compensate for the shift of the raw capacitive sense signal 1302A caused by the water drop. Specifically, a water-induced increase of the raw capacitive sense signal 1302A is incorporated into the baseline value of the capacitive sense electrode, and the raw capacitive sense signal 1302A is filtered with respect to the adjusted baseline value to result in the filtered capacitive sense signal 1302B. Then, the filtered capacitive sense signal 1302B is compared with the touch detection threshold 1308 to determine subsequent touch events associated with the capacitive sense electrode. Referring to FIG. 13A, it is noted that after the water drop is detected at the time $t_1$, the baseline value of the baseline 1306 is adjusted at a time $t_2$ (which is slightly delayed from the time $t_1$) according to the increase of the raw capacitance sense signal 1302A.

Referring to FIG. 13B, in some implementations, the baseline value of the baseline 1306 is continuously adjusted to track a change of the raw capacitance sense signal 1302A when the force associated with the force signal is substantially small (e.g., when the force signal 1304 is below a force threshold 1310). As such, the filtered capacitive sense signal 1302B is maintained at a substantially low level when a substantially small force is applied on the touch sensing surface. In some implementations, the baseline value of the baseline 1306 is periodically adjusted (instead of continuously) when the force associated with the force signal is substantially small.

Figure 13C:
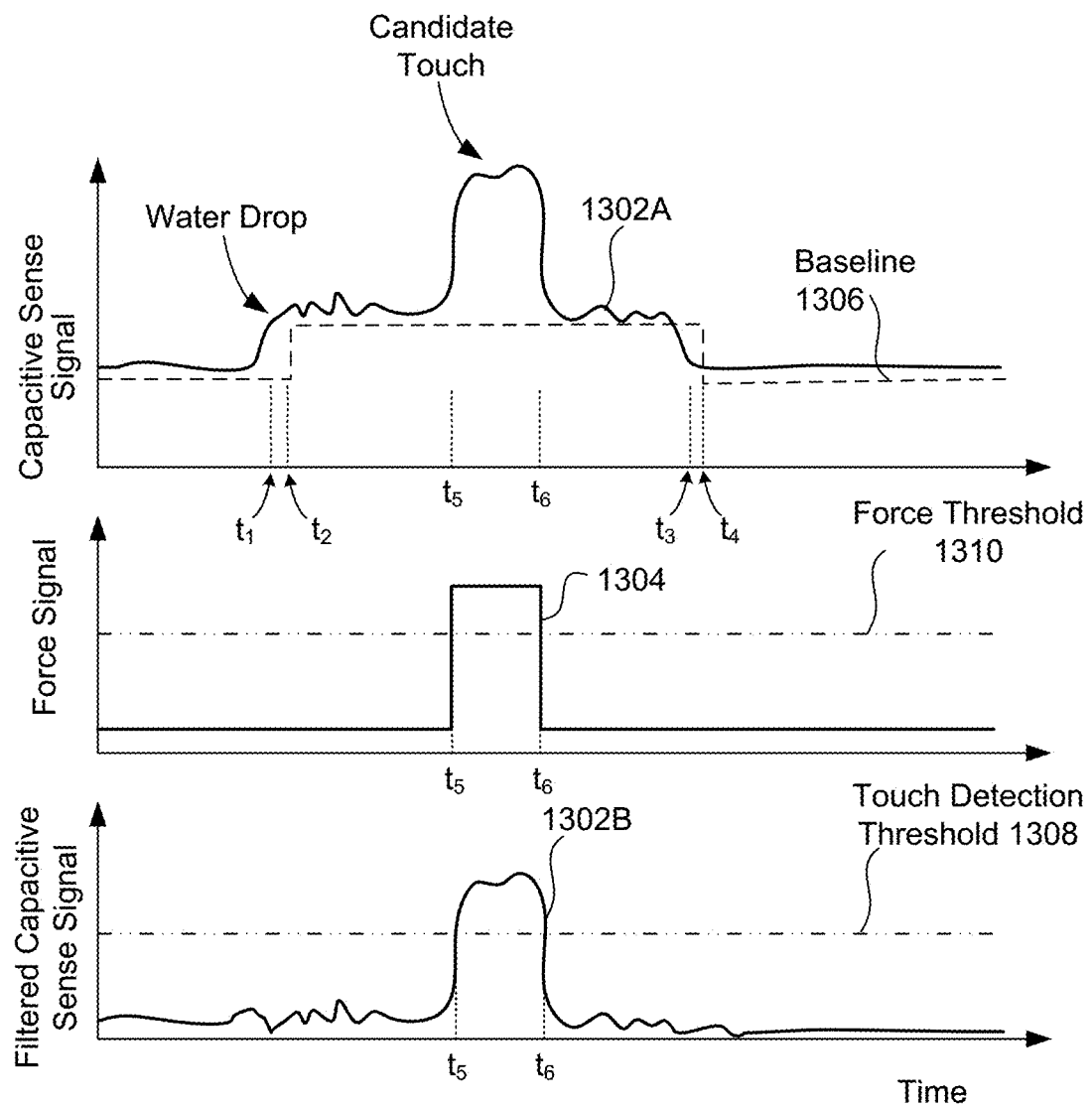

FIG. 13C is a set of timing diagrams illustrating a raw capacitive sense signal 1302A, a filtered capacitive sense signal 1302B, and a force signal 1304 measured from a capacitive sense electrode of a capacitive sense array that is covered by a water drop and touched by an object in accordance with some implementations. At the time $t_1$, when the raw capacitive signal 1302A increases (optionally beyond the touch detection threshold 1308) and the force associated with the force signal is substantially small, it is determined that the candidate touch associated with the capacitive sense electrode is caused by a water drop, rather than an object coming into contact with an area of the touch sensing surface corresponding to the capacitive sense electrode. The baseline value of the baseline 1306 is adjusted at a time $t_2$ (which is slightly delayed from the time $t_1$) according to the increase of the raw capacitance sense signal 1302A. Later, at a time $t_3$, when the raw capacitive signal 1302A decreases and the force associated with the force signal is substantially small, it is determined that the water drop is removed, and the baseline value of the baseline 1306 is adjusted at a time $t_4$ (which is slightly delayed from the time $t_3$) according to the drop of the raw capacitance sense signal 1302A. The raw capacitive sense signal 1302A is filtered with respect to the adjusted baseline value to result in the filtered capacitive sense signal 1302B.

In some implementations, while the capacitive sense electrode is covered by the water drop during the time duration between $t_2$ and $t_3$, an object comes into contact with the capacitive sense electrode, thereby introducing another signal increase superimposed on the raw capacitive sense signal 1302A. At this time duration between $t_2$ and $t_3$, force is detected with reference to a variation of the force signal 1304 (e.g., an increase of the force signal 1304 beyond the force threshold 1310). When the corresponding filtered capacitive sense signal 1302B is compared with the touch detection threshold 1308, it is then determined that the signal increase superimposed on the raw capacitive sense signal 1302A is caused by a valid touch (e.g., during a time interval from $t_5$ to $t_6$).

Figure 14A:
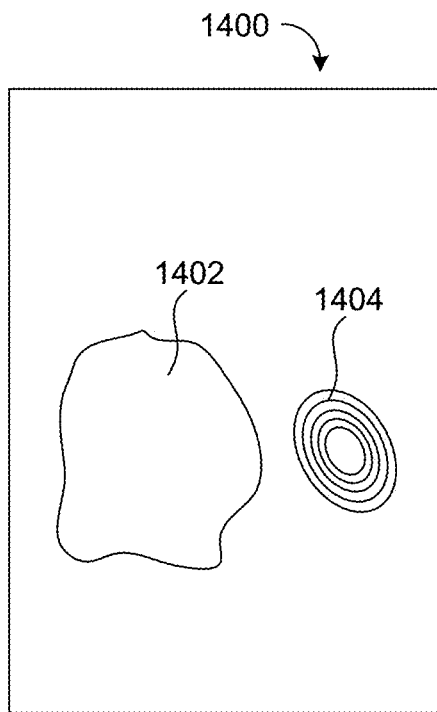
FIGS. 14A-14D are four example touch events, each involving at least a water drop and a touch of an object (e.g., a finger or a stylus) detected on a touch sensing surface, in accordance with some implementations.

FIGS. 14A-14D are four example touch events 1400, 1420, 1440 and 1460, each involving at least a water drop 1402 and a touch of an object (e.g., a finger or a stylus) 1404 detected on a touch sensing surface in accordance with some implementations. Referring to FIG. 14A, in some instances, the touch of the object and the water drop cover two distinct areas of the touch sensing surface. The water drop covers a first area of the touch sensing surface corresponding to a first subset of capacitive sense electrodes of a capacitive sense array 125. Prior to the touch of the object, when the water drop covers the first area by itself, a respective capacitive sense signal is detected from each of the first subset of capacitive sense electrodes, and the corresponding baseline of the respective capacitive sense electrodes is adjusted to compensate for the impact of the water drop on detection of subsequent touch events as shown in FIG. 13A or 13B. As such, when the object comes into contact with a second area of the touch sensing surface, no candidate touch will be measured from the first subset of the capacitive sense electrodes due to compensation of the adjusted baselines associated with these capacitive sense electrodes. On the other hand, the one or more force signals are measured from the one or more force electrodes 128, and indicate that force is applied on the touch sensing surface. The capacitive sense signals are measured from a second subset of capacitive sense electrodes corresponding to the second area of the capacitive sense array 125, indicating the touch of the object 1404 is applied on the second area of the capacitive sense array 125. In some situations, given detection of the force, the touch of the object 1404 on the second area is determined as valid.

Figure 14B:
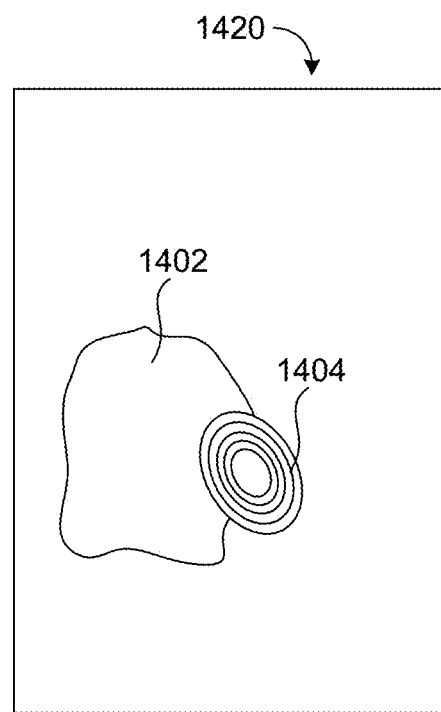

Referring to FIG. 14B, in some instances, the touch of the object and the water drop partially overlap. The water drop 1402 covers a first area of the touch sensing surface corresponding to a first subset of capacitive sense electrodes of a capacitive sense array 125, while the touch of the object 1404 is located on a second area of the touch sensing surface corresponding to a second subset of capacitive sense electrodes of the capacitive sense array 125. The first area and the second area partially overlap. The baselines of the first subset of capacitive sense electrodes have been adjusted to compensate for the impact of the water drop on detection of subsequent touch events on the first area. Such compensation does not impact a first portion of the second subset of capacitive sense electrodes that does not belong to the first subset of capacitive sense electrodes, while improving accuracy of touch detection on a second portion of the second subset of capacitive sense electrodes that belongs to the first subset of capacitive sense electrodes. More details on baseline compensation are explained above with reference to FIGS. 13A and 13B, and more details on detection of the touch of the object on each sense electrode in the second portion of the second subset of capacitive sense electrodes are explained above with reference to FIG. 13C.

Figure 14C:
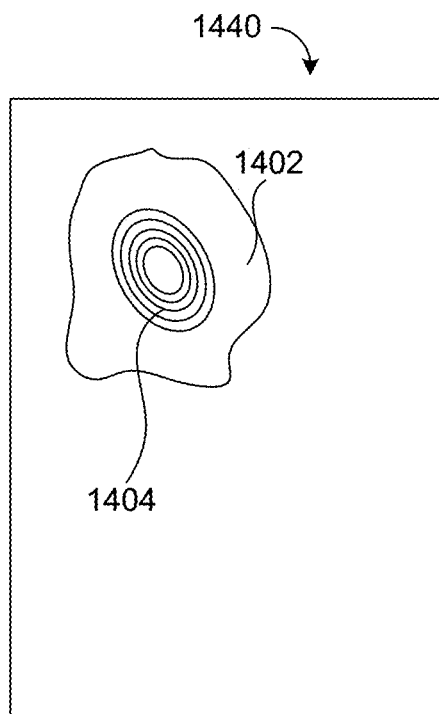
Figure 14D:
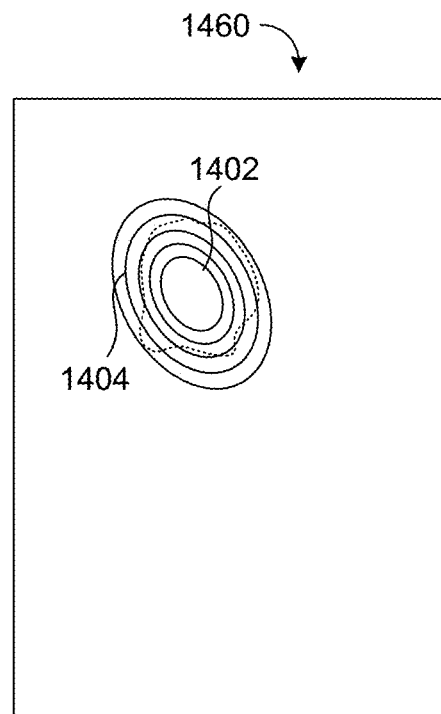

Referring to FIGS. 14C and 14D, in some implementations, the touch of the object 1404 and the water drop 1402 entirely overlap. The water drop covers a first area of the touch sensing surface corresponding to a first subset of capacitive sense electrodes of a capacitive sense array 125, and the touch of the object is located on a second area of the touch sensing surface corresponding to a second subset of capacitive sense electrodes of the capacitive sense array 125. Optionally, the first area is larger than, and fully contains the second area (FIG. 14C). Optionally, the second area is larger than, and fully contains the first area (FIG. 14D).

Referring to FIG. 14C, the baselines of the first subset of capacitive sense electrodes (including the second subset of capacitive sense electrodes) are adjusted to compensate for the impact of the water drop on detection of subsequent touch events on the first area (including the second area). Such compensation avoids detection of the water drop as a valid touch for a portion of the first subset of capacitive sense electrodes that does not belong to the second subset of capacitive sense electrodes, and improves accuracy of touch detection on the second subset of capacitive sense electrodes. More details on baseline compensation are explained above with reference to FIGS. 13A and 13B, and more details on detection of the touch of the object on each of the second subset of capacitive sense electrodes are explained above with reference to FIG. 13C.

Referring to FIG. 14D, the baselines of the first subset of capacitive sense electrodes (which accounts for part of the second subset of capacitive sense electrodes) are adjusted to compensate for the impact of the water drop on detection of subsequent touch events. Such compensation does not impact another part of the second subset of capacitive sense electrodes that does not belong to the first subset of capacitive sense electrodes, while improving accuracy of touch detection on the first subset of capacitive sense electrodes. More details on baseline compensation are explained above with reference to FIGS. 13A and 13B, and more details on detection of the touch of the object on each of the first subset of capacitive sense electrodes are explained above with reference to FIG. 13C.

FIGS. 15A and 15B provide a flowchart of a method 1500 of detecting touch events on a touch sensing surface coupled to a capacitive array 125 in accordance with some implementations. The method 1500 is optionally implemented at a processing device 110 coupled to the capacitive sense array 125 and one or more force electrodes 128 associated with the capacitive sense array. The capacitive sense array 125 includes a plurality of sense electrodes. In some implementations, the one or more force electrodes 128 are disposed below the capacitive sense array 125 and separated from the capacitive sense array 125. A capacitance sense circuit 101 of the processing device 110 obtains (1502) a plurality of capacitive sense signals from the plurality of sense electrodes of the capacitive sense array. In accordance with the plurality of capacitive sense signals and a plurality of baseline values, it is determined (1504) that a subset of sense electrodes are associated with a candidate touch, and each of the plurality of baseline values is associated with at least one of the plurality of sense electrodes. The capacitance sense circuit 101 of the processing device 110 also obtains (1506) one or more force signals from the one or more force electrodes.

In accordance with a determination that force associated with the one or more force signals is below a predetermined force threshold (1507), it is determined (1508) that that the candidate touch is not a valid touch the candidate touch, and for each of the subset of sense electrodes of the capacitive sense array, a respective baseline value is adjusted (1510) for determining subsequent touch events associated with the respective sense electrode according to one of the plurality of capacitive sense signals associated with the respective sense electrode. In some implementations, the plurality of baseline values are configured to be continuously adjusted based on the one or more force signals. In some implementations, the plurality of baseline values are configured to be periodically adjusted based on the one or more force signals.

In some implementations, the candidate touch is associated with a water drop covering an area of the touch sensing surface corresponding to the subset of sense electrodes. In some implementations, the candidate touch is associated with hovering of a conductive object or a stylus above the area of the touch sensing surface corresponding to the subset of sense electrodes. In some implementations, whether the candidate touch is identified as a water drop or a hovering of an object is determined based on the duration of the candidate touch or a signal strength related to the candidate touch.

In some implementations, in accordance with the plurality of capacitive sense signals and the adjusted baseline values of the subset of sense electrodes, a subsequent touch event is detected (1512) on the touch sense surface. A subset of the plurality of capacitive sense signals are filtered according to the baseline values associated with the plurality of sense electrodes. In some implementations, in accordance with the adjusted baseline values of the subset of sense electrodes, a subsequent touch is detected (1514) to at least partially overlap with the area of the touch sensing surface corresponding to the subset of sense electrodes that was covered by the water drop. In some situations, the subsequent touch overlaps (1516) with the area of the touch sensing surface corresponding to the subset of sense electrodes that was covered by the water drop. For example, the subsequent touch has a touch area that is smaller than the area of the touch sensing surface covered by the water drop, and the subsequent touch is entirely contained within the water drop.

In some implementations, in accordance with the adjusted baseline values, a subsequent touch is detected (1518). The subsequent touch does not overlap with the area of the touch sensing surface corresponding to the subset of sense electrodes that was covered in the water drop, and therefore, it is determined that no touch is detected at the area of the touch sensing surface in accordance with the adjusted baseline values of the subset of sense electrodes.

In some instances, the water drop has an irregular shape. In some instances, the water drop has a maximum diameter that is less than one millimeter. In some instances, the water drop has a maximum diameter that is less than one centimeter. In some instances, the water drop covers a substantially large portion of the touch sensing surface.

In some implementations, the one or more force signals are associated with one or more capacitance unit cells formed between the one or more force electrodes 128 and a ground. The one or more force signals are optionally measured based on self-capacitances of the one or more force electrodes with respect to the ground or based on mutual capacitances of the one or more force electrodes. In some implementations, the one or more force electrodes 128 and the ground are separated by a compressible gap 216 having a thickness that varies in response to a force on the touch sensing surface. Optionally, the compressible gap includes an air gap. As explained above with reference to FIG. 2B, the one or more force electrodes 128 and the capacitive sense array are optionally disposed on one side of the compressible gap 216, or separated on two sides of the compressible gap 216 (i.e., separated by the compressible gap 216).

In some implementations, the one or more force electrodes 128 include a single force electrode. In some implementations, the one or more force electrodes 128 include a force electrode array that has a plurality of force electrodes arranged in one dimension or in two dimensions. The force electrode array can include a row of force electrodes, each extending along a direction that is parallel with the touch sensing surface, and the one or more force signals are obtained from the row of electrodes by monitoring self capacitances of the row of electrodes. In some implementations, the force electrode array includes a row of force electrodes and a column of force electrodes, and the one or more force signals are obtained from the row of electrodes and the column of electrodes by monitoring self capacitances or mutual capacitances of the row of electrodes and the column of electrodes. Optionally, the row of force electrodes and the column of force electrodes are formed on two conductive layers 212 and 214 made of conductive material, and each force electrode of the row of force electrodes overlaps part of each force electrode of the column of force electrodes.

In some implementations, the row of force electrodes and the column of force electrodes are formed on a single layer of conductive material. On the single layer of conductive material, each force electrode of the row of force electrodes interleaves with at least one force electrode of the column of force electrodes. In some implementations, the force electrodes form comb fingers with interleaved row and column electrodes.

In some implementations, the processing device 110 includes a plurality of capacitive sense channels (e.g., a capacitance sense channel 602, a touch sense channel 606, and a force sense channel 608). A first subset of the plurality of capacitive sense channels is electrically coupled to the plurality of sense electrodes of the capacitive sense array 125. The plurality of capacitive sense signals are measured from the first subset of capacitive sense channels. Further, a second subset of the plurality of capacitive sense channels (e.g., a force sense channel 608) can be electrically coupled to the one or more force electrodes 128, and the one or more force signals are measured from the second subset of the plurality of capacitive sense channels.

Optionally, the plurality of capacitive sense signals are measured based on self-capacitances of the plurality of sense electrodes with respect to a ground or based on mutual capacitances between the plurality of sense electrodes. The processing device 110 includes a touch sense circuit (e.g., touch sense channels 606) configured to obtain the plurality of capacitive sense signals from the plurality of sense electrodes, a force sense circuit (e.g., force sense channels 608) configured to obtain the one or more force signals from the one or more force electrodes, and a controller (e.g., a force and touch sense driver 102) coupled to the force sense circuit and the capacitance sense circuit. The controller is configured to synchronize the plurality of capacitive sense signals and obtain the one or more force signals for further processing.

Determination of Valid Touches Based on Force Shape

One or more candidate touches are determined from the capacitive sense signals measured from the capacitive sense array 125, and form a touch profile (also called "touch capacitance profile") on a touch sensing surface of the electronic system 100. Force associated with the candidate touches is applied on the touch sensing surface of the electronic system 100, and can be determined from force signals measured from the one or more force electrodes 128. A force shape (also called a "force profile" or a "force capacitance profile") is determined from these force signals measured from the one or more force electrodes 128. When the force shape is not consistent with the touch profile, it is determined that at least one of the one or more candidate touches is not a valid touch and therefore eliminated. In some instances, when the force shape is not consistent with the touch profile, it is determined that an actual touch was not identified as a candidate touch.

Figure 16:
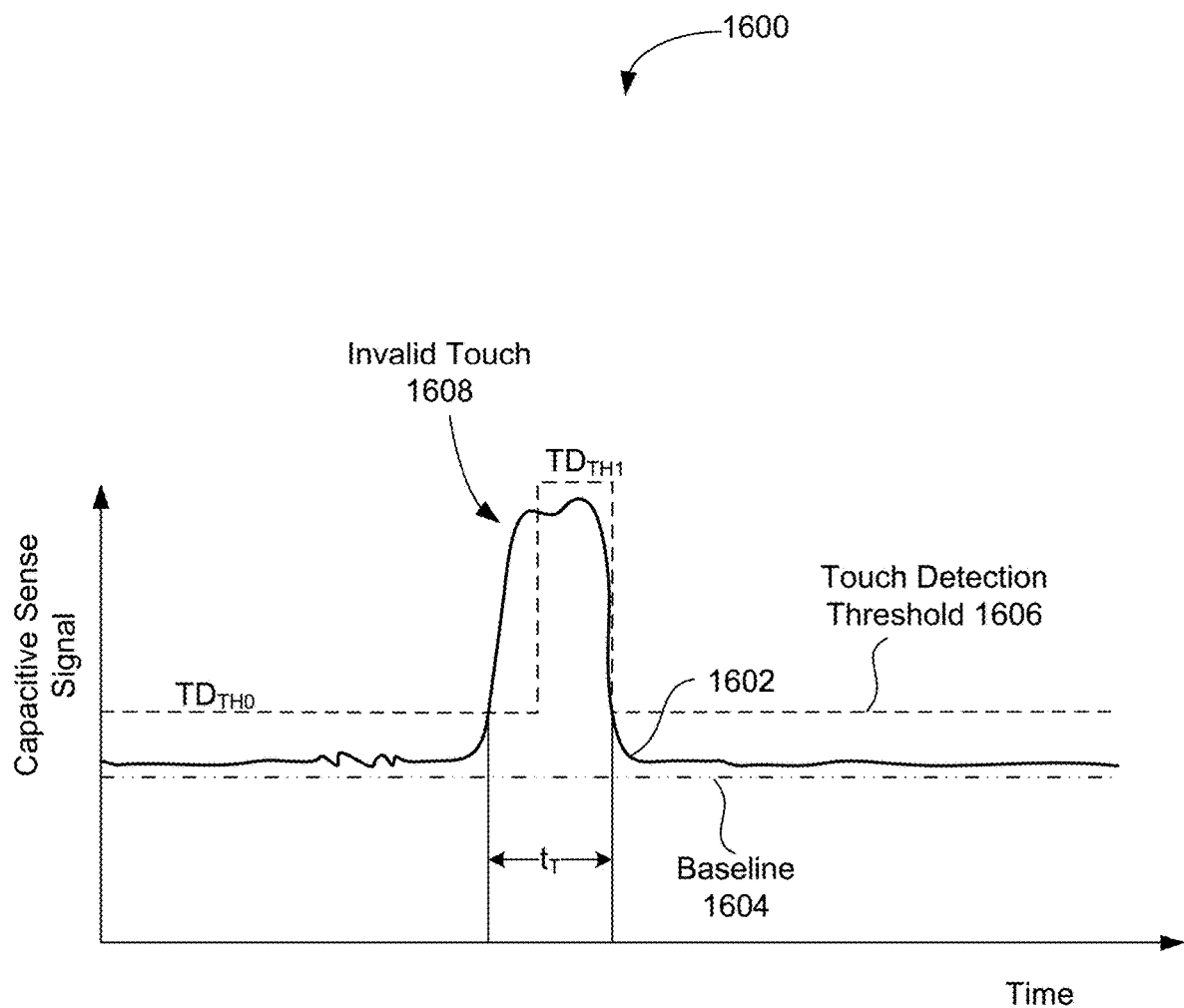
FIG. 16 is an example timing diagram illustrating a capacitive sense signal 1602, a baseline 1604 and a touch detection threshold that are associated with an invalid touch on a capacitive sense electrode of a capacitive sense array, in accordance with some implementations.

FIG. 16 is an example timing diagram 1600 illustrating a capacitive sense signal 1602, a baseline 1604, and a touch detection threshold 1606 that are associated with an invalid touch 1608 on a capacitive sense electrode of a capacitive sense array 125 in accordance with some implementations. The capacitive sense signal 1602 is optionally measured based on self capacitance of one of a plurality of sense electrodes of a capacitive sense array 125, or based on mutual capacitance of two of the plurality of sense electrodes of the capacitive sense array 125. The capacitive sense signal 1602 is filtered with a baseline 1604 prior to being further processed to determine whether the corresponding sense electrodes are associated with a candidate touch. The filtered capacitive sense signal is then compared with a touch detection threshold 1606. During a time duration $t_T$ when the filtered capacitive sense signal exceeds the touch detection threshold 1606, a candidate touch is detected and associated with the time duration $t_T$. Referring to FIG. 5, the capacitive sense signal 1602 is optionally obtained from a capacitive sense scan (e.g., MC0 or SC0), and the force signal 1604 is measured during a force scan (e.g., FS0) that precedes or follows the capacitive sense scan, such that the force signal 1604 is substantially synchronous with the capacitive sense signal 1602.

In some implementations, it is determined that the candidate touch is an invalid touch 1608 by comparing a touch profile and a force shape that are measured from the capacitive sense array 125 and the force electrodes 128, respectively. Consequently, the touch detection threshold 1606 is adaptively adjusted according to a level of the capacitive sense signal measured during the time duration $t_T$. For example, the touch detection threshold 1606 has a magnitude of $TD_{TH0}$ prior to detection of the candidate touch. In accordance with a determination that the candidate touch is invalid based on the touch profile and the force shape, the touch detection threshold 1606 is raised to a magnitude of $TD_{TH1}$ above the level of the capacitive sense signal 1602. Accordingly, the candidate touch falls below the touch detection threshold 1606 and is eliminated as the invalid touch 1608. After the time duration $t_T$ associated with the invalid touch 1608, the touch detection threshold 1606 optionally returns to a magnitude of $TD_{TH0}$ (shown in FIG. 16) or maintains the raised magnitude of $TD_{TH1}$ (not shown).

A method of detecting touch events on a touch sensing surface coupled to a capacitive sense array 125 is implemented to identify invalid touches based on a touch profile and a force shape. A plurality of capacitive sense signals (e.g., a signal 1602) and one or more force signals are obtained from the plurality of sense electrodes of the capacitive sense array 125 and the one or more force electrodes 128. In some implementations, the plurality of capacitive sense signals (e.g., the signal 1602) and one or more force signals are obtained from consecutive capacitive sense scans and force scans as explained with reference to FIG. 5. In accordance with the plurality of capacitive sense signals, one or more candidate touches are determined on the touch sensing surface, and a capacitive touch profile is identified based on the one or more candidate touches. In accordance with the one or more force signals, it is determined that a force shape is caused on the touch sensing surface by the one or more candidate touches. In accordance with a comparison between the force shape and the capacitive touch profile, it is determined whether each of the one or more candidate touches is a valid touch.

Figure 17A:
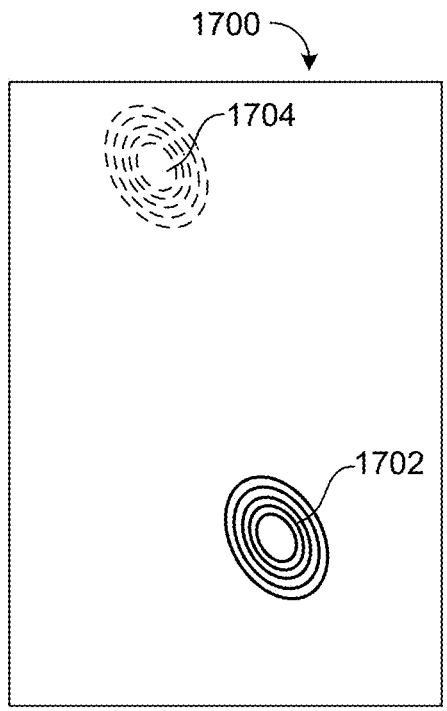
FIG. 17A is an example touch event involving a candidate touch that is detected on a touch sensing surface but is inconsistent with a force shape, in accordance with some implementations.

FIG. 17A illustrates an example touch event 1700 involving a candidate touch 1702 that is detected on a touch sensing surface but is inconsistent with a force shape in accordance with some implementations. A plurality of capacitive sense signals are obtained and filtered with their respective baselines, and indicates a touch profile having one candidate touch 1702 on the touch sensing surface and that the candidate touch 1702 is applied on a first region of the touch sensing surface (e.g., a lower region of the touch sensing surface). On the other hand, the one or more force signals indicate a force shape having a touch location 1704 on a second region of the touch sensing surface (e.g., an upper region of the touch sensing surface). The second region is distinct from the first region. Given that the force shape and the capacitive touch profile are not consistent with each other, it is determined that the candidate touch 1702 is not a valid touch.

In some implementations, when the touch sensing surface is pressed by an object, the stack of the top glass 210, the OCA 208, the glass 204, the LCD 202, and the top conductive layer 212 that are disposed above the compressible gap 216 is tilted, making capacitance associated with the one or more force electrodes 128 distinct from each other. For example, if the candidate touch 1702 is applied on the lower region of the touch sensing surface, a first set of force electrodes 128 disposed below the lower region are associated with a smaller gap thickness than a second set of force electrodes 128 disposed below the upper region of the touch sensing surface. However, referring to FIG. 17A, the force shape indicates a touch at the upper region, e.g., that the second set of force electrodes 128 disposed below the upper region are associated with a smaller gap thickness than the first set of force electrodes 128 disposed below the lower region of the touch sensing surface. As a result, the candidate touch 1702 is invalidated because the force shape and the capacitive touch profile provide inconsistent touch detection results.

In some implementations, when it is determined that the candidate touch is not a valid touch, touch detection thresholds are adaptively adjusted for a subset of the plurality of capacitive sense electrodes from which the candidate touch is detected. More details on adaptive adjustment of a touch detection threshold 1606 for each of a subset of sense electrodes of the capacitive sense array 125 associated with the invalid touch 1702 is explained with reference to FIG. 16.

Figure 17B:
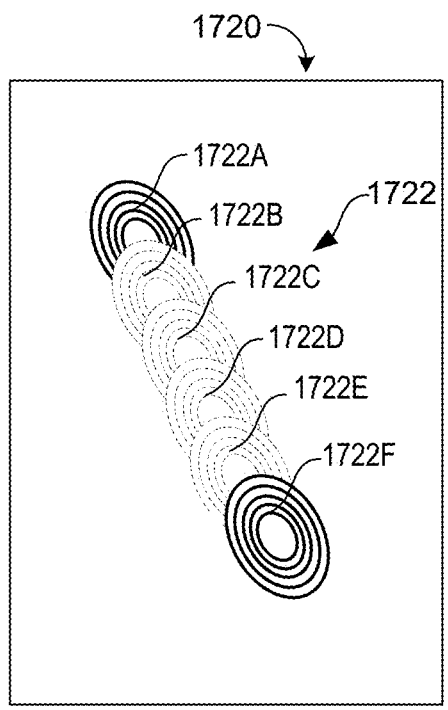
FIG. 17B is an example touch event including a sequence of candidate touches 1722 detected on a touch sensing surface, in accordance with some implementations.

FIG. 17B is an example touch event 1720 including a sequence of candidate touches 1722 detected on a touch sensing surface in accordance with some implementations. The sequence of candidate touches 1722 includes candidate touches 1722A, 1722B, 1722C, 1722D, 1722E, and 1722F detected consecutively along a trace on the touch sensing surface. Each of the candidate touches is determined based on one or more capacitive sense scans of the plurality of sense electrodes of the capacitive sense array 125, while force associated with the respective candidate touch is measured from the one or more force electrodes 128 during one or more force scans associated with the one or more capacitive sense scans. For each candidate touch in the sequence 1722, a respective force shape and a respective touch profile are compared to determine whether the respective candidate touch is valid. For example, for the start candidate touch 1722A and the end candidate touch 1722F, force associated with the start and end candidate touches is detected and used to determine whether the start and end candidate touches are valid.

In some implementations, the sequence of candidate touches 1722 includes a hovering operation in which a stylus or a conductive passive object hovers above an area of the touch sensing surface corresponding to at least one of the candidate touches (e.g., the candidate touches 1722B-1722E). When a candidate touch (e.g., 1722B) is associated with an object hovering above the touch sensing surface, force associated with a subset of force signals corresponding to the candidate touch is below a predetermined force threshold (i.e., the force is negligible), while variations of self capacitance and/or mutual capacitance are still detected at a subset of sense electrodes of the capacitive sense array 125 corresponding to the candidate touch. Therefore, in accordance with detection of a candidate touch associated with substantially small force, it can be determined that that the candidate touch is caused by a stylus or a conductive passive object hovering above the touch sensing surface. In some situations, the intermediate hovering candidate touches are not discarded, and used to indicate that the sequence of candidate touches 1722 is associated with a hovering operation rather than two taps involving only the start and end candidate touches 1722A and 1722F.

Here, the hovering induced candidate touches are associated with a substantially small force. The force shape associated with the substantially small force is not consistent with the touch profile associated with the candidate touch. In some situations focused on hovering detection as explained above, the candidate touch is determined as a valid hovering touch despite the inconsistency between the force shape and the capacitive touch profile. In some situations focused on detection of taps, the candidate touch is determined as an invalid touch in accordance with the inconsistency between the force shape and the capacitive touch profile, and touch detection thresholds 1606 are optionally adjusted in an adaptive manner for a subset of the plurality of capacitive sense electrodes from which the candidate touch is detected.

Figure 17C:
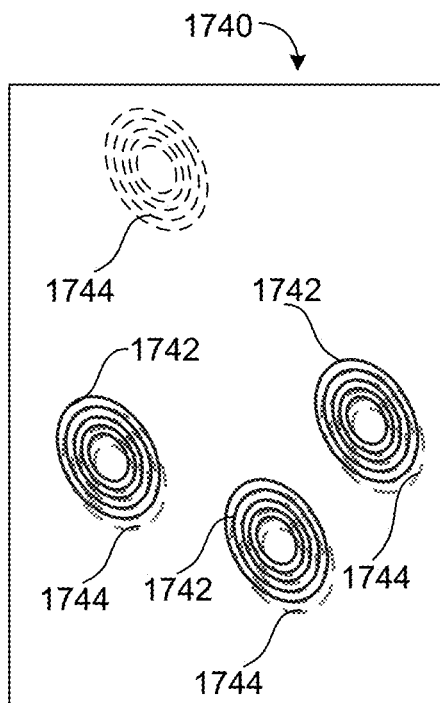
FIGS. 17C and 17D are two example touch events in which a touch profile includes a number of candidate touches detected on a touch sensing surface and the touch profile is inconsistent with a corresponding force shape, in accordance with some implementations.
Figure 17D:
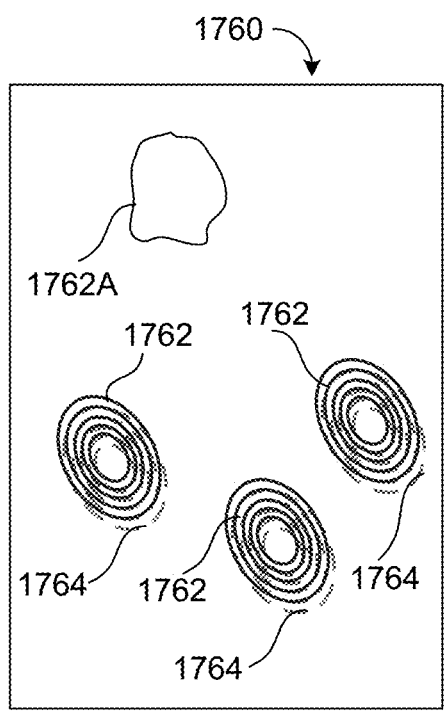

FIGS. 17C and 17D are two example touch events 1740 and 1760 in which a touch profile includes multiple candidate touches detected on a touch sensing surface and is inconsistent with a corresponding force shape in accordance with some implementations. Referring to FIG. 17C, the plurality of capacitive sense signals are filtered with their respective baselines, and indicate a touch profile having a first number of candidate touches 1742 distributed on the touch sensing surface. On the other hand, the one or more force signals determine a force shape. The touch profile and the force shape are compared to determine whether the first number of candidate touches 1742 are valid. For example, the touch profile indicates that the first number of candidate touches 1742 are distributed on a lower region of the touch sensing surface, and the force shape indicates that the first number of candidate touches 1742 are not limited to the lower region and rather are distributed more evenly because of evenly distributed capacitance variations of the force electrodes 128. As such, at least one of the first number of candidate touches 1742 is determined to be an invalid touch that could be caused by at least one of: a water drop disposed on the touch sensing surface, common mode noise, or hovering of a stylus or a conductive object.

In some implementations, it is determined that the force shape corresponds to a second number of touch locations 1744 distributed on the touch sensing surface. The first number is smaller than the second number.

Referring to FIG. 17D, the plurality of capacitive sense signals are obtained and filtered with their respective baselines, and indicate a touch profile having a first number of candidate touches 1762 distributed on the touch sensing surface. On the other hand, the one or more force signals indicate a force shape. The touch profile and the force shape are compared to determine whether the first number of candidate touches 1762 are valid. For example, the touch profile indicates that the first number of candidate touches 1762 are distributed substantially evenly at different regions of the touch sensing surface. However, the force shape indicates that the first number of candidate touches 1762 are limited to the lower region rather than distributed relatively evenly on the touch sensing surface. As such, at least one of the first number of candidate touches 1762 is determined to be an invalid touch.

The invalid touch is optionally caused by at least one of: a water drop disposed on the touch sensing surface, common mode noise, or hovering of a stylus or a conductive object. In this example, one of the candidate touches 1762A is caused by a water drop covering a subset of capacitive sense electrodes, and measured from the plurality of sense signals as part of the touch profile. However, this candidate touch 1762A does not contribute to the force shape. As such, in some implementations, the touch profile is associated with the first number (e.g., 4) of candidate touches 1762, and the force profile is associated with the second number (e.g., 3) of candidate touches 1764. The first number is larger than the second number. Given the inconsistency between the touch profile and the force shape, it is determined that the candidate touch 1762A is not a valid touch on the touch sensing surface.

Figure 18B:
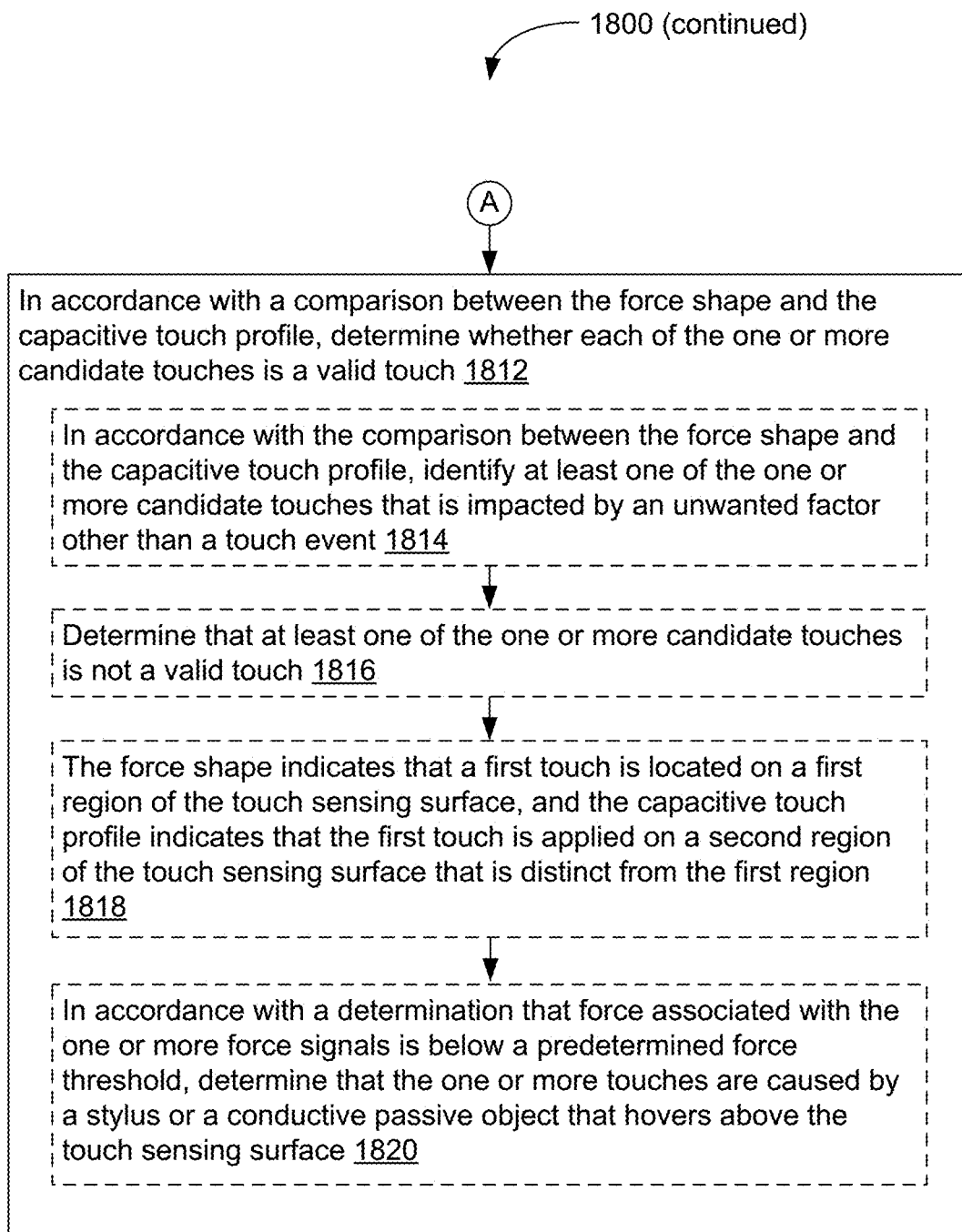

FIGS. 18A and 18B provide a flowchart of a method 1800 for detecting touch events on a touch sensing surface coupled to a capacitive array 125 based on a touch profile and a force shape in accordance with some implementations. The method 1800 is optionally implemented at a processing device 110 coupled to the capacitive sense array 125 and one or more force electrodes 128. The capacitive sense array 125 includes a plurality of sense electrodes, and the one or more force electrodes 128 are disposed below the capacitive sense array 125 and separated from the capacitive sense array 125. A capacitance sense circuit 101 of the processing device 110 obtains (1802) a plurality of capacitive sense signals from the plurality of sense electrodes of the capacitive sense array. In accordance with the plurality of capacitive sense signals, one or more candidate touches on the touch sensing surface are determined (1804), and a capacitive touch profile is identified (1804) based on the one or more candidate touches. The capacitance sense circuit 101 of the processing device 110 obtains (1806) one or more force signals from the one or more force electrodes. In accordance with the one or more force signals, a force shape caused on the touch sensing surface by the one or more touches is determined (1808). More details on the one or more force electrodes 128 and the processing device 110 are explained with reference to FIGS. 1-7 and 15.

Then, in accordance with a comparison between the force shape and the capacitive touch profile, it is determined (1812) whether each of the one or more candidate touches is a valid touch. In some implementations, determining whether each of the one or more touches is a valid touch further includes: in accordance with the comparison between the force shape and the capacitive touch profile, identifying (1814) at least one of the one or more candidate touches that is impacted by an unwanted factor other than a touch event, and determining (1816) that at least one of the one or more candidate touches is not a valid touch. In some situations, the unwanted factor includes at least one of: a water drop disposed on the touch sensing surface, common mode noise, and hovering of a stylus or a conductive passive object.

In some implementations, the one or more candidate touches include a first touch, and in accordance with the comparison between the force shape and the capacitive touch profile, it is determined (1816) that the first touch is not a valid touch. Further, in some implementations, the force shape indicates (1818) that the first touch is located on a first region of the touch sensing surface, and the capacitive touch profile indicates that the first touch is applied on a second region of the touch sensing surface that is distinct from the first region. In some implementations, in accordance with the comparison between the force shape and the capacitive touch profile, a touch detection threshold associated with the first touch is adaptively adjusted for at least one of a subset of the plurality of capacitive sense electrodes that is associated with the first touch. Referring to FIG. 17B, in some implementations, the first touch is caused by a stylus or a conductive passive object that hovers above an area of the touch sensing surface corresponding to the first touch.

In some implementations, in accordance with a determination that force associated with the one or more force signals is below a predetermined force threshold, it is determined (1820) that the one or more touches are caused by a stylus or a conductive passive object that hovers above the touch sensing surface.

In some implementations, determining the force shape further includes (1810) determining, according to the force shape, that a second number of touches are applied on the touch sensing surface, and determining one or more candidate touches on the touch sensing surface further includes (1810) determining that one or more candidate touches associated with the capacitive touch profile include a first number of candidate touches. The first number is greater than the second number. In some implementations, it is further determined that at least one of the first number of candidate touches is not a valid touch. Further, in some implementations, the at least one of the first number of candidate touches is caused (1811) by at least one of: a water drop disposed on the touch sensing surface, common mode noise, and hovering of a stylus or a conductive object.

Referring to FIG. 8A, in some implementations, the force shape caused on the touch sensing surface by the one or more touches is determined as and represented by a respective displacement of each of the one or more force electrodes 128. Force signals measured from the one or more force electrodes 128 indicate capacitance variation associated with each force electrode 128. Given that the capacitance variation is caused by a variation of the gap thickness of the compressible gap 216, the force signals can be used to calculate a respective displacement for each force electrode 128.

Also, referring to FIG. 8A, in some implementations, one or more calibration tables 812 is constructed (e.g., during manufacturing) for touches located at a plurality of predetermined touch locations (e.g., for 9 touch locations: at a top left region, a top middle region, a top right region, a middle left region, a center region, a middle right region, a bottom left region, a bottom middle region, and a bottom right region of the touch sensing surface as shown in FIG. 8B). The calibration table 812 includes an array of displacement data for each of the force electrodes 128 for each predetermined touch location (i.e., a calibrated touch shape for the respective predetermined touch location). The array of displacement data represents the displacements of the force electrodes 128 when a touch is applied at each predetermined touch location. When a touch detected from the capacitive sense array 125 is located at one of the predetermined touch locations, the touch is associated with a computed force shape specified in the calibration table 812.

When a touch does not occur at one of the predetermined touch locations (which is typical), a force shape is computed from the calibrated touch shapes in the calibration table 812 using bilinear interpolation. For example, if the predetermined touch locations form a rectangular array, each touch location in the interior of the touch surface falls within a rectangle (e.g., a square) formed by four predetermined touch locations. The force shape for the touch is computed as a combination (e.g., a linear combination) of the calibrated force shapes for the four predetermined touch locations based on the proximity of the touch to each of the four predetermined touch locations. For touches near an edge or a corner, the interpolation may use fewer than four predetermined touch locations to perform the interpolation.

In some implementations, capacitive sense signals indicate that two or more candidate touches are applied on the touch sensing surface in a substantially synchronous manner. Each of the two or more candidate touches is associated with a respective computed force shape generated based on the calibration table 812. The computed force shapes of the two of more candidate touches are then combined with a set of force weight factors (e.g., the coefficients $\alpha_1, \alpha_2, \ldots, \alpha_k$) to form an expected force shape. In some implementations, the force weight factors associated with the computed force shapes corresponding to the two or more touches are determined using least squares (LSQR). Stated another way, a squared difference value is calculated between the expected force shape and the actual force shape measured for each force sensor, and these are summed to form a total error amount. The force weight factors are adjusted to minimize the total error (e.g., minimize the magnitude of the error vector 822 in FIG. 8A).

After minimizing the total error, the total error is compared to an error threshold to determine whether the actual force shape matches the expected force shape calculated based on the set of candidate touches. When the total error is less than the error threshold, the valid touch (or touches) can be determined. In particular, the valid touches are the ones whose weights are greater than 0. The candidate touches whose weights are substantially zero (e.g., less than 0.05) are designated as invalid touches.

Figure 18C:
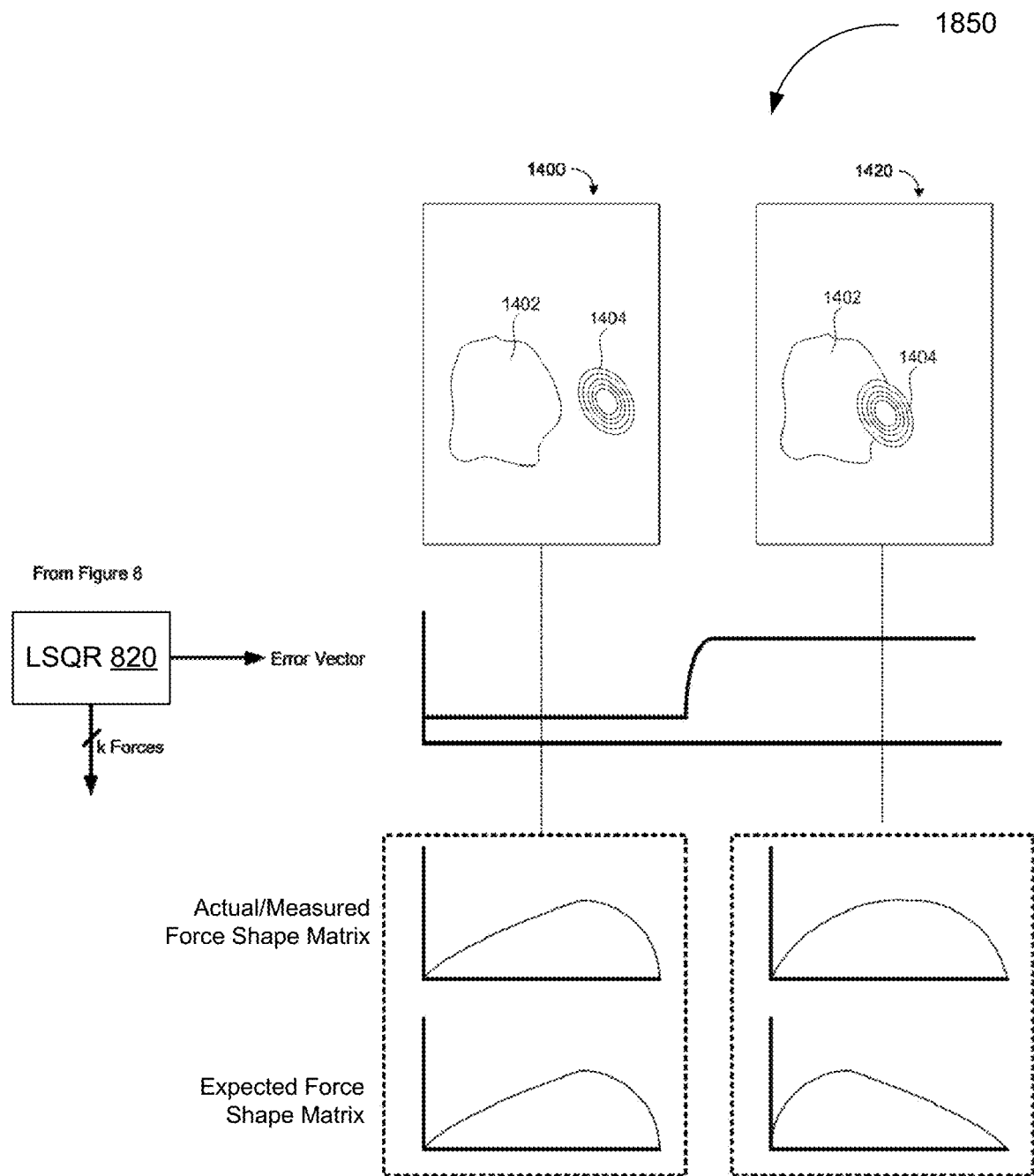
FIG. 18C illustrates comparing measured force to expected force shape to determine whether the touches are valid, in accordance with some implementations.

As a specific example, FIG. 18C illustrates a comparison 1850 of error vectors, actual force shapes, and expected force shapes calculated based on the method 800 of correlating force signals and capacitive sense signals for example touch events 1400 and 1420 in accordance with some implementations. In some situations, the impact of a water drop on a candidate touch cannot be conveniently suppressed by adjusting the baselines of the capacitive sense electrodes of the capacitive sense array 125 (e.g., when the water drop appears after the touch sensing surface is already pressed by the candidate touch or an alternative touch). The water drop could be expanded from an existing water drop or fall onto the touch sensing surface due to some other reasons. Here, the method 1800 of determining a candidate touch based on a force shape can be used to suppress the impact of the water drop as explained above with reference to FIGS. 8A-8C.

When a finger is located next to a water drop in a touch event 1400, the capacitive sense signals indicate a touch profile including two candidate touches 1402 and 1404. The candidate touch 1402 only creates a substantially small (or negligible) force, while the force associated with the measured force signals is mostly provided by the candidate touch 1404. Thus, the error vector can be reduced below the predetermined error threshold value, when the force weight factor associated with the candidate touch 1402 is equal to 0 (or sufficiently small) while the force weight factor associated with the candidate touch 1404 is non-zero (e.g., having a normalized value about 1). In this situation, the force (or the actual force shape) associated with the measured force signals is consistent with the expected force shape computed from the candidate touches 1402 and 1404. The process determines that the candidate touch 1402 is invalid, but the candidate touch 1404 is valid.

In some implementations, when a finger enters the water drop in a touch event 1420, the capacitive sense signals indicate a touch profile including a "single touch" that combines the water drop 1402 and the real touch 1404. This "single touch" has a larger area than the real touch 1404 that causes the force associated with the measured force signals. Regardless of how the single touch is interpolated (operation 816) or how a force associated with the single touch (i.e., the force weight factor) is adjusted, the error vector cannot be modified to produce a total error below the error threshold because the measured force for the real touch 1404 is at a different location that the computed location of the aggregated "single touch." In this situation, the force (or the actual force shape) associated with the measured force signals is not consistent with the expected force shape computed from the single touch, so touch information cannot be confirmed or rejected.

Note that the problem just illustrated in FIG. 18C the "single touch" that combines the water drop 1402 and the real touch 1404 can generally be resolved by rebaselining. As long as the water drop appears on the touch surface before the real touch 1404, the absence of force at that time triggers recomputing the baselines for the touch sensors within the water drop area. Then, when the real touch 1404 occurs, the touch sensors identify the proper location of the real touch (e.g., its centroid), and the location is consistent with the measured force, so the real touch is confirmed valid.

In some implementations, a method is implemented at a processing device 110 coupled to a capacitive sense array and one or more force electrodes for detecting touch events on a touch sensing surface coupled to a capacitive sense array. The capacitive sense array includes a plurality of sense electrodes. The processing device 110 obtains a plurality of capacitive sense signals from the plurality of sense electrodes of the capacitive sense array, and in accordance with the plurality of capacitive sense signals, determines one or more candidate touches on the touch sensing surface, and determines an expected force shape based on the one or more candidate touches. The processing device 110 also obtains one or more force signals from the one or more force electrodes, and determines an actual force shape caused on the touch sensing surface by the one or more candidate touches according to the one or more force signals. The processing device 110 compares the actual force shape and the expected force shape to determine a magnitude of force associated with each of the one or more touch candidates, including determining whether each of the one or more candidate touches is a valid touch. In some implementations, the expected force shape includes an array of expected values associated with force applied on the one or more force electrodes.

In some implementations, the expected force shape includes an expected force shape matrix that combines a plurality of computed force shape matrices based on a plurality of force weight factors. Each of the plurality of computed force shape matrices represents one of the one or more candidate touches and is associated with one of the plurality of force weight factors. Each force weight factor represents the magnitude of force associated with one of the one or more candidate touches. In some implementations, comparing the actual force shape and the expected force shape further includes calculating an error vector from the actual force shape and the expected force shape, and adjusting the plurality of force weight factors to minimize the magnitude of the error vector or to reduce the magnitude of the error vector to a value that is below an error threshold. In some implementations, each of the plurality of computed force shape matrices is computed based on a calibration table, and the calibration table includes a plurality of calibrated force shape matrices, each representing one of a plurality of predetermined calibration sampled points that are distributed on the touch sensing surface. In some implementations, each computed force shape matrix combines a subset of the calibrated force shape matrices corresponding to a subset of predetermined calibration sampled points that surround a first touch corresponding to the one of the plurality of computed force shape matrices. In some implementations, the subset of calibrated force shape matrices are combined based on distances between the first touch and the predetermined calibration sampled points. In some implementations, a first candidate touch matches a first predetermined calibration sampled point. In this case, a computed force shape matrix corresponding to the first candidate touch is represented by a calibrated force shape matrix corresponding to the first predetermined calibration sampled point.

Suppression of Grip-Induced Signals

When a user holds an electronic system 100 having a touch sensing surface, one or more fingers or the palm of the user may grip the electronic system 100 near or on the edge of the touch sensing surface and cause detection of a touch. In some situations, such a grip-induced touch near or on the edge of the touch sensing surface is not intended as a valid touch, and has to be removed from candidate touches detected based on capacitive sense signals measured from the capacitive sense array 125. It is noted that a grip-induced touch applies force near or at the edge of the touch sensing surface, and therefore, force applied on the touch sensing surface could be measured to provide feedback concerning whether the force is associated with an undesirable grip-induced touch.

In accordance with some implementations, force applied on a touch sensing surface of the electronic system 100 is measured from one or more force electrodes 128 in addition to the capacitive sense signals. The force is then used to determine whether a user holds the electronic system 100 by a grip near or on the touch sensing surface, to identify a zone where the user grips on the touch sensing surface, and to reject a candidate touch on the zone as an unwanted grip. More specifically, at a grip on the touch sensing surface, force is exerted on one or more sides of the electronic system 100, and causes part of the electronic system 100 to be tilted or bent. Referring to FIG. 2B, in some implementations, the part of the electronic system 100 that is tilted or bent includes the top glass 210, the OCA 208, the glass 204, the LCD 202, and the top conductive layer 212 that are disposed above the compressible gap 216. When this part of the electronic system 100 is tilted or bent by the grip force, both a thickness of the compressible gap 216 and capacitances associated with the one or more force electrodes 128 vary according to specific locations on the touch sensing surface. As such, the capacitance variations can be measured from the one or more force electrodes 128 to determine whether a grip has been applied near or at an edge of the touch sensing surface of the electronic system 100. (Also, these capacitance variations can be measured from the one or more force electrodes 128 to create a force shape.)

In some implementations, when it is determined that force is exerted near or at an edge of the electronic system 100, a grip associated with the force is identified and associated with a subset of sense electrodes of a capacitive sense array 125. Baselines of the subset of sense electrodes are raised for suppressing the grip associated with the detected force. In some implementations, touch detection thresholds of the subset of sense electrodes are raised for eliminating the grip associated with the detected force as an invalid touch.

Figure 19:
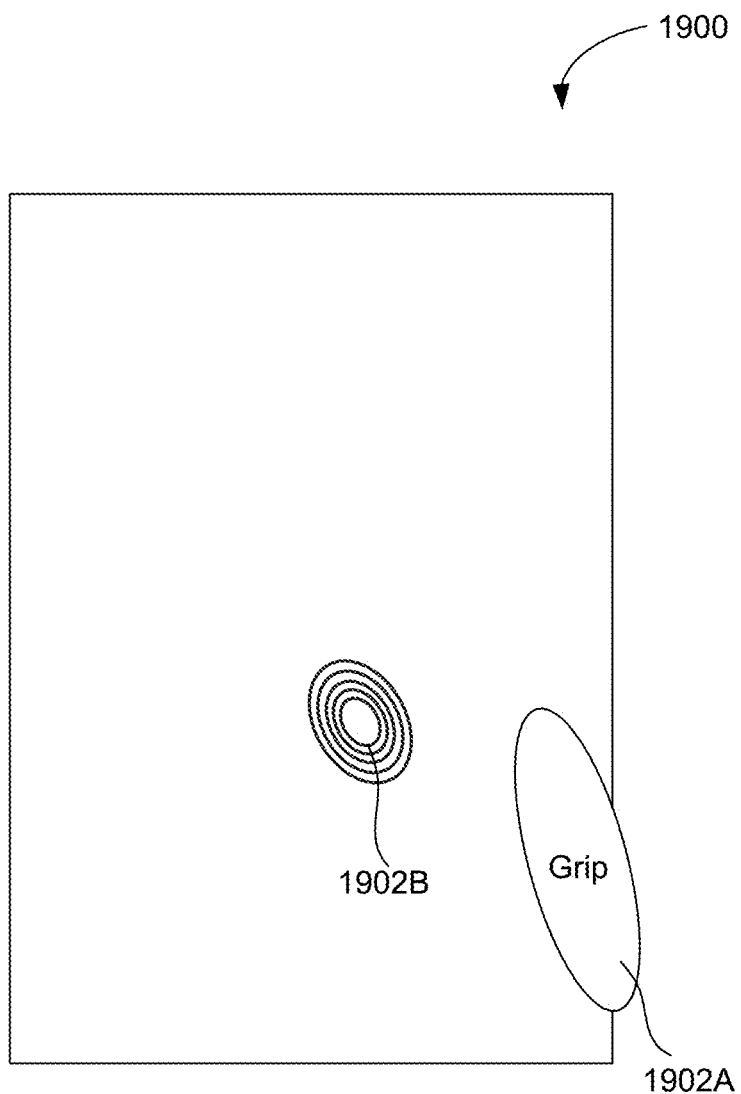
FIG. 19 is an example touch sensing surface associated with two candidate touches, including a grip touch, in accordance with some implementations.

FIG. 19 is an example touch sensing surface 1900 associated with two candidate touches including a grip touch 1902A in accordance with some implementations. A method of detecting touch events on the touch sensing surface 1900 coupled to a capacitive sense array 125 is implemented to identify the grip touch 1902A among one or more candidate touches. A plurality of capacitive sense signals and one or more force signals are obtained from the plurality of sense electrodes of the capacitive sense array 125 and the one or more force electrodes 128, respectively. In some implementations, the plurality of capacitive sense signals and one or more force signals are obtained from consecutive capacitive sense scans and force scans as explained with reference to FIG. 5. In accordance with the plurality of capacitive sense signals, one or more candidate touches 1902A and 1902B on the touch sensing surface are detected. In some instances, the one or more candidate touches 1902A and 1902B are substantially synchronous. The one or more candidate touches include a first candidate touch 1902A. Further, in accordance with a determination that force associated with the one or more force signals is associated with a grip on an edge area of the touch sensing surface, the first candidate touch 1902A is associated with the grip on the edge area of the touch sensing surface and designated as an invalid touch.

Figure 20:
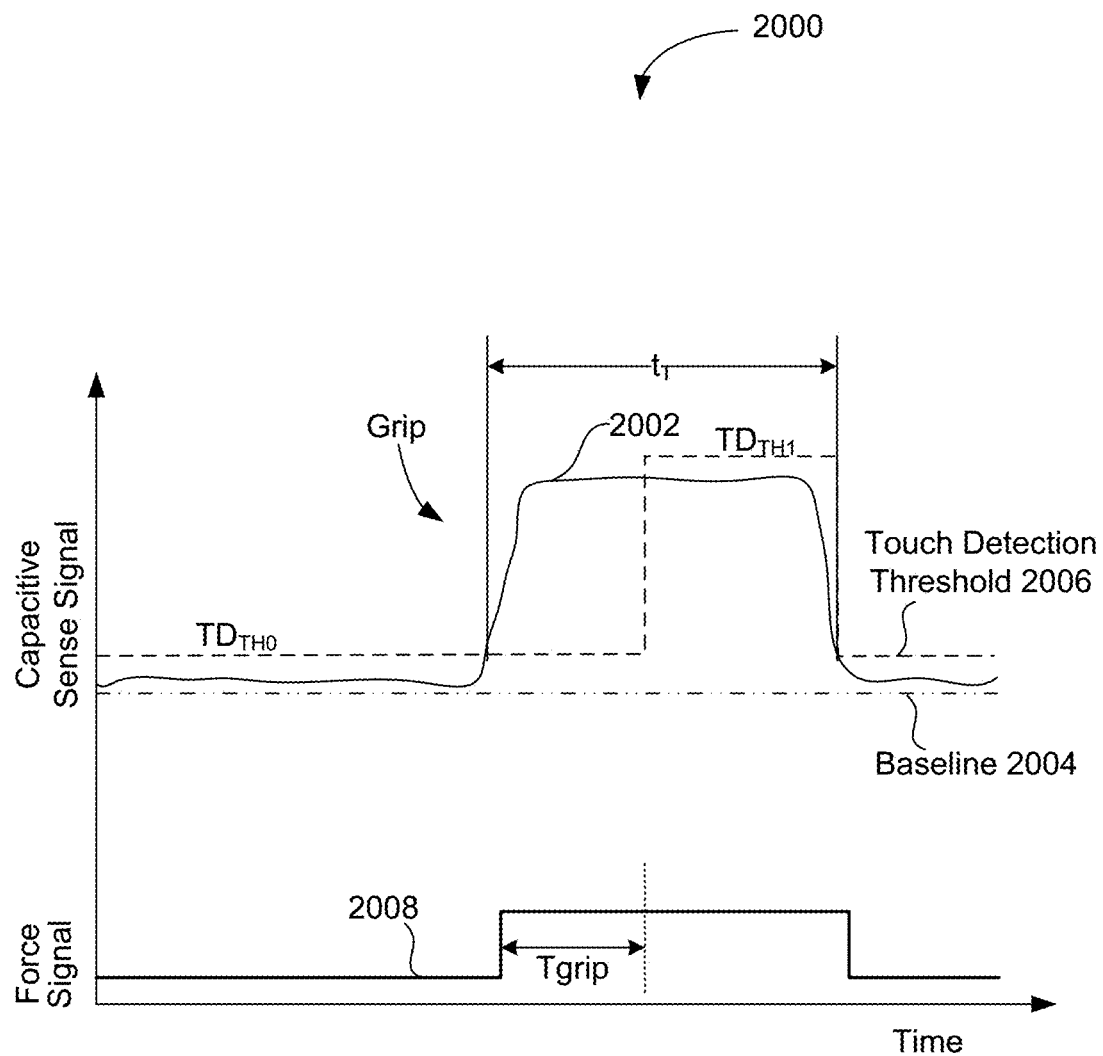
FIG. 20 is an example timing diagram illustrating a capacitive sense signal, a baseline, a touch detection threshold, and a force signal associated with a capacitive sense electrode of a capacitive sense array that is pressed by a grip touch, in accordance with some implementations.

FIG. 20 is an example timing diagram 2000 illustrating a capacitive sense signal 2002, a baseline 2004, a touch detection threshold 2006, and a force signal 2008 associated with a capacitive sense electrode of a capacitive sense array 125 that is pressed by a grip touch in accordance with some implementations. The capacitive sense signal 2002 is optionally measured based on self capacitance of one of a plurality of sense electrodes of the capacitive sense array 125, or based on mutual capacitance of two of the plurality of sense electrodes of the capacitive sense array 125. The capacitive sense signal 2002 is filtered with a baseline 2004 prior to being further processed to determine whether the corresponding sense electrode(s) are associated with a candidate touch (in particular, a grip touch). The filtered capacitive sense signal is then compared with a touch detection threshold 2006. Upon the onset of a time duration $t_T$ when the filtered capacitive sense signal exceeds the touch detection threshold 2006, a candidate touch is detected and associated with the capacitive sense electrode of the capacitive sense array 125. Referring to FIG. 5, the capacitive sense signal 2002 is optionally obtained from a capacitive sense scan (e.g., MC0 or SC0), and the force signal 2004 is measured during a force scan (e.g., FS0) that directly precedes or follows the capacitive sense scan, such that the force signal 2008 is substantially synchronous with the capacitive sense signal 2002.

In some implementations, the capacitive sense electrodes associated with the capacitive sense signal 2002 and the force signal 2008 are located within a predetermined distance from an edge of the touch sensing surface, and are therefore determined to be located near the edge area of the touch sensing surface. Force associated with the force signal 2008 is then associated with a touch or a grip on an edge area of the touch sensing surface. Specifically, in some situations, the force signal 2008 indicates that the force applied on the edge area lasts for a duration of time (e.g., $t_T$) that exceeds a predetermined grip time threshold $T_{grip}$. Therefore, the candidate touch is determined as a grip touch. In some situations, the plurality of capacitive sense signals (including the capacitive sense signal 2002) indicate that the candidate touch is associated with a touch area that exceeds a predetermined grip area threshold. In some instances, force associated with the force signal 2004 exceeds a grip force threshold. Therefore, the candidate touch is determined to be a grip touch.

In some implementations, a force shape corresponding to the force associated with a grip on the edge area is determined based on one or more force signals (including the force signal 2008) measured from the one or more force electrodes 128. For example, capacitance variations for a set of force electrodes located near or at the corresponding edge are significantly larger than those of the other force electrodes. Such a force shape indicates a physical press on the edge area of the touch sensing surface on the edge area, thereby showing that the force is associated with the grip on the edge area.

When a grip touch is eliminated as an invalid touch, the touch detection threshold 2006 is adaptively adjusted according to a level of the capacitive sense signal measured during the time duration $t_T$. For example, the touch detection threshold 2006 has a magnitude of $TD_{TH0}$ prior to detection of the candidate touch. In accordance with a determination that the candidate touch is invalid as a grip touch, the touch detection threshold 2006 is raised to a magnitude of $TD_{TH1}$ above the level of the capacitive sense signal 2002. Accordingly, the candidate touch falls below the touch detection threshold 2006 and is eliminated as an invalid touch. In some implementations, a grip touch is detected after a predetermined grip time threshold ($T_{grip}$), and the touch detection threshold 2006 is raised after the predetermined grip time threshold ($T_{grip}$). After the time duration $t_T$ associated with the invalid touch terminates, the touch detection threshold 2006 optionally returns to a magnitude of $TD_{TH0}$ (shown in FIG. 20) or maintains the raised magnitude of $TD_{TH1}$ (not shown).

FIG. 21 provides a flowchart of a method 2100 of suppressing a grip during the course of detecting touch events on a touch sensing surface coupled to a capacitive array in accordance with some implementations. The method 2100 is optionally implemented at a processing device 110 coupled to the capacitive sense array 125 and one or more force electrodes 128 associated with the capacitive sense array. The capacitive sense array 125 includes a plurality of sense electrodes. In some implementations, the one or more force electrodes 128 are disposed below the capacitive sense array 125 and separated from the capacitive sense array 125. A capacitance sense circuit 101 of the processing device 110 obtains (2102) a plurality of capacitive sense signals from the plurality of sense electrodes of the capacitive sense array. In accordance with the plurality of capacitive sense signals, one or more candidate touches on the touch sensing surface are detected (2104) on the touch sensing surface, and the one or more candidate touches includes a first candidate touch. In some implementations, it is further determined that the one or more touches include a plurality of substantially synchronous touches. The capacitance sense circuit 101 of the processing device 110 obtains (2106) one or more force signals from the one or more force electrodes 128. More details on the one or more force electrodes 128 and the processing device 110 are explained with reference to FIGS. 1-7 and 15.

It is then determined (2107) that force associated with the one or more force signals is associated with a grip on an edge area of the touch sensing surface. In accordance with a determination (2108) that force associated with the one or more force signals is associated with a grip on an edge area of the touch sensing surface, the first candidate touch is associated (2110) with the grip on the edge area of the touch sensing surface, and designated (2112) as not a valid touch. In some implementations, the force is determined (2114) as associated with a grip of the edge area by at least one of: determining that the force applied on the edge area lasts for a duration of time that exceeds a predetermined grip time threshold or determining that the first touch associated with the grip of the edge area has a touch area that exceeds a predetermined grip area threshold. In some implementations, a force shape is determined for the force associated with the grip on the edge area based on the one or more force signals. The force shape indicates a physical press on the edge area of the touch sensing surface on the edge area, thereby showing that the force is associated with the grip on the edge area.

Gesture Determination Based on Force Parameters

User gestures are an important element of user interface design, and gesture recognition depends on a robust representation of a user action. For example, when a simple swipe across a touch sensing surface is too fast, it is reported as two separate touches, and not recognized as an intended swipe gesture. In accordance with some implementations of the application, force signals measured from the one or more force electrodes 128 are used to introduce one or more force parameters in addition to touch locations measured from the capacitive sense array 125. The touch locations and the force parameters are combined to define a wide variety of three-dimensional (3D) touch gestures. The 3D touch gestures enable the processing device 110 to differentiate between a swipe having a small amount of force and two taps associated with a larger amount of force on the touch sensing surface.

In some implementations, 3D touch gestures improve multi-finger gestures with primary finger qualification or create secure wakeup strokes that allow unlimited combinations of touches, swipes, and forces to unlock a screen. In some implementations, the 3D touch gestures are also used to establish an axis of rotation based on the force applied by multiple conductive objects on the surface of the touch device, or to establish a locus of expansion or contraction for pinch and zoom.

In some implementations, an electronic system 100 uses a touch interface (e.g., a capacitive sense array 125 and a processing device 110) to control access to the electronic system 100 based on a numeric or alphanumeric password, touch gestures, and/or face or fingerprint recognition. 3D touch gestures can be used as an additional qualifier to improve the security of an electronic system 100 because they increase the complexity of input that grants the user access. Example touch gestures include two presses and a swipe. Adding 3D touch gestures to the same pattern with a light press, hard press or a light swipe increases the difficulty for an unauthorized user to gain access, even if the unauthorized user had visually seen the touch gesture pattern. The force exerted during any press or swipe can be individually set at an arbitrary force, allowing for virtually unlimited possibilities.

Figure 22A:
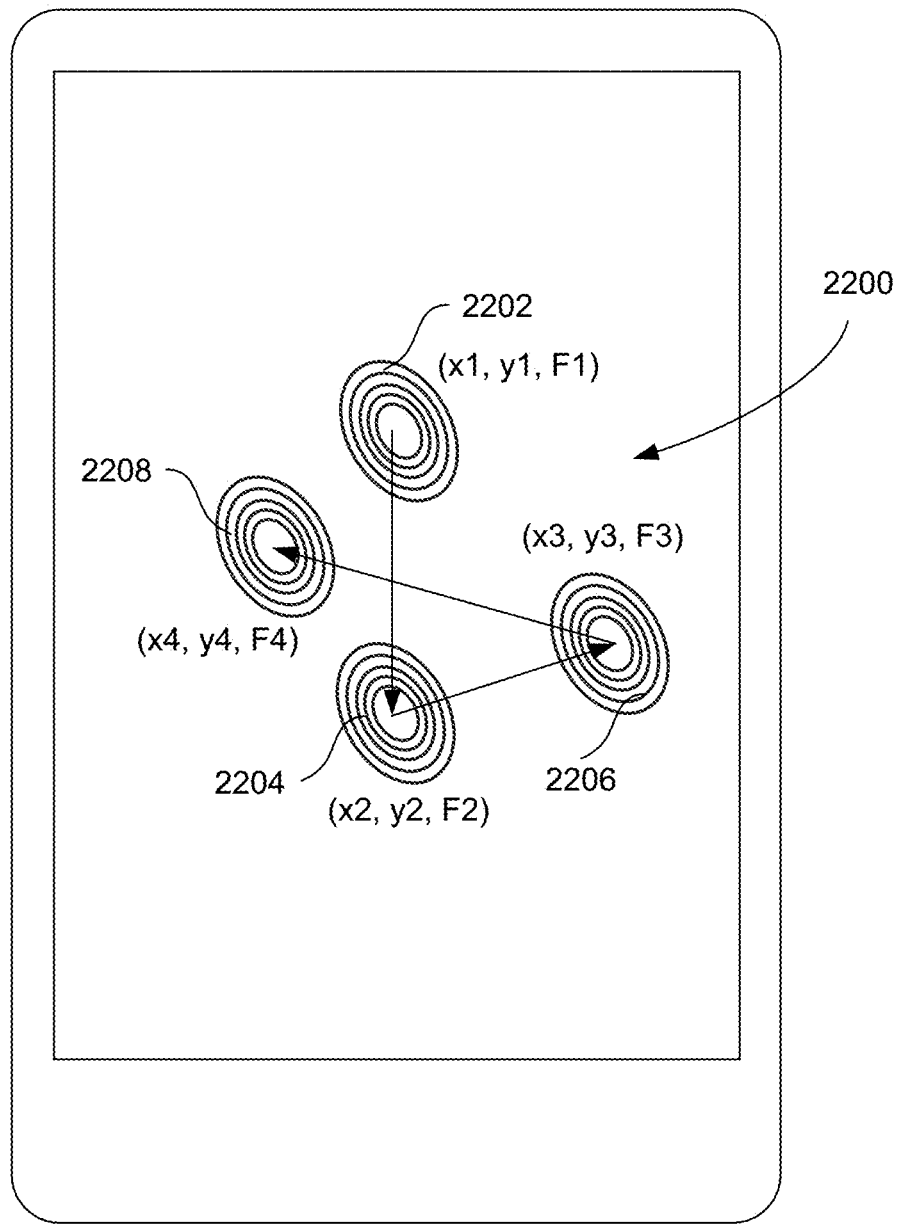
FIG. 22A is an example gesture that includes a sequence of touches, each of which is associated with a location and a force parameter, in accordance with some implementations.

FIG. 22A illustrates an example gesture 2200 that includes a sequence of touches, each of which is associated with a location and a force parameter in accordance with some implementations. The sequence of the touches includes four touches 2202-2208, which are consecutively measured from a plurality of capacitive sense signals and one or more force signals during a sequence of capacitive sense scans and force scans. In this example, a first touch 2202 is measured from the plurality of capacitive sense signals during a first capacitive sense (e.g., mutual and self capacitance scans MC0 and SC0). One or more force signals are measured during a corresponding force scan (e.g., force scan FS0) to confirm that the first touch 2202 is a valid touch and forms part of the gesture 2200. Similarly, each of the second touch 2204, the third touch 2206, and the fourth touch 2208 of the sequence of touches is determined from the plurality of capacitive sense signals measured during a respective capacitive sense (e.g., MC1/SC1, MC2/SC2). The one or more force signals are measured during a corresponding force scan to confirm that the respective touch is a valid touch and forms part of the gesture 2200.

For each touch of the sequence of touches, a location of the respective touch is determined from the plurality of capacitive sense signals. In some implementations, the location of the touch includes an x-coordinate value and a y-coordinate value. During a self capacitance scan, a touch is identified by scanning both column electrodes and row electrodes, and the column and row electrodes that indicate capacitance change associated with the touch provide information for the x- and y-coordinate values. In some implementations, during a mutual capacitance scan, a transmission signal is applied to drive each of the column electrodes (or the row electrodes), and capacitive sense signals coupled to the row electrodes (or the column electrodes) are monitored to detect any capacitance variation between the respective column and row electrodes. Upon detection of such capacitance variation, the corresponding column and row electrodes provide information for the x- and y-coordinate values of the corresponding touch.

For each touch of the sequence of touches, a force parameter is determined from the one or more force signals. The force parameter provides a third variable to characterize the corresponding touch in addition to the location parameters determined from the plurality of capacitive sense signals. For example, the force parameter includes a displacement measured at the touch location along a direction perpendicular to the touch sensing surface. Referring to FIGS. 8A-8C, force signals measured from the one or more force electrodes 128 indicate capacitance variation associated with each force electrode 128. Given that the capacitance variation is caused by a variation of the gap thickness of the compressible gap 216, the force signals can be used to calculate a respective displacement for each force electrode 128. In some implementations, a touch covers more than one force electrode 128. The displacement of the touch location corresponding to the touch is a combination (e.g., an average) of the displacements of the force electrodes 128 covered by the touch. In some implementations, the displacement of the touch location corresponding to the touch can be represented by the displacement of a specific force electrode 128 corresponding to a centroid location of the touch.

In some implementations, the force or displacement at a touch location is estimated using bilinear interpolation, similar to the method described above for FIGS. 8B and 8C. For example, if the touch location is inside a rectangle formed by the four nearest force sensors, the force or displacement at the touch location can be estimated as a linear combination of the forces/displacements at those four force sensors. Each of the forces/displacements is weighted based on the proximity of the force sensor (e.g., the centroid of the force sensor) to the touch location.

A gesture associated with the sequence of touches is then defined based on the locations and the values of the force parameter for each touch of the sequence of touches. The gesture involves at least three variables, and is sometimes referred to as a three-dimensional (3D) gesture. In some implementations, a 3D gesture is used to authenticate a user or unlock a corresponding electronic system 100. For example, referring to FIG. 22A, when the gesture is used to authenticate a specific user, the user must create a gesture that matches the saved finger stroke pattern (e.g., the same three strokes, where the third stroke crosses the first stroke). In some implementations, no specific location requirement is applied to each individual touch of the gesture as long as the finger stroke pattern is correct. In some implementations, each touch is further required to be located within a respective region of the touch sensing surface or demonstrate a predetermined force level. The predetermined force level is either quantitatively defined within a range, or qualitatively defined, for example, as negligible, weak, intermediate, or strong. Further, in some implementations, a stroke only needs to include two taps, while in some implementations, a stroke is required to include a strong start touch, a strong end touch and a hovering operation in between. The force signals are used to determine whether a stroke includes two taps only or includes a start touch, an end touch and a hovering operation in between.

Figure 22B:
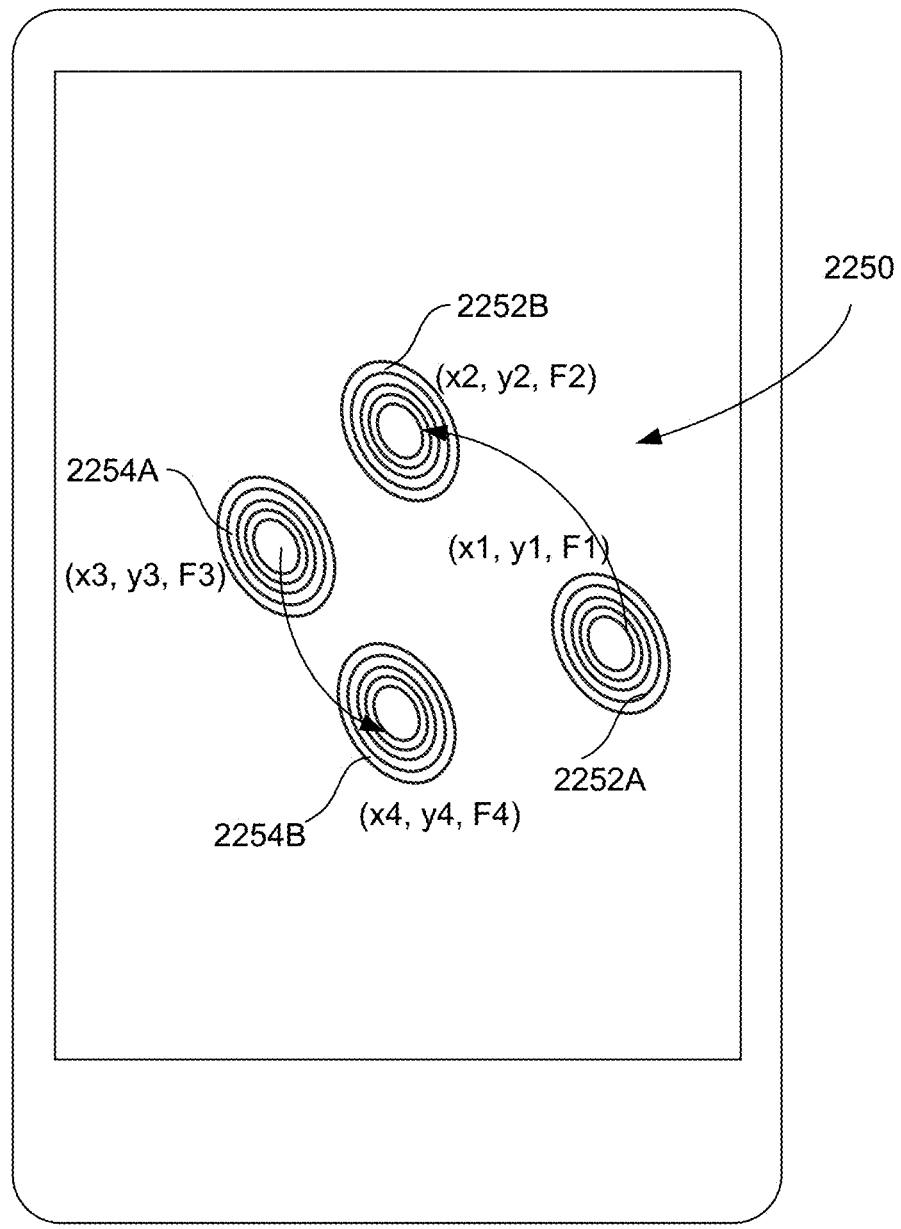
FIG. 22B is an example gesture that includes at least two synchronous sequences of touches in which each touch is associated with a location and a force parameter, in accordance with some implementations.

FIG. 22B provides an example gesture 2250 that includes at least two synchronous sequences of touches 2252 and 2254 in which each touch is associated with a location and a force parameter in accordance with some implementations. Each sequence of touches 2252 or 2254 includes a respective set of consecutive finger touches moving on the touch sensing surface. The touches of the two set of consecutive finger touches are synchronized. Stated another way, a first touch 2252A of the first sequence of touches 2252 is substantially synchronous with a first touch 2254A of the second sequence of touches 2254, and a second touch 2252B of the first sequence of touches 2252 is substantially synchronous with a second touch 2254B of the second sequence of touches 2254. Further, in some implementations, each sequence of touches 2252 or 2254 may require only taps, while in some implementations, each sequence of touches 2252 or 2254 is required to include a strong start touch, a strong end touch, and a hovering operation in between. Force signals are used to determine whether a sequence of touches only includes taps or includes a hovering operation in addition to the start and end touches. Such a gesture is sometimes used to establish an axis of rotation or establish a locus of expansion/contraction for pinch and zoom.

In some implementations, when a plurality of touches (e.g., the first touch 2252A of the first sequence of touches 2252 and the first touch 2254A of the second sequence of touches 2254) are applied on the touch sensing surface in a substantially synchronous manner, the force parameter for the touches includes a force weight calculated according to the method described with reference to FIGS. 8A-8C.

FIG. 23 provides a flowchart of a method 2300 of detecting a gesture on a touch sensing surface in accordance with some implementations. The method 2300 is optionally implemented at a processing device 110 coupled to the capacitive sense array 125 and one or more force electrodes 128 associated with the capacitive sense array. The capacitive sense array 125 includes a plurality of sense electrodes. In some implementations, the one or more force electrodes 128 are disposed below the capacitive sense array 125 and separated from the capacitive sense array 125. A plurality of scan cycles is performed (2302), e.g., at capacitance sense circuit 101 of the processing device 110. For each of the plurality of scan cycles, a plurality of capacitive sense signals is obtained (2304) from the plurality of sense electrodes of the capacitive sense array, and one or more force signals are obtained (2306) from the one or more force electrodes 128. More details on the one or more force electrodes 128 and the processing device 110 are explained with reference to FIGS. 1-7 and 15.

A temporal sequence of touches is determined (2308) on the touch sensing surface based on the plurality of capacitive sense signals and the one or more force signals obtained from the plurality of scan cycles. To determine each touch of the temporal sequence of touches, the processing device 110 identifies a touch location on the touch sensing surface based on the plurality of capacitive sense signals, and determines a force value associated with force applied at the touch location based on the one or more force signals. A gesture associated with the temporal sequence of touches is identified (2312) based on the touch location and the force value for each touch of the sequence of touches. In some implementations, a first predefined gesture is identified (2314), when the touch locations of the temporal sequence of touches are consistent with a predefined stroke pattern and each of the force values varies according to a set of predetermined force values corresponding to the predefined stroke pattern. In some implementations, the predefined stroke pattern and the set of predetermined force values are configured for authenticating a user.

In some implementations, for each touch of the sequence of touches, the respective location of the touch includes an x-coordinate value and a y-coordinate value. Further, in some implementations, for each touch of the sequence of touches, the respective value of the force parameter is adjusted based on the respective location of the respective touch.

It should be understood that the particular order in which the operations in each of FIGS. 15A-15B, 18A-18B, 21, and 23 have been described is merely exemplary and are not intended to indicate that the described order is the only order in which the operations could be performed. One of ordinary skill in the art would recognize various ways to reorder the operations described herein. Additionally, it should be noted that details of a process described herein with respect to any one of the methods 1500, 1800, 2100, or 2300 are also applicable in an analogous manner to any other process of the methods 1500, 1800, 2100, 2300 described above with respect to FIGS. 15A-15B, 18A-18B, 21 and 23. For brevity, these details are not repeated in the description for different figures.

It will be understood that, although the terms first, second, etc. are, in some instances, used herein to describe various elements, these elements should not be limited by these terms. These terms are only used to distinguish one element from another. For example, a first voltage could be termed a second voltage, and, similarly, a second voltage could be termed a first voltage, without departing from the scope of the various described implementations. The first voltage and the second voltage are both voltage levels, but they are not the same voltage level.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of detecting touch events on a touch sensing surface coupled to a capacitive sense array including a plurality of sense electrodes, comprising:
    at a processing device coupled to the capacitive sense array and a plurality of force electrodes:
        obtaining a plurality of capacitive sense signals from the plurality of sense electrodes of the capacitive sense array;
        in accordance with the plurality of capacitive sense signals, determining one or more candidate touches on the touch sensing surface;
        determining a matrix of expected force values based on the one or more candidate touches, each expected force value in the matrix of expected force values corresponding to a respective electrode of the plurality of force electrodes;
        obtaining a plurality of force signals from the plurality of force electrodes;
        in accordance with the plurality of force signals, determining a matrix of actual force values caused on the touch sensing surface by the one or more candidate touches, each actual force value in the matrix of actual force values corresponding to a respective electrode of the plurality of force electrodes; and
        comparing the matrix of actual force values to the matrix of expected force values to determine a magnitude of force associated with each of the one or more candidate touches, including determining whether each of the one or more candidate touches is a valid touch.

2. The method of claim 1, wherein the matrix of expected force values includes an array of expected force values associated with force applied on the plurality of force electrodes.

3. The method of claim 1, wherein:
    the matrix of expected force values combines a plurality of computed matrices of force values based on a plurality of force weight factors;
    each of the plurality of computed matrices of force values represents one of the one or more candidate touches;
    each of the plurality of computed matrices of force values is associated with one of the plurality of force weight factors; and
    each force weight factor represents the magnitude of force associated with one of the one or more candidate touches.

4. The method of claim 3, wherein the comparing of the matrix of actual force values to the matrix of expected force values further comprises:
    calculating an error vector from the matrix of actual force values and the matrix of expected force values; and
    adjusting the plurality of force weight factors to minimize a magnitude of the error vector or to reduce the magnitude of the error vector below an error threshold.

5. The method of claim 3, wherein each of the plurality of computed matrices of force values is computed based on a calibration table, and the calibration table includes the plurality of calibrated matrices of force values, each representing a respective one of the plurality of predetermined calibration sampled points that are distributed on the touch sensing surface.

6. The method of claim 5, wherein each of the plurality of computed matrices of force values combines a subset of the plurality of calibrated matrices of force values corresponding to a subset of predetermined calibration sampled points that surround a respective candidate touch.

7. The method of claim 6, wherein the subset of the calibrated matrices of force values are combined based on distances between the first touch and the predetermined calibration sampled points.

8. The method of claim 3, wherein a first candidate touch matches a first predetermined calibration sampled point, and a computed matrix of force values corresponding to the first candidate touch is represented by a computed matrix of force values corresponding to the first predetermined calibration sampled point.

9. The method of claim 1, wherein the plurality of predetermined calibration sampled points has a resolution that is distinct from that of the plurality of force electrodes.

10. The method of claim 1, wherein the determining of whether each of the one or more touches is a valid touch further comprises:
identifying one of the one or more candidate touches that is impacted by an unwanted factor other than a touch event, and determining that the one of the one or more candidate touches is not associated with a valid touch, wherein the unwanted factor includes at least one of: a water drop disposed on the touch sensing surface, common mode noise, and hovering of a stylus or a conductive passive object.

11. The method of claim 1, wherein the one or more candidate touches include a first touch, and the determining of whether each of the one or more touches is a valid touch further comprises:
in accordance with the comparison between the matrix of expected force values and the matrix of actual force values, determining that the first touch is not a valid touch.

12. The method of claim 11, wherein the first touch is caused by a stylus or a conductive passive object that hovers above an area of the touch sensing surface corresponding to the first touch.

13. The method of claim 1, wherein the one or more candidate touches include a plurality of candidate touches, the method further comprising:
determining, according to the matrix of actual force values, that a second number of touches are applied on the touch sensing surface; and
determining that the plurality of candidate touches includes a first number of candidate touches, wherein the first number is distinct from the second number.

14. The method of claim 1, wherein the plurality of force electrodes are disposed below the capacitive sense array and separated from the capacitive sense array.

15. A processing device, comprising:
a processing core;
a capacitance sense circuit; and
memory storing one or more programs configured for execution by the processing core, the one or more programs comprising instructions for:
obtaining a plurality of capacitive sense signals from a plurality of sense electrodes of a capacitive sense array;
in accordance with the plurality of capacitive sense signals, determining one or more candidate touches on the touch sensing surface;
determining a matrix of expected force values based on the one or more candidate touches, each expected force value in the matrix of expected force values corresponding to a respective electrode of a plurality of force electrodes;
obtaining a plurality of force signals from the plurality of force electrodes;
in accordance with the plurality of force signals, determining a matrix of actual force values caused on the touch sensing surface by the one or more candidate touches, each actual force value in the matrix of actual force values corresponding to a respective electrode of the plurality of force electrodes; and
comparing the matrix of actual force values to the matrix of expected force values to determine a magnitude of force associated with each of the one or more candidate touches, including determining whether each of the one or more candidate touches is a valid touch.

16. The processing device of claim 15, wherein the matrix of expected force values includes an array of expected values associated with force applied on the plurality of force electrodes, and the matrix of expected force values is computed from a plurality of calibrated matrices of force values corresponding to a plurality of predetermined calibration sampled points distributed on the touch sensing surface.

17. The processing device of claim 15, wherein:
the matrix of expected force values combines a plurality of computed matrices of force values based on a plurality of force weight factors;
each of the plurality of computed matrices of force values represents one of the one or more candidate touches;
each of the plurality of computed matrices of force values is associated with one of the plurality of force weight factors; and
each force weight factor represents the magnitude of force associated with one of the one or more candidate touches.

18. An electronic system, comprising:
a capacitive sense array coupled to a touch sensing surface, the capacitive sense array including a plurality of sense electrodes;
a plurality of force electrodes; and
a processing device coupled to the capacitive sense array and the plurality of force electrodes, wherein the processing device is configured to:
obtain a plurality of capacitive sense signals from the plurality of sense electrodes of the capacitive sense array;
in accordance with the plurality of capacitive sense signals, determine one or more candidate touches on the touch sensing surface;
determine a matrix of expected force values based on the one or more candidate touches, each expected force value in the matrix of expected force values corresponding to a respective electrode of the plurality of force electrodes;
obtain a plurality of force signals from the plurality of force electrodes;
in accordance with the plurality of force signals, determine a matrix of actual force values caused on the touch sensing surface by the one or more candidate touches, each actual force value in the matrix of actual force values corresponding to a respective electrode of the plurality of force electrodes; and
compare the matrix of actual force values to the matrix of expected force values to determine a magnitude of force associated with each of the one or more candidate touches, including determining whether each of the one or more candidate touches is a valid touch.

19. The electronic system of claim 18, wherein the processing device is configured to determine whether each of the one or more touches is a valid touch by:
- identifying one of the one or more candidate touches that is impacted by an unwanted factor other than a touch event, and determining that the one of the one or more candidate touches is not associated with a valid touch, wherein the unwanted factor includes at least one of: a water drop disposed on the touch sensing surface, common mode noise, and hovering of a stylus or a conductive passive object.

20. The electronic system of claim 18, wherein:
- the one or more candidate touches include a plurality of candidate touches;
- the processing device is configured to determine, according to the matrix of actual force values, that a second number of touches are applied on the touch sensing surface; and
- the determining of the one or more candidate touches on the touch sensing surface further includes: determining that the plurality of candidate touches includes a first number of candidate touches, wherein the first number is distinct from the second number.

* * * * *